United States Patent
Haci et al.

(10) Patent No.: US 11,823,517 B2
(45) Date of Patent: Nov. 21, 2023

(54) ACCESS MONITORING SYSTEM FOR COMPLIANCE

(71) Applicant: DRILLING TOOLS INTERNATIONAL, INC., Houston, TX (US)

(72) Inventors: Marc Haci, Houston, TX (US); Arturo Quezada, Houston, TX (US); Niall Miner, Houston, TX (US); Brandon Mills, Walnut Springs, TX (US)

(73) Assignee: DRILLING TOOLS INTERNATIONAL, INC., Houston, TX (US)

( * ) Notice: Subject to any disclaimer, the term of this patent is extended or adjusted under 35 U.S.C. 154(b) by 368 days.

(21) Appl. No.: 17/180,860

(22) Filed: Feb. 21, 2021

(65) Prior Publication Data
US 2021/0174624 A1    Jun. 10, 2021

Related U.S. Application Data

(63) Continuation-in-part of application No. 16/268,491, filed on Feb. 5, 2019, now abandoned, which is a
(Continued)

(51) Int. Cl.
*G07C 9/33* (2020.01)
*H04N 7/18* (2006.01)
(Continued)

(52) U.S. Cl.
CPC ....... *G07C 9/33* (2020.01); *G06Q 10/063114* (2013.01); *G07C 9/22* (2020.01);
(Continued)

(58) Field of Classification Search
CPC ... G07C 9/33; G07C 9/22; G07C 9/25; G07C 9/27; G07C 9/28; G07C 9/37;
(Continued)

(56) References Cited

U.S. PATENT DOCUMENTS

| | | |
|---|---|---|
| 4,686,474 A | 8/1987 | Olsen et al. |
| 4,814,711 A | 3/1989 | Olsen et al. |

(Continued)

OTHER PUBLICATIONS

Norman, R.W. (1959). Industrial closed-circuit television-its application to production quality control (Order No. EP43541). Available from ProQuest Dissertations and Theses Professional. (1560895098). Retrieved from https://dialog.proquest.com/professional/docview/1560895098?accountid=131444 (Year: 1959).
(Continued)

*Primary Examiner* — Nam V Nguyen
(74) *Attorney, Agent, or Firm* — Halit N. Yakupoglu

(57) ABSTRACT

The present invention provides a cloud computing based system for compliance monitoring of vehicles and users of hydrocarbon wellsites and methods of implementing compliance monitoring service. The system includes at least one access control station located in the compliance monitored hydrocarbon wellsite and a cloud system server to manage the compliance monitoring of the hydrocarbon wellsites. The cloud system server can analyze an access code data and geolocation data received from a mobile computing device of a user, who is desiring to enter or exit a hydrocarbon wellsite or a portion of it, to authenticate the user, to determine whether the user is entering or exiting the hydrocarbon wellsite, and to identify the location of the access control station where the user entry or exit occurs.

35 Claims, 26 Drawing Sheets

Related U.S. Application Data continuation-in-part of application No. 15/989,169, filed on May 24, 2018, now Pat. No. 10,198,883, which is a continuation-in-part of application No. 15/846,194, filed on Dec. 18, 2017, now Pat. No. 9,984,518, which is a continuation of application No. 15/461,831, filed on Mar. 17, 2017, now Pat. No. 9,846,981, which is a continuation-in-part of application No. 14/737,518, filed on Jun. 12, 2015, now abandoned.

(60) Provisional application No. 62/011,156, filed on Jun. 12, 2014.

(51) Int. Cl.
*G07C 9/37* (2020.01)
*G06Q 10/0631* (2023.01)
*G07C 9/25* (2020.01)
*G07C 9/27* (2020.01)
*G07C 9/28* (2020.01)
*G07C 9/22* (2020.01)

(52) U.S. Cl.
CPC ............... *G07C 9/25* (2020.01); *G07C 9/27* (2020.01); *G07C 9/28* (2020.01); *G07C 9/37* (2020.01); *H04N 7/181* (2013.01); *H04N 7/188* (2013.01)

(58) Field of Classification Search
CPC ..... G06Q 10/063114; G06Q 10/06398; G06Q 50/02; H04N 7/181; H04N 7/188
USPC .................................................. 340/5.2, 5.27
See application file for complete search history.

(56) References Cited

U.S. PATENT DOCUMENTS

| | | | | |
|---|---|---|---|---|
| 5,821,414 | A | 10/1998 | Noy et al. | |
| 6,542,077 | B2 | 4/2003 | Joao | |
| 6,958,676 | B1 * | 10/2005 | Morgan | G07B 15/063 340/928 |
| 6,967,589 | B1 | 11/2005 | Peters | |
| 6,970,183 | B1 | 11/2005 | Monroe | |
| 7,397,363 | B2 | 7/2008 | Joao | |
| 8,326,538 | B2 | 12/2012 | Hobbs et al. | |
| 8,386,838 | B1 | 2/2013 | Byan | |
| 8,405,503 | B2 | 3/2013 | Wong | |
| 8,620,487 | B2 * | 12/2013 | Cochran | G07C 9/257 340/5.82 |
| 8,686,852 | B2 | 4/2014 | Ben-Dayan et al. | |
| 9,400,902 | B2 * | 7/2016 | Schoner | G06K 7/10366 |
| 9,430,342 | B1 | 8/2016 | Byan | |
| 9,846,981 | B2 | 12/2017 | Haci et al. | |
| 9,973,391 | B2 | 5/2018 | Skaaksrud et al. | |
| 9,984,518 | B2 | 5/2018 | Haci et al. | |
| 9,985,839 | B2 | 5/2018 | Skaaksrud et al. | |
| 10,083,554 | B2 * | 9/2018 | Mattern | G07C 9/257 |
| 10,198,883 | B2 | 2/2019 | Haci et al. | |
| 2002/0121969 | A1 | 9/2002 | Joao | |
| 2002/0177955 | A1 | 11/2002 | Jalali et al. | |
| 2002/0184068 | A1 | 12/2002 | Krishnan et al. | |
| 2003/0016130 | A1 | 1/2003 | Joao | |
| 2004/0010587 | A1 | 1/2004 | Altamirano et al. | |
| 2005/0219359 | A1 | 10/2005 | Trela | |
| 2005/0242971 | A1 | 11/2005 | Dryer | |
| 2006/0176169 | A1 | 8/2006 | Doolin et al. | |
| 2007/0120058 | A1 | 5/2007 | Blackwell et al. | |
| 2009/0311992 | A1 | 12/2009 | Jagetiya | |
| 2010/0061703 | A1 | 3/2010 | Pham et al. | |
| 2010/0097209 | A1 | 4/2010 | Wong | |
| 2010/0157049 | A1 | 6/2010 | Dvir et al. | |
| 2010/0250139 | A1 | 9/2010 | Hobbs et al. | |
| 2011/0245981 | A1 | 10/2011 | Refai-Ahmed et al. | |
| 2012/0017213 | A1 | 1/2012 | Hunt et al. | |
| 2012/0054270 | A1 | 3/2012 | Foreman et al. | |
| 2012/0306659 | A1 | 12/2012 | Ben-Dayan et al. | |
| 2012/0317615 | A1 | 12/2012 | Geva et al. | |
| 2013/0314210 | A1 | 11/2013 | Schoner et al. | |
| 2014/0278186 | A1 | 9/2014 | Herzl et al. | |
| 2014/0284390 | A1 | 9/2014 | Teng et al. | |
| 2014/0379133 | A1 | 12/2014 | Toma | |
| 2015/0084769 | A1 | 3/2015 | Messier et al. | |
| 2015/0097667 | A1 | 4/2015 | Cruse | |
| 2015/0213457 | A1 | 7/2015 | Libersky et al. | |
| 2015/0363738 | A1 | 12/2015 | Haci | |
| 2017/0013547 | A1 | 1/2017 | Skaaksrud et al. | |
| 2017/0034205 | A1 | 2/2017 | Canedo et al. | |
| 2017/0193719 | A1 | 7/2017 | Haci et al. | |
| 2018/0006748 | A1 * | 1/2018 | Quezada | H04H 20/61 |
| 2018/0108193 | A1 | 4/2018 | Haci et al. | |
| 2018/0276920 | A1 | 9/2018 | Haci et al. | |
| 2019/0213525 | A1 | 7/2019 | Haci et al. | |

OTHER PUBLICATIONS

Fly, Larry D.; "Digital video at work revolutionizing pipeline safety"; Pipeline & Gas Journal 227, 5: 40. Dallas: Gulf Publishing Co. (May 2000) (Year: 2000).

* cited by examiner

| User ID | Company | Region | Field | Date | Time | CMs | Activity |
|---------|---------|--------|-------|------|------|-----|----------|
| A. Smith | Alpha Inc. | Houston,TX,US | A-1 | 01-09-2017 | 8-10AM | 1-5 | OUT |
| B. Jones | Alpha Inc. | Houston,TX,US | A-1 | 01-11-2017 | 3-6 PM | 1-5 | OUT |
| C. Davis | Alpha Inc. | Houston,TX,US | A-1 | 01-13-2017 | 9-11AM | 1-5 | IN |
FIG. 6
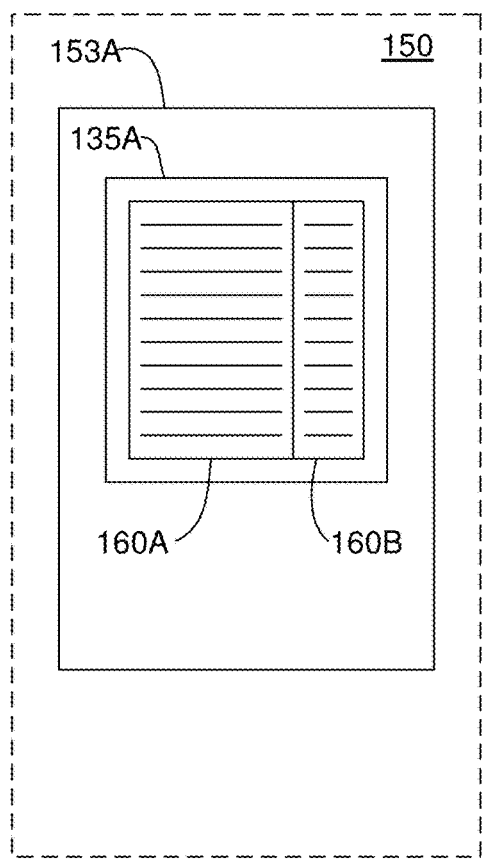
FIG. 7A
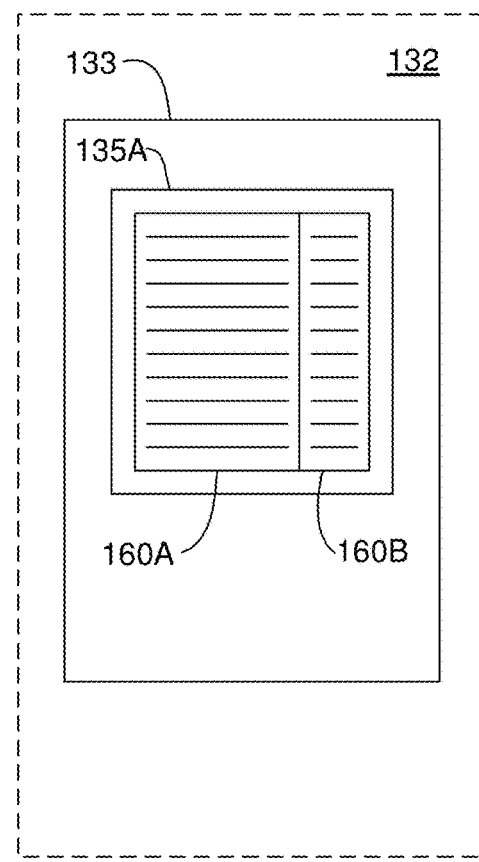
FIG. 7B

ACCESS MONITORING SYSTEM FOR COMPLIANCE

RELATED APPLICATIONS

This application is a Continuation in Part of U.S. patent application Ser. No. 16/268,491 filed Feb. 5, 2019, now abandoned, which is a Continuation in Part of U.S. patent application Ser. No. 15/989,169 filed May 24, 2018, now U.S. Pat. No. 10,198,883, which is a Continuation in Part of U.S. patent application Ser. No. 15/846,194 filed Dec. 18, 2017, now U.S. Pat. No. 9,984,518, which is a Continuation of U.S. patent application Ser. No. 15/461,831 filed Mar. 17, 2017, now U.S. Pat. No. 9,846,981, which is a Continuation in Part of U.S. patent application Ser. No. 14/737,518 filed on Jun. 12, 2015, now abandoned, which claims priority from Provisional Patent Application No. 62/011,156 filed on Jun. 12, 2014, all of which are expressly incorporated by reference herein in their entirety.

BACKGROUND

Field of the Invention

The present invention relates generally to electronic access systems and, more particularly, to methods and systems for monitoring access to fenced or unfenced remote locations, fields or outdoor sites such as, without limitation, hydrocarbon recovery locations, wellsites or any land or offshore based hydrocarbon recovery facilities.

Description of the Related Art

Industrial companies can have remote production facilities in remote environments. Such remote facilities can use manufacturing equipment, machines and systems to perform various operational stages of a planned work including building, preparation, production or maintenance. Depending on the work, the work schedules in such remote facilities can be continuous, a year around fashion, or seasonal, which are followed by operators or work crews assigned to the remote facility.

For example, hydrocarbon recovery or production fields, such as for oil or natural gas production, are often located in remote locations and include equipment such as drilling rigs, pumps and other related equipment and machinery. The equipment in such remote fields is most often attended by on-site machine operators or crews whom actually operate or maintain the equipment, although the company owning the facility is located in a city often hundreds of miles away.

During an active operation cycle, the operators generally can operate the equipment such as the drilling equipment. However, if the operation is not a day-to-day activity, for example, a post drilling work activity involving hydrocarbon recovery using pumps and storage tanks, a maintenance operator or a maintenance crew can visit the field periodically to observe the operation in the facility.

In either case, in the instances, for example, where the facility in the field experiences a problem, the operator must then solve the problem or alert the company for help. The problem can be related to the machinery malfunction, vandalism or natural catastrophe related given the remote location of the facility.

In today's economy, the lost productivity and opportunity due to unwanted down time generated by such problems can be extremely costly if a service crew or an engineer is not dispatched on time to the remote site of the facility by the company.

Therefore, it is important for the company to monitor the activity of the operators on the remote site to reduce the amount of facility down time to a minimum while increasing reliance by getting instantly updated about problems, changes or modifications in the facility. It is also important for the company to remotely monitor access of vehicles into and out of the remote site and collect information related to the vehicle activity in the remote field.

Thus, from the foregoing, there is an unaddressed need exists for a novel system and method in the industry to address the aforementioned deficiencies quickly and efficiently.

SUMMARY

An aspect of the present invention includes a compliance monitoring system for hydrocarbon wellsites, the system including: a cloud system server including a system processor and a system data storage, the cloud system server is configured to manage a compliance monitoring service of a hydrocarbon wellsite; an access control station identifiable by the cloud system server with its geolocation located in a hydrocarbon wellsite which is compliance monitored, the access control station including a vehicle sensor to detect vehicles and a checkpoint monitor having a server in communication with the cloud system server; a mobile computing device of a user configured to transmit a user access code, including a user ID code and a user activity code, and a user geolocation information of the mobile device to the cloud system server, wherein the user access code is analyzed by the cloud system server to authenticate the user ID and to determine the user activity status indicating whether the user is in check in activity to enter or check out activity to exit the hydrocarbon wellsite; wherein upon receiving the geolocation information of the mobile device, the cloud system server identifies the access control station that is closest to the mobile computing device of the user and transmits the access code to the server of check point monitor at the access control station; wherein upon receiving vehicle sensor data from the vehicle sensors indicating the presence of a vehicle and the user access code received from the cloud system server, the server of the checkpoint monitor analyzes the user access code to authenticate the user in the vehicle and to determine the user activity status; wherein the cloud system server, the checkpoint monitor of the access control station and the mobile computing device are connected over the Internet; wherein the compliance monitoring system further includes at least one first intermediate cloud server connected with both the cloud system server and the server of the checkpoint monitor over the Internet; wherein the at least one first intermediate cloud server relays the user access code from the cloud system server to the server of the checkpoint monitor; wherein the at least one first intermediate cloud server relays telemetry data received from the server of the checkpoint monitor to the cloud system server, the telemetry data is gathered at the access control station; wherein the at least one first intermediate cloud server includes at least one IoT cloud server; wherein the compliance monitoring system further includes at least one second intermediate cloud server connected with both the cloud system server and the server of the checkpoint monitor over the Internet; and wherein the at least one second intermediate cloud server includes at least one storage cloud server to store screenshots taken by cameras of the checkpoint monitor of the access control station.

Another aspect of the present invention includes a method for compliance monitoring of hydrocarbon wellsites, the method includes: providing a cloud system server including a system processor and a system data storage, the cloud system server configured to manage the compliance monitoring of a hydrocarbon wellsite; providing an access control station identifiable by the cloud system server with its geolocation located in a hydrocarbon wellsite that is compliance monitored, the access control station including a vehicle sensor to detect vehicles and a checkpoint monitor having a server in communication with the cloud system server; transmitting from a mobile computing device a user access code and a geolocation information of the mobile computing device to the cloud system server, the user access code including a user ID code and a user activity status code indicating whether the user enters or exits the hydrocarbon wellsite; receiving and analyzing the access code at the cloud system server to authenticate the user and to determine whether the user checks out of or checks in the hydrocarbon wellsite; identifying, at the cloud system server, the access control station that is closest to the mobile computing device using the geolocation information; transmitting the access code from the cloud system server to the server of the checkpoint monitor of the access control station that is closest to the mobile computing device of the user; receiving vehicle sensor data, at the server of the checkpoint monitor, from the vehicle sensors indicating the presence of a vehicle and the user access code received from the cloud system server, wherein the server reanalyzes the user access code to authenticate the user at the access control station and to determine whether the user checks out of or checks in the hydrocarbon wellsite; wherein the system cloud server, the checkpoint monitor of the access control station and the mobile computing device are connected over the Internet; wherein transmitting the access code from the cloud system server to the server of the checkpoint monitor of the access control station includes: transmitting the user access code to at least one IoT cloud server from the cloud system server, and transmitting the access code to the server of the checkpoint monitor from the at least one IoT cloud server after receiving the access code from the cloud system server; and wherein the a method for compliance monitoring further including storing screenshots taken by a camera of the checkpoint monitor to the at least one storage server.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIG. 6 is a schematic view of an exemplary assignment data table for a monitored location, the assignment data table including assignment status data and activity status data;

FIGS. 7A-7B are schematic views of the assignment data table stored in the system server's database and the checkpoint monitors' data bases respectively;

DETAILED DESCRIPTION OF THE EMBODIMENTS

Figure 1:
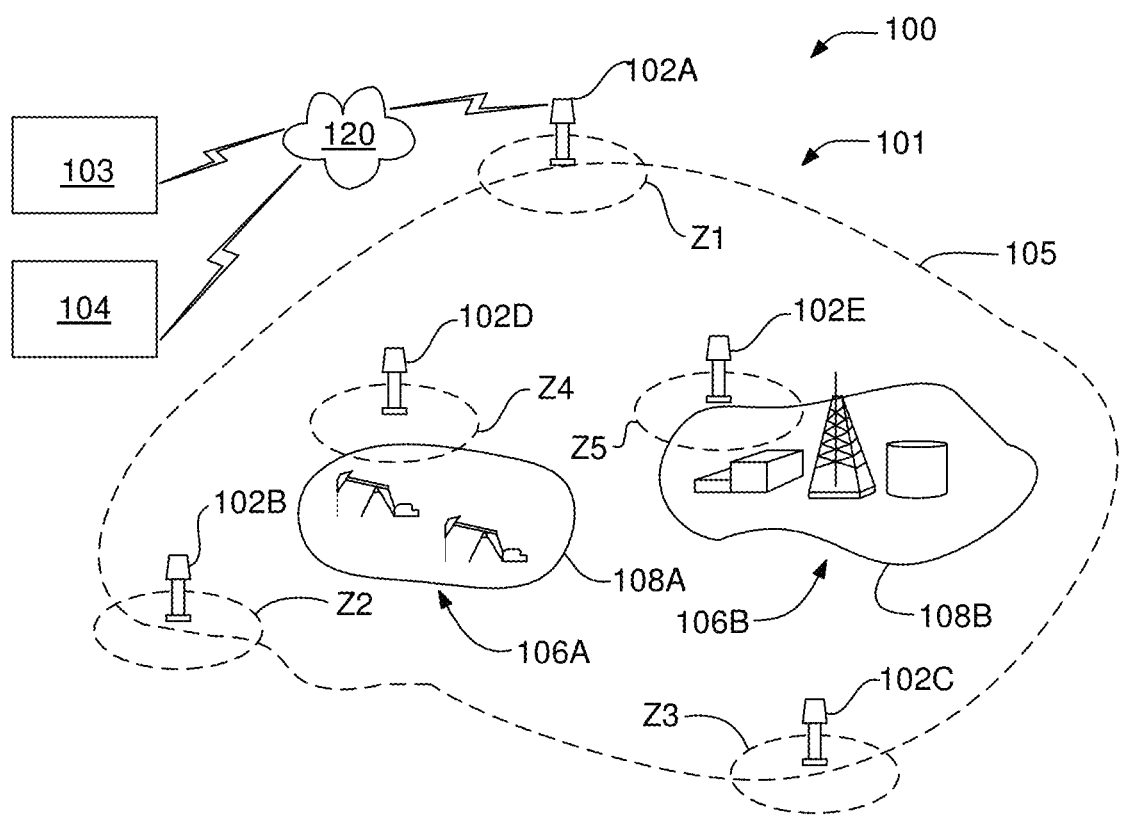
FIG. 1 is a schematic view of an embodiment of an exemplary implementation of a monitoring system of the present invention.

Unlike office buildings or large plants in urban areas with walls, fences and gates, remote oilfield worksites or work locations have porous and loosely defined perimeters. It is often a challenge for the oil companies to ensure safety and security of the personnel working in such remote worksites in oilfields. Personnel may enter and leave such worksites without being accounted for. In one embodiment, the present invention may solve this problem by introducing voluntary checkpoints, monitoring and identifying noncompliant entries and exits; then, resolving such noncompliant events to obtain an accurate headcount of the personnel on such remote worksites in oilfields, thereby increasing safety and security of the personnel in such locations. Embodiments of the present invention may provide systems that may enforce time and attendance compliance by way of monitoring the activity of authorized employees or users of remote locations. By tracking employee compliance with scheduled work assignments, for example, in remote hydrocarbon fields, such as oilfields, employer organizations may achieve high employee time and attendance compliance levels in such environments, which may reduce maintenance and production cost while increasing productivity.

In one embodiment, the present invention provides a compliance monitoring system and a method that address the monitoring of employee compliance at remote work sites such as hydrocarbon recovery or production fields for oil or natural gas production or recovery. This embodiment will be described below with respect to FIGS. 1-11D.

In another embodiment, the compliance monitoring system of the present invention may include an access control station including an access control unit in connection with a checkpoint monitor to further monitor vehicles and users of the compliance monitored field. This embodiment will be described below with respect to FIGS. 12A-18.

In another embodiment of a compliance monitoring system of the present invention, at least one system server may analyze a user related data received from a user computing device, such as a smart phone, to authenticate the user and to determine whether the user is entering or exiting the hydrocarbon wellsite and to identify the location of the access control station where the user entry or exit occurs. The at least one server may be a cloud computing system server. This embodiment will be described below with respect to FIGS. 19-25B.

The system may collect employee access activity data from small footprint by rapidly deployable electronic checkpoint monitor devices placed around the monitored locations and their sublocations, creating a virtual or electronic fence for each location. Such collected data from all the checkpoint monitors is then transmitted to a central monitoring server or system server where the collected data is integrated, analyzed and presented to the location administrators with activity reports and visual confirmation of every event, and the like. The system and method of the invention may track employee activities and allow for remote visual monitoring of the remote work sites for client organizations. The monitoring system may further utilize a wide area network, including routers, servers and software to provide real-time compliance monitoring of employees and other personnel of the remote worksites, along with visual monitoring of the remote work site.

By ensuring compliance with assignment schedules, some of the additional benefits of the system of the present invention may be as follows: (1) minimizing or preventing equipment breakdowns and the resulting downtime; (2) ensuring equipment reliability; (3) ensuring timely repairs to equipment; (4) ensuring application of organization policy and procedures in remote work environments; (5) improving employee safety in such fields; (6) aligning payroll costs with the hours actually worked; (7) reducing administrative time in managing such remote fields; (8) reducing time spent on the administrative audits related to employee time and attendance for compliance; (9) providing asset protection and theft prevention benefits by deterring unauthorized entries, thereby reducing theft and potential safety issues; (10) providing verifiable data for the third party invoice approvals by providing access to past check-in and check-out data to verify the accuracy of the invoicing; (11) providing crew management benefits by providing instant visibility to the crew locations and observing their activities when onsite supervision is not readily available; (12) providing safety benefits by observing safety violations of unsupervised crews and promoting compliance; and (13) providing cost benefits by potentially reducing insurance premiums.

FIG. 1 shows an embodiment of an exemplary monitoring system 100 of the present invention related to an exemplary map view of a location 101, or a field, such as a hydrocarbon field for oil or natural gas production or recovery. Terms "location" or "field" may refer to remote location, remote field, remote site, site, area, work location, work field, worksite, work area, oilfield, oilsite, wellsite and the like. The monitoring system 100 comprises one or more checkpoint monitors (CM) 102 that are in communication with a system server 103 which may be, in turn, in communication with a client interface 104. The system server 103 may be located in a monitoring center of a monitoring company and may be configured to communicate with the checkpoint monitors in the monitored field and with the client organizations via client interfaces 104 over one or more communication networks 120, such as one or more wide area networks 120, i.e., computer networks, the Internet, telephone networks, mobile phone networks and the like. Using the checkpoint monitors 102, the system 100 may provide real time compliance monitoring of the users or employees at the monitored location 101 and report the collected data to the client organizations via the monitoring center server 103.

In one embodiment, an exemplary compliance monitoring using the checkpoint monitors 102 of the system 100 may be performed to obtain user related information such as at least one of the user assignment status and the user activity status of the user associated with the location 101. The location 101 may be defined by a geographical perimeter 105 which may be fenceless or fenced. In this application, a fenceless location may define a location with highly porous borders, which may not have a visible and/or physically protruding fence structure surrounding at least a portion of the monitored location, and which may not have any invisible and/or non-protruding structure surrounding at least a portion of the monitored location, such as a buried sensor line or a system providing an invisible detection network around or over the monitored location. There may also be one or more work locations or worksites within the location 101, such as a first work location 106A, or a first location, including for example oil pumps, and a second work location 106B, or a second location, including for example a drilling rig and related equipment and storage facilities. The first and second work locations 106A and 106B may have geographical perimeters 108A and 108B respectively, which may be fenceless or fenced. One or more checkpoint monitors 102, such as 102A, 102B, 102C, 102D and 102E may be installed along the perimeter 105 of the location 101 and, optionally, along the perimeters 108A and 108B of the first and second work locations 106A and 106B respectively. The checkpoint monitors 102 may be in communication with the system server 103 in a remote managing facility. As will be described more fully below, each checkpoint monitor 102 in the location 101 may be surrounded by a checkpoint zone Z. Checkpoint zones Z, such as Z1, Z2, Z3, Z4 and Z5 may be defined as circular areas or cylindrical space around each checkpoint monitors 102.

The geographical perimeters 108A and 108B of the first and second work locations 106A and 106B may be nested in the geographical perimeter 105 of the location 101. Thus, the first and second locations 106A and 106B may be defined as sublocations of the location 101 which may be defined as a higher status location, or higher location, with respect to the nested smaller sublocations. When there is at least one sublocation nested in one or more higher locations as exemplified in FIG. 1, a user status information may be synchronized by obtaining and comparing the user status information from the sublocations and the user status information from the higher location in order to determine the user's status in such nested location. For example, when a user checks out of a sublocation, it still remains in checked in status on the associated higher location. If the user is in checked in status on a sublocation and then checks out of a high location, the user will be assumed as checked out on all sublocations nested by the higher location automatically. Furthermore, when a location includes multiple checkpoint monitors, the user status information may be synchronized automatically as soon as the status is updated in one of the checkpoint monitors.

Figure 2A:
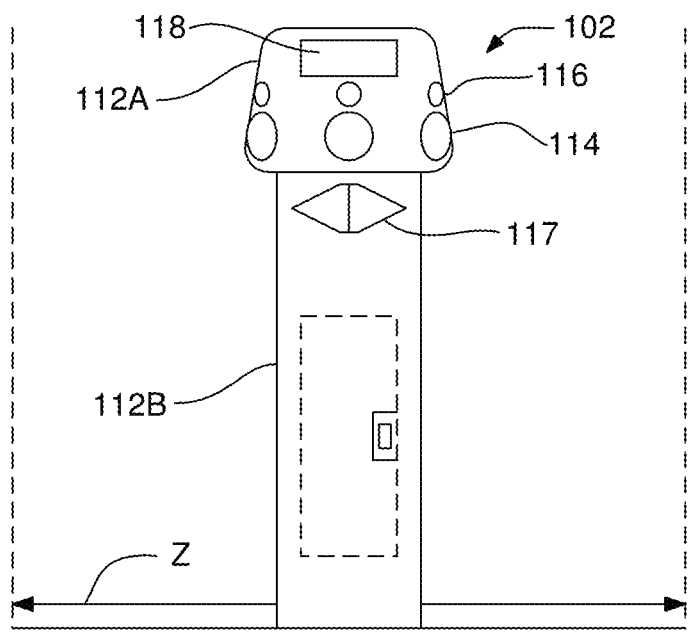
FIGS. 2A-2B are schematic side and top views of an exemplary embodiment of a checkpoint monitor device of the monitoring system of the present invention.
Figure 2B:
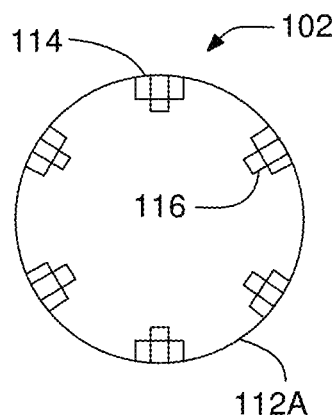

FIG. 2A shows the checkpoint monitor 102 including a head section 112A and a body section 112B in its installed state in a monitored location. FIG. 2B shows, in top view, the head section 112A may be cylindrical and may comprise a plurality of cameras 114 and a plurality of presence sensors 116 for having 360 degrees image capture and sensing capability. The presence sensors 116 may sense any intrusion, presence or entry, such as an entry of an object, person or both, into the checkpoint zone Z. The presence sensors 116 and the cameras 114 may be integrated to work in a synchronized manner to sense and image 360 degrees. The presence sensors 116 and the cameras 114 may also operate individually to determine a user's direction of access, i.e., entry and exit direction, in the checkpoint zone Z, i.e., to determine user's direction of entry into and exit out of a checkpoint zone. In this respect, the checkpoint zones Z may be defined by the range of the presence sensor 116 around the checkpoint monitors 102. An exemplary checkpoint zone Z may be in the range of 1-100 meters, preferably 2-10 meters in diameter. A display 118 on the head section 112A may display various status related information in use. Warning and guide lights 117 may give users visual warnings for valid and invalid operations using different color light, such as red for invalid operations and green for valid operations. The warning and guide lights may also be configured as arrows to point at in and out directions of the monitored location to guide users. The body section 112B may contain critical inner components of the checkpoint monitors 102, such as a server having a processor, a data storage and a control software with various modules, power connections and/or power supply, various communication, data capture and detection hardware and the like devices.

Figure 3:
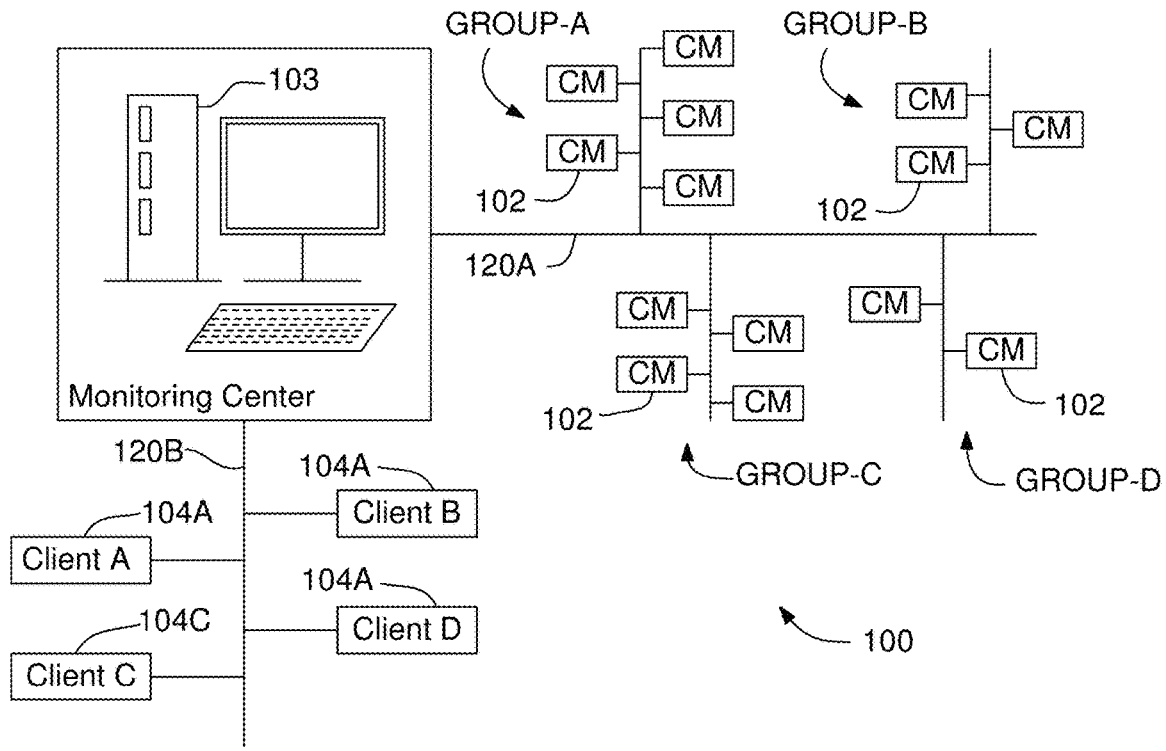
FIG. 3 is a schematic diagram illustrating an exemplary embodiment of the monitoring system.

FIG. 3 shows an exemplary embodiment of the monitoring system 100 integrating the system server 103 with a plurality of checkpoint monitors (CM) 102 installed in each monitored location and client interfaces 104 of each client organization associated with the monitored locations. In this embodiment, an independent monitoring organization may own the system server 103 and the checkpoint monitors 102, and operate the compliance monitoring process for the client organizations in the client organizations' locations. Alternatively, the system 100 including the system server 103 and the checkpoint monitors 102 may be owned by an organization having locations to be compliance monitored.

The checkpoint monitors 102 may be in communication with the system server 103 via a first communication network 120A or a first network, which may be a wireless or wired communication channel, or both. The client interfaces 104 may be in communication with the system server 103 via a second communication network 120B or second network, which may also be a wireless or wired communication channel, or both. Accordingly, the monitoring system 100 may manage a multiplicity of locations having at least one checkpoint monitor 102 and for a multiplicity of organizations related to such locations. For example, a first group (Group-A) of checkpoint monitors 102 may be installed in a first location to compliance monitor for a first client 104A; a second group (Group-B) of checkpoint monitors 102 may be installed in a second location to compliance monitor for a second client 104B; a third group (Group-C) of checkpoint monitors 102 may be installed in a third location to compliance monitor for a third client 104C; and a fourth group (Group-D) of checkpoint monitors 102 may be installed in a fourth location to compliance monitor for a fourth client 104D, and so on.

Figure 4:
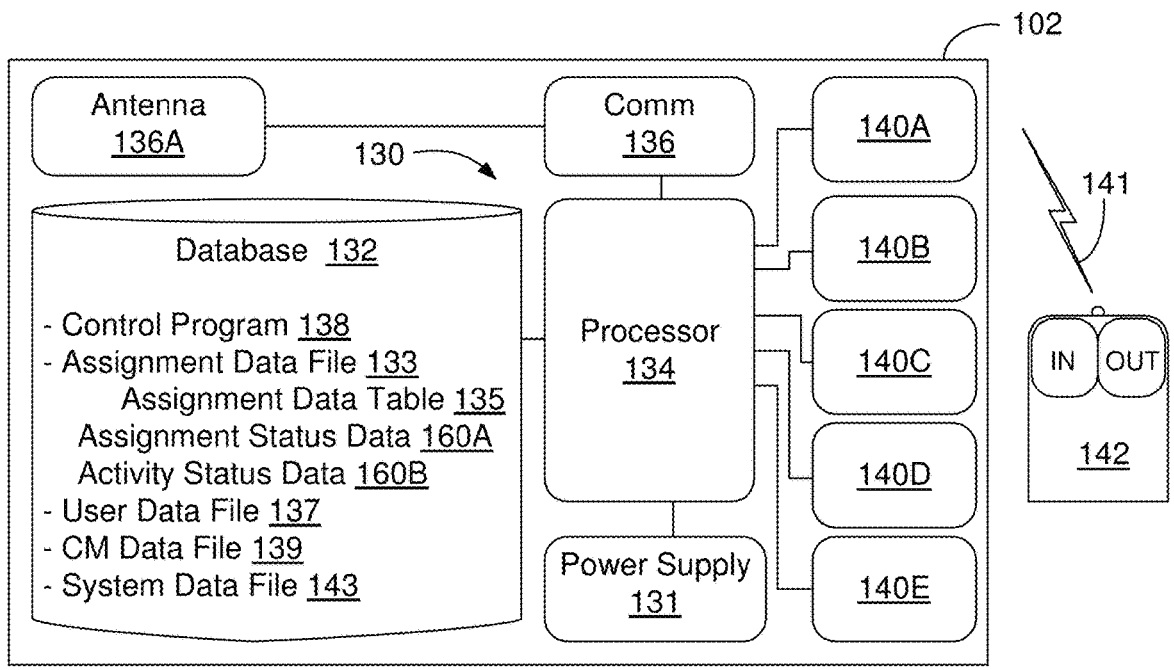
FIG. 4 is a schematic block diagram illustrating an embodiment of an exemplary checkpoint monitor device with a checkpoint server including a processor and a data storage and exemplary modules employed during compliance monitoring of users.

FIG. 4 is a block diagram illustrating components of checkpoint monitor 102 including a checkpoint server 130, or a local server, with a data storage 132, or database storing a control program 138, or a checkpoint monitor software, to operate all the functions of the checkpoint monitor that will described below, a processor 134, and a communication module 136. The checkpoint monitor may also include a plurality of modules 140 that may be connected to the processor 134 while their corresponding software modules may be stored in the checkpoint server 130. An access module 140A, or a receiver/decoder module, receives an access code signal 141, including an access code, from an access code device 142 operated by a user accessing the checkpoint zone Z of the checkpoint monitor 102. The checkpoint monitor 102 may be powered by a power supply unit 131 which may be connected to a solar panel or power network to receive power.

The access code device 142 may be a dedicated wireless device, or a wired data entry device that is part of the checkpoint monitor 102, or a mobile device operable by the user like a smartphone or tablet. The access code in the access code signal 141 may comprise a user identification (ID) code component and a user activity code component. The user ID code may be a unique number or barcode associated with the user and may be used to identify both the access code device 142 and the user who is authorized to carry and operate it. The user activity code may identify an activity status of the user, and which may be real time selected by the user when the access code device 142 is operated within or adjacent the checkpoint zone Z. The combined user identification (ID) code and activity code may be presented to the checkpoint monitor and/or the server by means of a barcode or other electronic transaction in order to perform a user activity operation.

There may be a plurality of user activity codes which may be used to define various user activities to track the user compliance while attending the scheduled assignments in the location 101 (FIG. 1). In one embodiment, the user may select the activity code by operating activity buttons of the access code device 142 by pressing on them. Operating activity buttons of the access code device 142 may also transmit the access code signal 141 including both the user identification code and the selected user activity code. Each activity button on the access code device 142 may have assigned activity indicators. In this embodiment, for example, selecting the button with "in" indicator may add "check in" activity code to the access code signal indicating that the user is entering the monitored location; and selecting the button with "out" indicator may add "check out" activity code to the access code signal indicating that the user is exiting the monitored location. Although in this example the access code device 142 includes two activity buttons, it may have multiple buttons, each assigned to one or more user activity codes. Further, the buttons used in this embodiment may be replaced with any pressure or touch activated surfaces, zones or devices such as keys, keypads, touchpads or touchscreens As will be more fully described below, the user ID code and the user activity code may be used to determine user's assignment status and activity status by the checkpoint monitors 102 in the monitored location.

In alternative embodiments, the access code device 142 may have more activity buttons or zones with assigned activity indicators. Exemplary additional activities may be related to the reporting progress on a pre-assigned specific task in the monitored location by utilizing activity buttons indicating activities, such as "complete", "canceled", or "continue", etc. Other exemplary activity buttons or zones may be for reporting damage in the equipment, security or safety related aspects, and the like. In another embodiment, a mobile phone or smartphone may be used as an access device using a suitable mobile phone application allowing an access code signal to be sent to the checkpoint monitor via the Internet through a mobile phone network and a server managed operation.

A keypad or touchscreen of the mobile phone may be used to select a wide variety of activity indicators utilizing either pre-assigned keys or by simply typing in to add activity codes to the access code signal which also carries user ID or the user ID code. As described above, each activity code may indicate a unique user activity status. The access code signal 141 may be received and decoded by the access module 140A, and the decoded user ID code and activity code may be stored in the data storage 132 and also shown on the display 118 on the checkpoint monitor 102.

A sensor module 140B may be used for peripheral presence detection using for example infrared radiation, sonar, laser or audio detection sources. The sensor module 140B may be integrated to and operate the sensors 116 (FIGS. 2A-2B). An image module 140C may be used for peripheral imaging, activity tracking and recognition purposes, and may use video, still imaging (photos) and infrared imaging. The image module 140C may be integrated to and operate the cameras 114 (FIGS. 2A-2B). The image module 140C may be configured to take one or more pictures, including a user picture, once an intrusion into the checkpoint zone Z is sensed by the sensor module 140B. A user access and routing module 140D may be used for automated access and routing to, for example, control automated gates if there is any. An integration module 140E may provide data integration between the modules 140A-140D and their corresponding hardware and other required networking. The communication module 136 may be a transceiver module to establish wireless communication between the checkpoint monitors 102 and the system server 103 via the communication network 120A.

An exemplary access module 140A for user identification may include one or a combination of the following technologies: generic 300 to 900 MHz transmitters and receivers, RFID technology (e.g., HID tags and badge readers), biometric reading devices, proprietary software authentication via proximity user cell phone connectivity using Bluetooth or WiFi at checkpoint, face recognition software, license plate detection software (e.g., locally installed software or Google cloud vision API, IBM Watson visual recognition, Open ALPR Cloud API, IBM i2 iBase Plate Analysis, etc, or T2 systems ANPR). An exemplary sensor module 140B for presence detection may include one or a combination of the following technologies: motion detectors with single or combined technologies, for example, passive infrared sensors (e.g., Panasonic AMN), passive infrared array sensors (e.g., Panasonic Grid Eye), software analytics for motion detection on camera images (standard visible light/IR cameras and thermal imaging cameras e.g. FLIR Lepton), Light Detection and Ranging Sensors a.k.a. LiDAR which is a Laser based technology (e.g., Leddar IS16, Quanergy M8 or S3), ultrasonic motion detectors, and microwave motion detectors, and the like. An exemplary image module 140C for visual identification or imaging may include one or a combination of the following technologies: visible light and infrared combination cameras (e.g. ELP 720P, FLIR PE133E) and thermal imaging cameras (e.g., FLIR TCX). For communications between the checkpoint monitors 102 and the system server 103, an internet based network may be used and to access the Internet on remote locations either a cellular modem (e.g., Multitech MTR-LAT1, Sierra Wireless AirLink RV50x) or a satellite modem (e.g., Newtec MDM2200 IP Satellite Modem) may be used.

The data storage 132 stores various files including data that supports many functions of the checkpoint monitors 102, which are used by the control program 138 to operate the checkpoint monitor. The data storage 132 may store the control program 138, or the checkpoint software 138, and a plurality of data files including, but not limited to, an assignment data file 133 including a data related to user assignment status information and various predetermined user status information, a user data file 137 including user activity pictures and assigned ID codes; checkpoint monitor (CM) data file 139 including data related to the checkpoint monitor's assigned ID and GPS coordinates, location map; a system data file 143 including data related to the configuration of the checkpoint monitor, activity logs, system logs, activity media recordings (pictures, videos etc.). As also exemplified in FIGS. 6-7B, the assignment data file 133 stored in the data storage 132 may comprise at least one assignment data table 135 including assignment status data 160A and activity status data 160B of a plurality of authorized users assigned for work in that particular location where the checkpoint monitors storing the assignment file are located. The assignment status data 160A may be a list indicating each user's assignment status with user's identification, such as user name; company name; location identification, and the specific date and time that indicate each user is scheduled for work. For example, A. Smith; Alpha, Inc.; Houston-TX-USA, Field-A1 Jan. 9, 2017; 08:00 AM-10:00 AM. As described above, in one embodiment, the user's identification may be associated with the access code device and the user ID code transmitted from the access code device assigned to the user, which is received by the checkpoint monitor and, after decoded, compared against the users on the assignment data table 135 stored in the data storage 132. In this example, this company authorized employee is expected to be checked in this particular location at 08:00 AM and checked out at 10 AM. At registration time, a consistent dataset is collected from authorized employees that allows to classify them by categories or classes. Such categories allow access or banning of certain group of users in an efficient manner.

Activity status data 160B of the users may also be kept on the assignment data table 135 and next to the assignment status data 160A. In this configuration, the assignment data table includes each user's current activity and assignment status. As described above, the user activity code indicating the user activity status may be transmitted within the access code signal 141 along with the user ID code. However, differing from the user ID code which may also be the identification of the access code device of the user, the user activity code may be selected and transmitted by the user on the location using the readily available selectable functions of the access code device 142 (FIG. 4). In the above example, when the user selects "in" option as he is entering the monitored location, his activity status on the assignment data table 135 is updated as "in" with check in timestamp. Similarly, when the user selects "out" option as the user is leaving the monitored location, the user's activity status on the assignment data table is updated as "out" with check out time stamp. The checkpoint monitor (CM) data file 139 stored in the data storage 132 may include IDs of all the checkpoint monitors, such as a unique number assigned to each checkpoint monitor, in the monitored location. The assignment data table 135 may contain the most recent activity status update conducted by a user at any checkpoint monitor 102 at the monitored location or an activity status update enforced by the system server 103. This most current activity status may be referred to as static status or the current status.

In this embodiment, user's assignment status data about the assigned work and activity status data about user's entry to and exit from the monitored location may be monitored and registered by the checkpoint monitor 102. User assignment data and activity data are transmitted from the checkpoint monitor server 130 of the checkpoint monitor 102 to the system server 103 and stored thereon.

The system data storage 132 may be in the form of non-transitory computer readable medium configured to store files, programs, tables and executable computer instructions. A computer program product stored on a non-transitory computer readable medium may include instructions executable by the processor or controller of the server to operate the checkpoint monitor 102.

Figure 5:
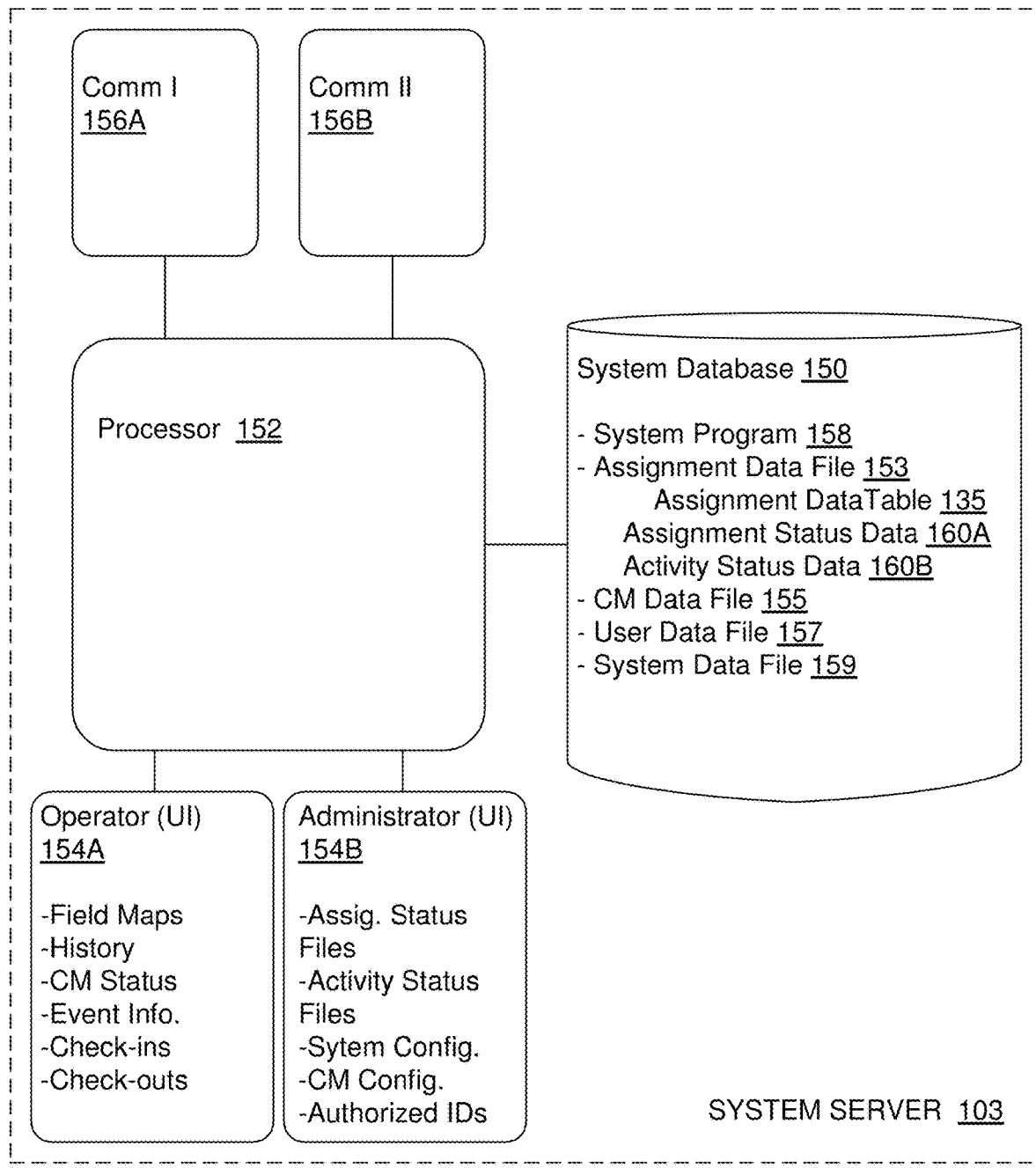
FIG. 5 is a schematic block diagram illustrating an embodiment of an exemplary system server operating the monitoring system of the present invention.

FIG. 5 is a block diagram illustrating the monitoring center server 103, or the system server 103, with a data storage 150 or system database, a processor 152, an operational interface 154A, an administrative interface 154B, a first communication module 156A and a second communication module 156B, a system control program 158, or system software 158, to operate the compliance monitoring system, and various program modules stored in the data storage 150. The system may also have multiple levels of access with different features available on each level. Within the context of this invention, users in different professional classes may belong to an internal group or external group. An internal group may comprise technical administrators, operations management, and technicians. External groups may comprise client administrators, and operators or employers (referred to as "users" in this application). Depending on the group and level, different filters may be applied to the data presented. For instance, an external group user may not be able to see engineering or technical details on the data presented to them as it would be to a user in an internal group. An external operator should be able to see the data pertaining only to his activity, not the engineering data. An external client administrator may see the activity pertaining to his/her locations and users, but not the others or the engineering data. An internal operations manager may see locations and user activity for all the existing and past clients, and so on.

The monitoring system 100 may be managed by the system server 103 using the system program 158 and data stored in the data storage 150. The data storage 150 stores various program files including data that support many operations of the monitoring system 100.

The first communication module 156A may communicate with checkpoint monitors 102 in the monitored location. The first communication module 156A may apply network data encryption and decryption to the data sent and/or received from the checkpoint monitors 102. The first communication module 156A may transport data securely and reliably related to the transactions between the control program 158 of system server 103 and the control software 138 of the checkpoint monitors 102. The second communication module 156B may communicate with the client organizations via client interfaces 104. The second communication module 156B may apply network data encryption and decryption to the data sent and/or received from the checkpoint monitors 102. The second communication module 156B may register time of various data received from the client interfaces 104 and processes commands and responses to and from the client interfaces 104.

The control program 158, or the system software 158, of the system server 103 may include many utility program modules for implementing various features used in the system 100. Exemplary utility program modules may be as follows: a checkpoint monitor set up and test program module for introducing checkpoint monitors to the system 100 by adding, detecting and testing checkpoint monitors 102 as well as assigning locations and IDs for them; a data control program module to retrieve and store data in the data storage 150; and an interface program module to provide and control the communication interfaces. The operational interface 154A allows monitoring center staff to track the real time operation of the monitoring system 100 and assist the operation by providing commands and needed information based on the observations. The administration interface 154B may handle administrative aspects of the monitoring system 100, such as, but not limited to, system configurations, management schedules, client related operations, user activity status information and the configuration of monitoring checkpoints. Optionally, there may be an automatic pre verification and validation operation in place before handling such administrative aspects.

The data storage 150 may store data files used in the operation of the compliance monitoring process using the data received from the checkpoint monitors; data files received from and sent to the client organizations; and data files used in operating the monitoring system. The data files stored in the data storage 150 may include, but not limited to, assignment data files 153 including assignment data related to user assignment status information and various predetermined user status information of each client organization; checkpoint monitor data file 155 including each checkpoint monitors assigned ID and GPS coordinates, location identifiers and location maps; a user data file 157 including user pictures, assigned ID codes and their organizations; a client data file including services requested by each client organization and related information; a system data file 159 including data related to the configuration of the system server 103.

The system data storage 150 may be in the form of non-transitory computer readable medium configured to store files, programs, tables and executable computer instructions. A computer program product stored on a non-transitory computer readable medium may include instructions executable by the processor or controller of the server to operate the system 100.

As also shown in FIGS. 6-7B, the assignment data files 153 stored in the data storage 150 may comprise the assignment data tables 135 including assignment status data 160A of a plurality of authorized users assigned for work in a particular location of each organization acquiring compliance monitoring. As will be described more fully below, in this embodiment, the assignment data tables 135 in the data storage 150 may be updated with the activity status data 160B received from at least one of the checkpoint monitors 102 in the monitored location and the updated assignment data table 135 in the data storage 150 replace the assignment data tables in the data storages 132 of all the check point monitors 102 installed in the monitored location. In this respect, the data storage 150 may have a plurality of assignment data files 153, such as 153A, 153B, 153C, 153D and so on, each belonging to a client organization acquiring compliance monitoring services from the monitoring organization (See FIG. 3). Each client organization may, in turn, have a plurality of assignment data tables 135, such as 135A, 135B, 135C, 135D and so on, each related to a corresponding monitored location. It is understood that, depending on the task in the monitored location, there may be more than one assignment data table may be used so that different task performed in for example sublocations shown in FIG. 1 may be monitored by the client organizations.

The monitoring center infrastructure may be hosted on a monitoring company managed location. Server computing hardware may be a single or a multitude of tower or rack servers (e.g., Dell PowerEdge Servers). Such servers may be provided with a multitude of communication networks configured with a combination of networking routers (e.g., Cisco 4351 ISR) and or switches (e.g., Cisco Catalyst 3650 Series) protected by security devices (e.g., Cisco ASA 5500-X Series Next-Generation Firewall). A cloud based infrastructure may be for example the Amazon Web Services or Microsoft Cloud where the system may be hosted on their physical systems with greater flexibility for implementation and growth. Custom software developed on many alternative environments may be installed on any of the systems mentioned above. Database implementations like SQL server or Oracle may be utilized as well.

FIG. 6 illustrates an exemplary assignment data table 135A including assignment status data 160A and activity status data 160B for the users authorized to work in the same monitored location. As also described above, the assignment status data 160A may include identifications of the users, their company, the region where the monitored location is located, location identification, dates and specific hours that they have scheduled work assignments, identification of the checkpoint monitors located in the location, for example, checkpoint monitors (CM) with numbers 1, 2, 3, 4 and 5. The assignment status data may also include user driver license information and/or an image copy of the driver license. The activity status data 160B may include the last updated activity status of the users of the location. Accordingly, in FIG. 6, the activity status data 160B shows that the two of the users completed their tasks in the location earlier in the week and they are "out", and the last user is still in the location and "in" at according to the latest update. However, as mentioned above, the activity status data may include other activity or operational updates informing or reporting other operational activities from the monitored location via the user accessing the location.

FIGS. 7A and 7B illustrate both the data storage 150 of the system server 103 and the data storage 132 of the checkpoint monitors 102 storing the same assignment data table 135A of the client organization. If any of the users' activity status in the monitored location is updated by one of the 5 checkpoint monitors 102, the assignment data table 135A at the system server 103 is updated and the updated assignment data table version instantly replaces the old versions in all checkpoint monitors in the monitored location. Furthermore, when new assignment data tables are received through the client interface of the system 100, the assignments tables in all the checkpoint monitors 102 in the monitored location are replaced with the new assignment data tables.

In the data storage 150, the assignment data table 135A may be kept in the assignment data file 153A of the client organization, which may hold many assignment data tables 135 for the same organization and for the monitored location as well as a multiplicity of other similarly monitored locations. The data storage 150 may hold a plurality of assignment data files 153 for a plurality of client organizations, wherein each assignment data file may hold a plurality of assignment data tables 135. Alternatively, the data storage 150 may store a single data table or data file including all the assignment status data and activity status data for all the client organizations as well as all the other data used to operate the monitoring system 100 for monitoring the locations of the client organizations. The system program 158 is configured to manage such single data table including all the data or data distributed into a plurality of data files or data tables, and these aspects are within the context of this invention.

Figure 8:
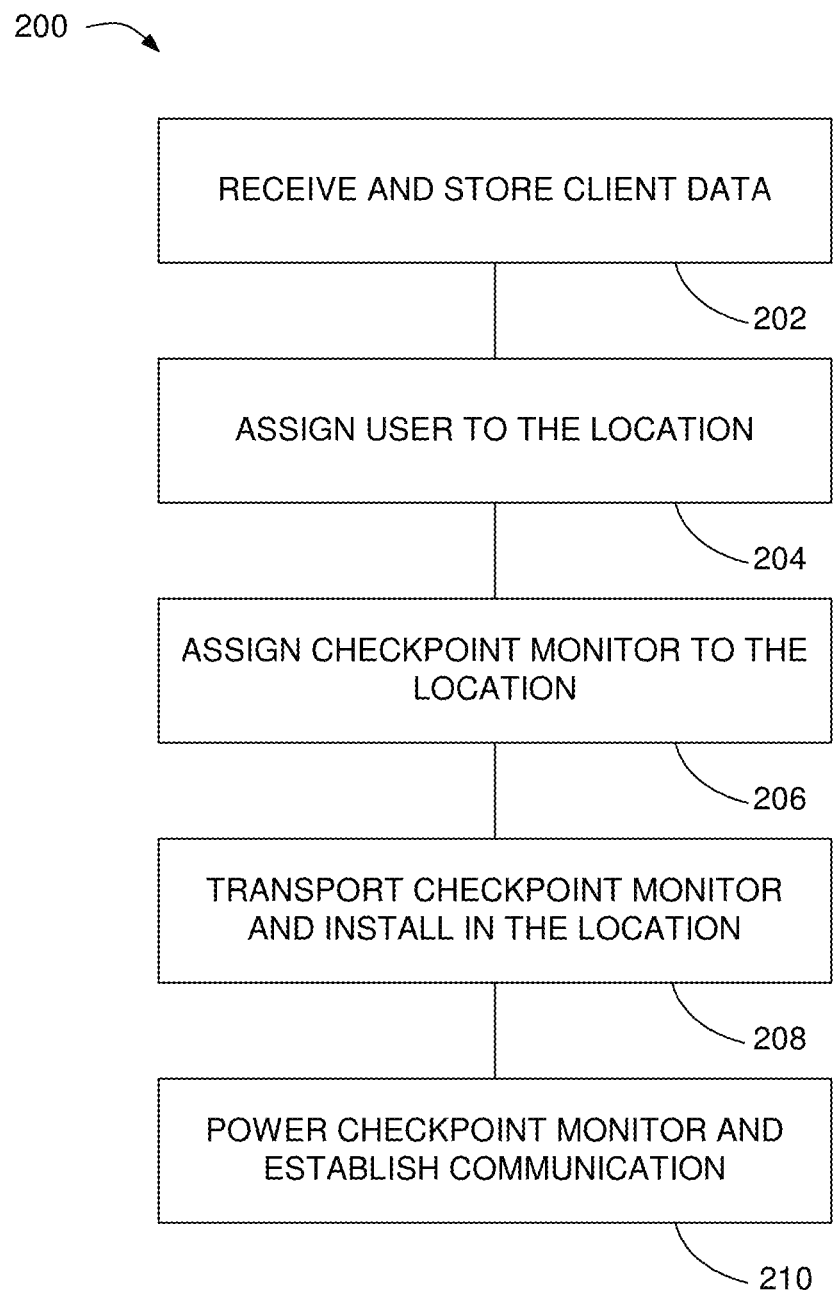
FIG. 8 is a flow chart illustrating an embodiment of an exemplary operation sequence implemented in the monitoring system of the present invention.

FIG. 8 is a flowchart 200 illustrating an exemplary operation sequence in the system 100 of the present invention. Referring to FIGS. 8 and 1-7B, accordingly, in step 202, client data may be received from the client organization via the client interface 104 and stored in the data storage 150 of the system server 103. The client data file may include a digital map of the field, a user assignment file including user IDs and pictures as well as assignment schedules. An assignment data table 135 including users' assignment status data and their activity status data may be created in the system server 103 and stored in the data storage 150.

In step 204, each user may be assigned to an access code device 142 with an access code identifying the user. The user's assigned access code may be linked to the user ID in the assignment data table 135. This operation links the user and the access code device to the assignment location identified on the assignment data table.

In step 206, each checkpoint monitor 102 may be assigned an ID and associated with the monitored location by either linking the assigned checkpoint monitor IDs to the location identified in the assignment data table 135 or directly linking them to the location at the system server 103. Similar to the user assignment to the field, the checkpoint monitor's setup process may be based on linking the checkpoint monitors 102 to the location of use. Resources that may be added or removed from the selected location may be users and checkpoint monitors. A checkpoint monitor may be deployed and added to a particular location stored on the system server 103.

Although it is part of the initial setup, the checkpoint monitors may receive periodic updates of the assignment data table 135 that includes the approved users established on the location and the latest activity status based on the latest synchronization for that location/sublocation. Once the users and the checkpoint monitors 102 are linked the monitored location, the assignment data table 135 may be downloaded from the data storage 150 of the system server 103 to the data storage 132 of the checkpoint monitors 102. Alternatively, as mentioned above, the data storage 150 may store a single data table or data file including all the assignment status data and activity status data for all the client organizations. In this case of having the single data table, desired data is downloaded to the checkpoint monitor. Next, the user activity status may be updated to its initial setting as checked out to make the checkpoint monitors ready for monitoring in the location. This step completes the in-office set up process of the checkpoint monitors. In step 208, the checkpoint monitors 102 may be placed into their shipping containers, transported to the location and installed therein. In step 210, once installed in the field, the checkpoint monitors 102 are powered and wirelessly connected to the system server 103.

Figure 9:
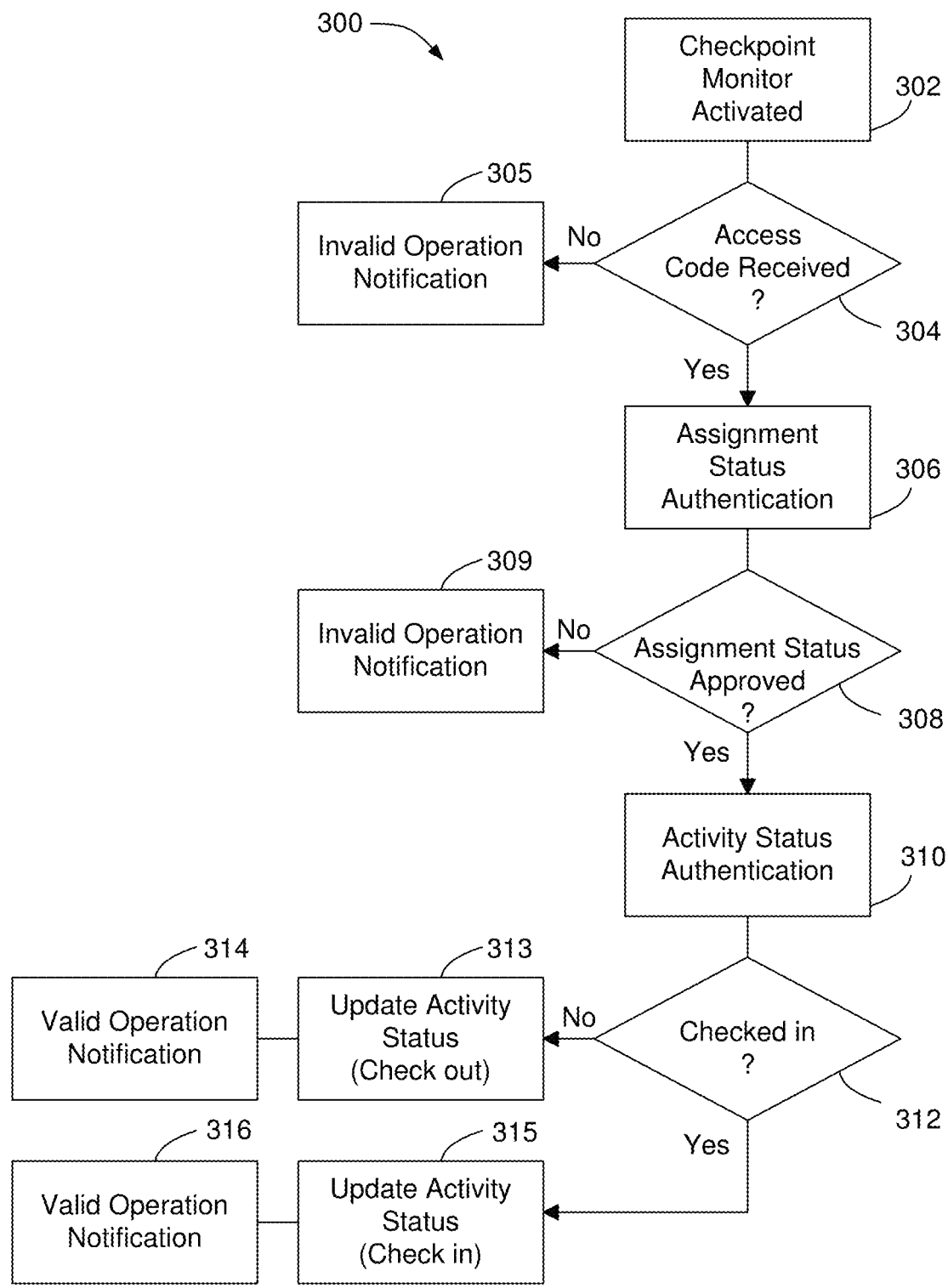
FIG. 9 is an exemplary embodiment of an algorithm performed by a checkpoint monitor to determine the assignment status and the activity status of the users.

FIG. 9 is a flowchart 300 illustrating, in one embodiment, a compliance monitoring algorithm that monitors access to the location to be monitored using the checkpoint monitors 102 installed in the location in connection with the system server 103. Each checkpoint monitor 102 may be configured to authenticate both the assignment status and the activity status of the user by analyzing the access code that is transmitted to the checkpoint monitor 102 from a user access code device. Referring to FIGS. 9 and 1-7B, accordingly, in step 302, when an intrusion or activity in the checkpoint zone Z is detected, the checkpoint monitor 102 is placed in a standby mode for a predetermined time to receive an access code signal 141 from the access code device 142. In step 304, if no access code is received during the standby mode, the checkpoint monitor reports the event as an invalid operation in step 305 to the system server 103 of the monitoring center. The reported invalid operation in step 305 may be recorded as unauthorized entry which may be on the basis of a timeout or incomplete process. However, the invalid operation in step 305 may also occur when an entry into and/or exit out of the checkpoint zone detected by the sensors without receiving an access code. If an access code from the access code device is received in step 304, in step 306, the checkpoint monitor begins authenticating the assignment status of the user that transmitted the access code.

The assignment status of the user may be authenticated by comparing an ID code component of the access code against the user ID codes in the assignment data table stored in the data storage 132 of the checkpoint monitor 102 to determine whether the user is assigned for a scheduled work in the field. In step 308, if the assignment status of the user is not approved, i.e., the user is not assigned for a scheduled work in the field, although the user is an identifiable user with an access code device, the checkpoint monitor reports the event as an invalid operation in step 309 to the system server 103 of the monitoring center with the user ID involved. However, the invalid operation reported in step 309 may be still recorded as a valid event but with a lower score indicating that it is triggered by an authorized user, which may require an investigation by the client. As is understood, the system may include a plurality of such scoring levels indication specific combination of events done by the authorized users and unauthorized users.

If the assignment status of the user is approved in step 308, i.e., the user is assigned for a scheduled work in the field, in step 310, the checkpoint monitor begins authenticating the activity status of the user whose assignment status has been approved. The activity status of the user may be authenticated by authenticating the activity code or the activity status indicator added to the access code signal by the user to provide that the user is either in a check in activity to access the monitored location or in a check out activity to exit the monitored location.

In step 312, if it is determined that the user activity status is not check in, i.e., the user is selected "out" option when transmitting the access code signal, in step 313, the activity status of the user in the assignment data table, which is stored in the checkpoint monitor, may be updated as check out. Further, in step 314, the checkpoint monitor reports the updated check out status as a valid operation to the system server 103 of the monitoring center with the associated user ID. In step 312, if it is determined that the user activity status is check in, i.e., the user is selected "in" option when transmitting the access code signal, in step 315, the activity status of the user in the assignment data table may be updated as check in. Further, in step 316, the checkpoint monitor reports the updated check in status as a valid operation to the system server 103 of the monitoring center with the associated user ID. Furthermore, a scoring system may be used as a qualifier of a check-in or check-out operation based on the travel trajectory followed by a user as detected by the checkpoint monitor 102. The objective is to validate that the user enters the location premises if a valid check in is detected and that the user leaves the location if a valid check out is detected.

Once the system server 103 receives the transmitted activity status of the user with or without authenticated assignment status, the assignment data table 135A in the data storage 150 may be updated with the new activity status data of the user. In the following step, the updated assignment data table or data is transmitted to the rest of the checkpoint monitors in the monitored location to update the assignment data tables stored in each checkpoint monitor. In the next step, the system server 103 may provide the updated activity status of the user to the related client organization in a report via the client interface. Each checkpoint monitor 102 may also be configured to operate independently if they cannot communicate with the system server 103 for some technical reason or communication problem. In such cases, the checkpoint monitors may store both an assignment status data and an activity status data of the user after analyzing the access code signal transmitted to the checkpoint monitor. The stored data may be transmitted to the system server once the communication is reestablished.

Figure 10:
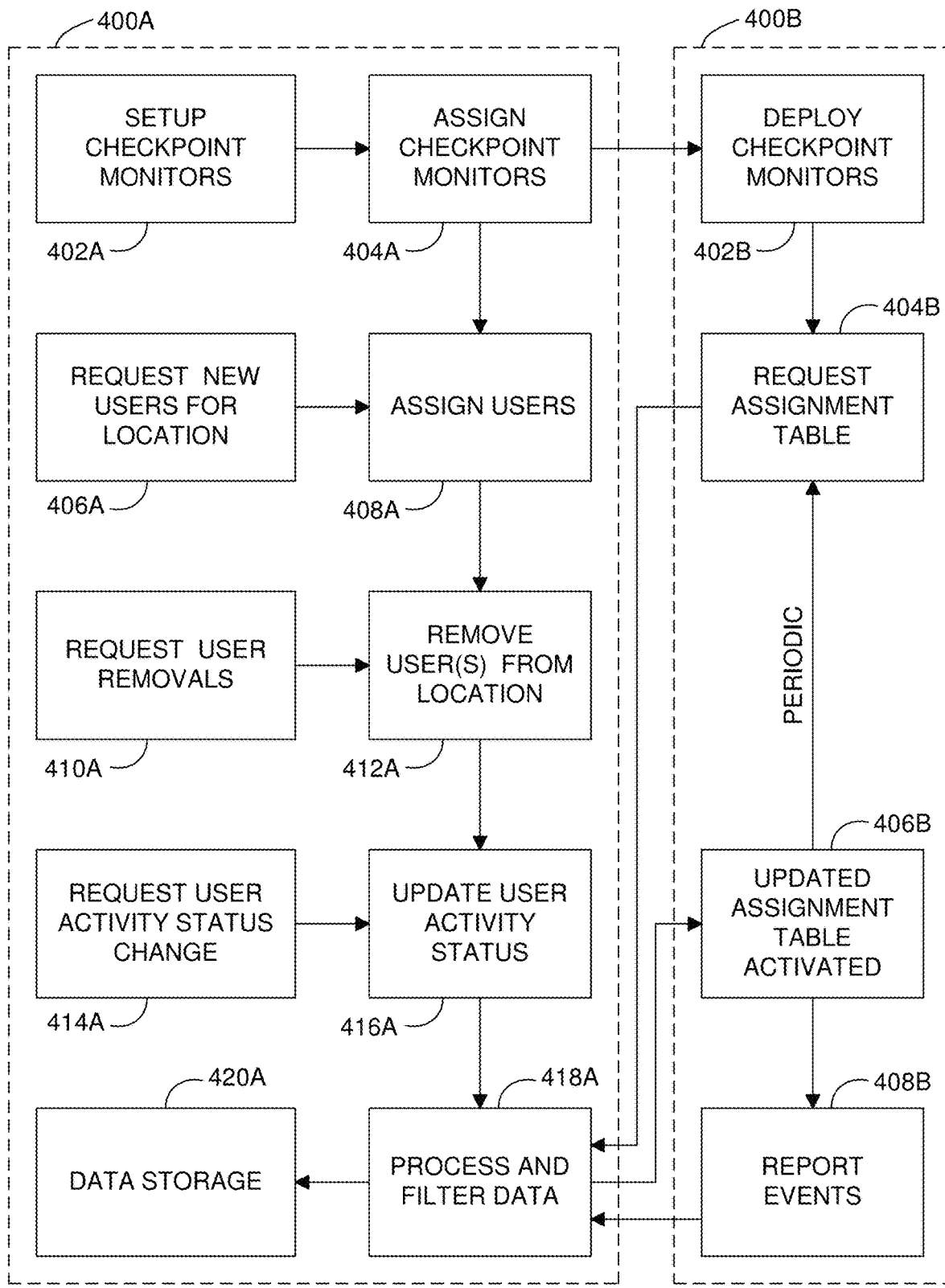
FIG. 10 is a flow chart illustrating an embodiment of an exemplary operation sequence implemented in the system of the present invention.

FIG. 10 is a flowchart 400 illustrating an exemplary embodiment of assigning both the checkpoint monitors and the users to a selected location prior to initiating the compliance monitoring of the present invention in the location of the client organization. In the flow chart 400, for clarity, exemplary operation steps which may be conducted using the system server 103 at the monitoring center of the monitoring organization may be shown within the box 400A and exemplary operation steps which may be conducted at the location using the checkpoint monitors 102 may be shown within the box 400B.

Referring to FIGS. 10 and 1-7B, accordingly, in operation step 402A, initially, the number of checkpoint monitors 102 and their installation positions in the assigned location are determined by either a client organization admin (client admin) via a client interface 104 (FIG. 3) or a monitoring organization admin (monitoring admin). However, the monitoring organization admin may be the only authority to allocate checkpoints and perform assignments based on prior agreement with client admin. Once the setup is completed, in operation step 404A, the monitoring admin may assign the checkpoint monitors to the location by linking their identifications, such as identification numbers, to the location. In one embodiment, the check point monitor assignment may be done by placing the identification numbers of the checkpoint monitors 102 on the assignment data table, as exemplified in FIG. 6. Next, in operation step 402B, checkpoint monitors may be taken to the assigned location and installed at the predetermined positions in the location (see FIG. 1), tested and deployed. In operation step 406A, the client admin may request to add new users to the assignment data table for the same location, and in operation step 408A, the monitoring admin may update the assignment status of users in the assignment data table by linking them to the assigned location (FIG. 6).

In one embodiment, the linking of users to the assigned location may be done by placing user identification and/or user ID code of the user access code device to the assignment data table. In operation step 410A, the client admin may request to remove one or more users from the assignment data table of the location, and in operation step 412A, the monitoring admin may update the assignment status of the users in the assignment data table by removing the users requested to be removed. In operation step 414A, the client admin may request to change user activity status of one or more users on the assignment data table of the location, and in operation step 416A, the monitoring admin may update the activity status of the users in the assignment data table by changing their activity status into the activity status requested by the client admin. In operation step 418A, the data, including the assignment data table, from the operation steps 402A-416A may be processed and filtered, and in operation step 420A, the data including the assignment data table may be stored in the storage 150 of the system server 103 (FIG. 5).

In operation step 406B, an updated and approved assignment data table may be received at the checkpoint monitors at the location after the operation step 418A, and upon request from the check point monitors in operation step 404B. In operation step 408B, feedback from the checkpoint monitors such as activity status updates, valid and invalid operations etc., may also be processed in operation step 418A and stored in the data storage 150.

Figure 11A:
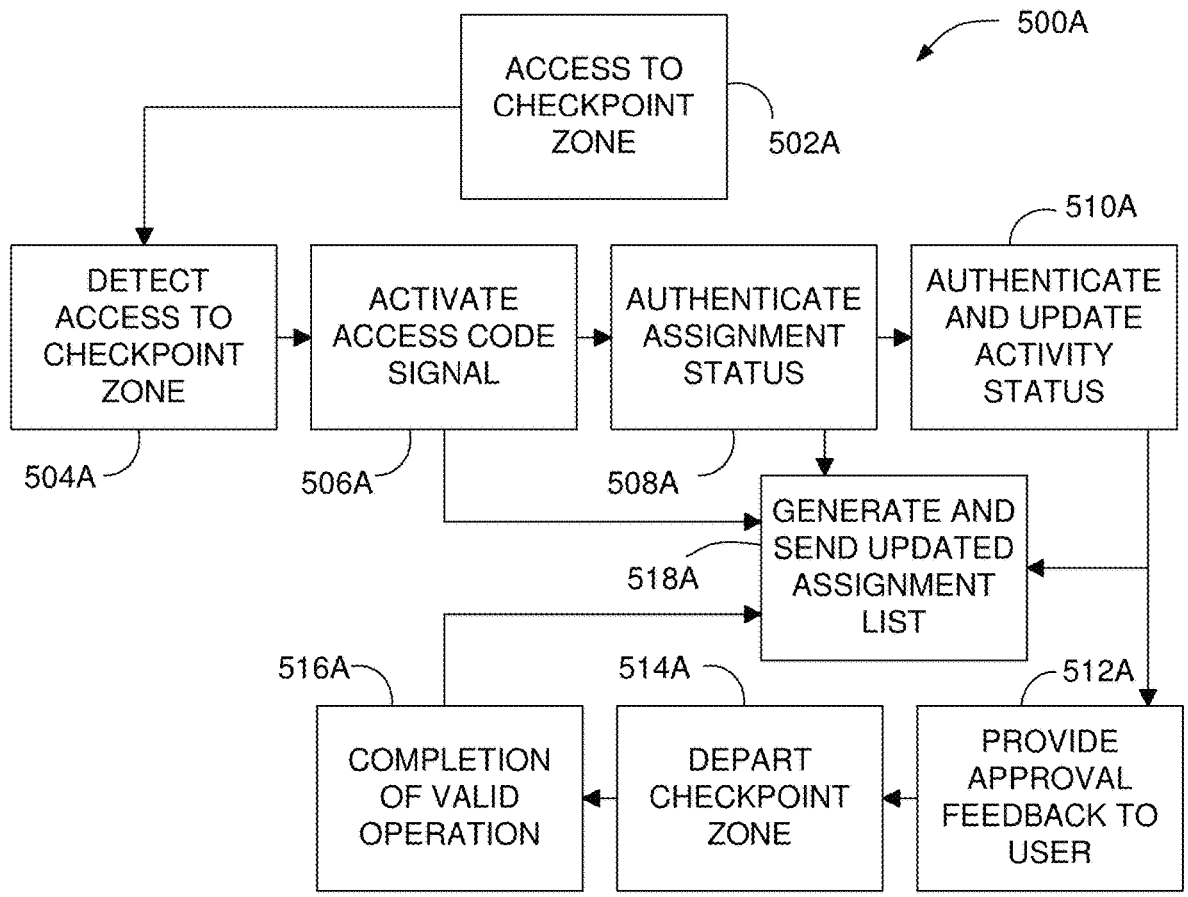
FIGS. 11A-11D are flow charts illustrating embodiments of exemplary operation sequences implemented in the system of the present invention.

FIGS. 11A-11D show various flowcharts illustrating various embodiments of methods using the monitoring system 100 including valid and invalid operation examples. FIG. 11A shows a flowchart 500A exemplifying an embodiment of a valid operation sequence involving authentication of the assignment status and activity status of an authorized user. Referring to FIGS. 11A and 1-7B, accordingly, in operation step 502A a user may access the checkpoint zone Z (see FIGS. 1 and 2A) of checkpoint monitor 102 in the location. In operation step 504A, the checkpoint monitor 102 may sense the user accessing the checkpoint zone and provides audiovisual feedback as well as prompts for user access code. The user may provide the access code signal within a predetermined response time, for example, 10-30 seconds. During the response time a video or still image of the user may be recorded by the checkpoint monitor 102 as image data and stored. In operation step 506A, the user may activate the user access code using the access code device assigned to the user. In operation step 508A, the checkpoint monitor may receive the access code signal, decode it and authenticate user's assignment status as valid assignment by comparing the user ID code component of the access code signal against the user identifications in the assignment data table 135, and register and report it as valid operation.

In operation step 510A, the checkpoint monitor may authenticate the user activity code component of the access code signal to determine the activity status of the user. If the determined activity status is opposite to the current activity status on the assignment data table, the user activity status on the assignment data table is updated as described above via the system server 103. The checkpoint monitor 102 may register and report the updated activity status as valid operation. In operation step 512A, the checkpoint monitor may provide an audiovisual approval feedback to the user and prompt to proceed. In operation step 514A, the user may depart the checkpoint zone in the direction of either into the monitored location or out of the monitored location. In operation step 516A, once the checkpoint monitor 102 senses user's departure, a qualitative score may be calculated based on the valid operations. In operation step 510A, data obtained from the operations steps 502A through 516A may be transmitted to and received by the system server 103. As described above, the system server 103 may form and transmit an updated assignment data table to the checkpoint monitor(s) 102.

Figure 11B:
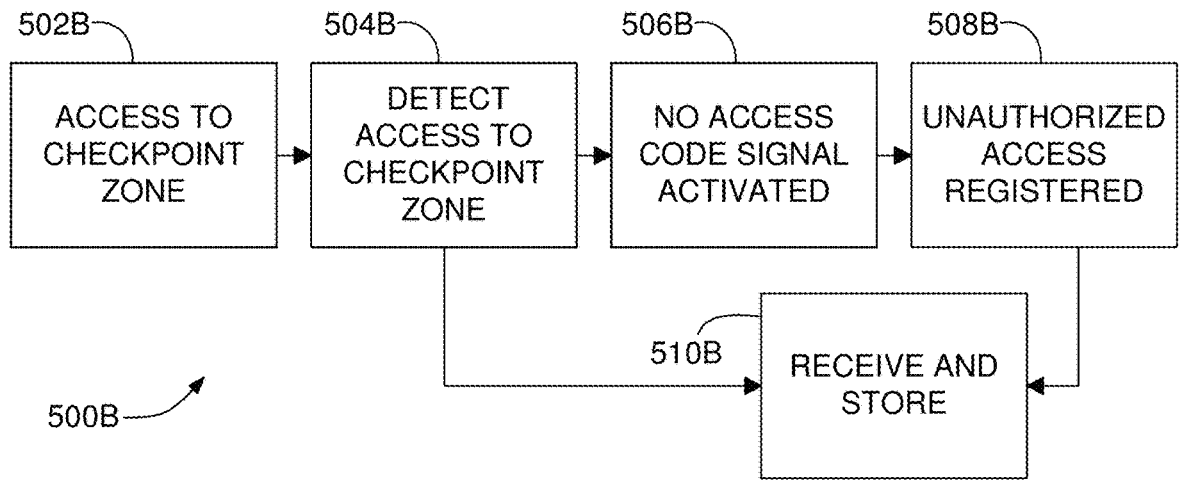

FIG. 11B shows a flowchart 500B exemplifying an embodiment of an invalid operation sequence involving an unauthorized access attempt. Referring to FIGS. 11B and 1-7B, accordingly, in operation step 502B, an access or intrusion to the checkpoint zone Z (see FIGS. 1 and 2A) of checkpoint monitor may occur. In operation step 504B, the checkpoint monitor may sense the intrusion triggered by a person or object and provide audiovisual feedback as well as prompts for user access code and starts the response time. During this time a video or still image of the checkpoint zone Z may be recorded by the checkpoint monitor 102 as image data and stored. In operation step 506B, no access code signal may be received within the response time by the checkpoint monitor 102 or the accessing person or object may no longer be sensed within the checkpoint zone Z. In operation step 508B, the checkpoint monitor may detect a departure from checkpoint zone Z and report the event as an invalid operation, and in operation step 510B, the main server receives and stores the invalid operation. In operations steps 504B and 508B, the detections may be sequential detections triggering unauthorized entry and/or exit.

Figure 11C:
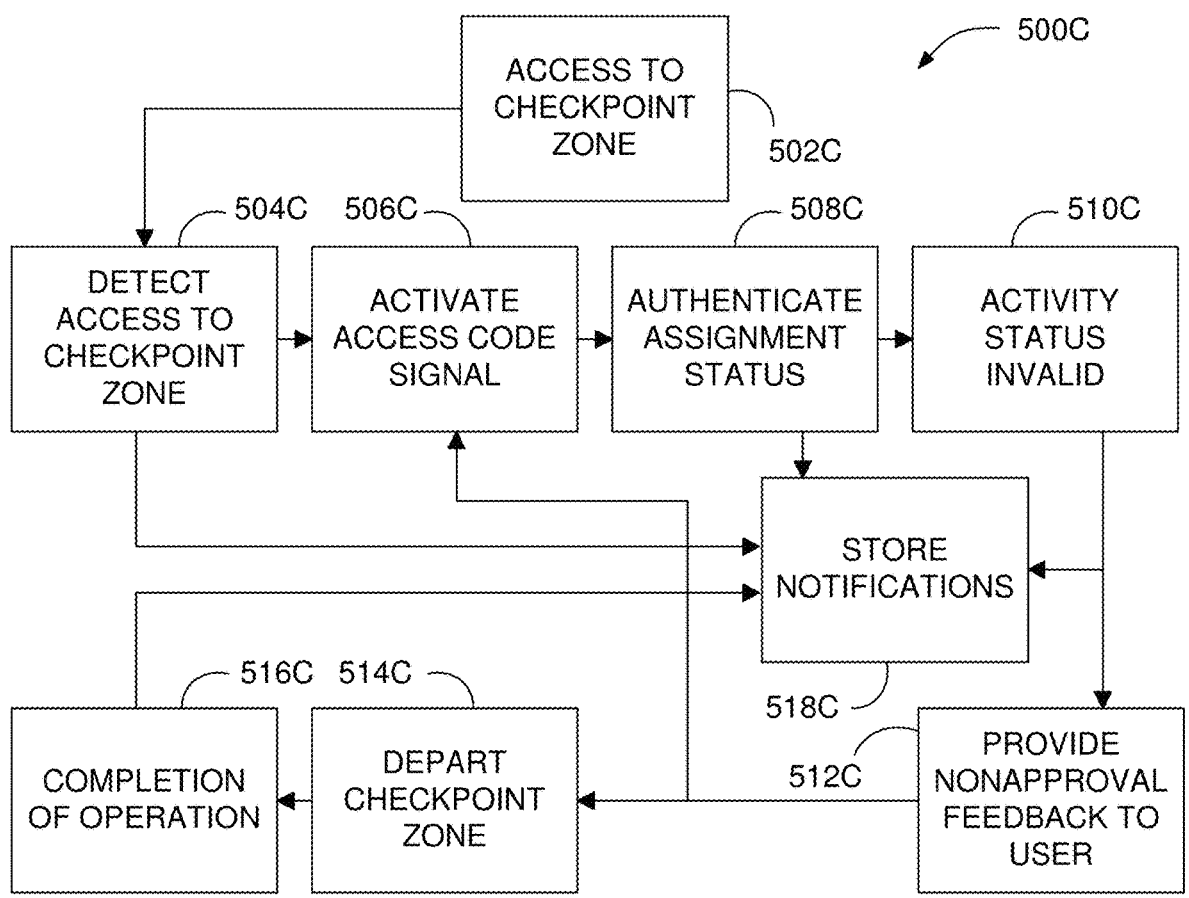

FIG. 11C shows a flowchart 500C exemplifying an embodiment of an invalid operation involving an invalid access status of a user. Referring to FIGS. 11C and 1-7B, accordingly, in operation step 502C a user may access the checkpoint zone Z (see FIGS. 1 and 2A) of checkpoint monitor in the location. In operation step 504C, the checkpoint monitor may sense the user accessing the checkpoint zone and provides audiovisual feedback as well as prompts for user access code. The user may provide the access code signal within a predetermined response time, for example, 10-30 seconds. During the response time a video or still image of the user may be recorded by the checkpoint monitor as image data and stored. In operation step 506C, the user may activate the user access code signal using the access code device assigned to the user. In operation step 508C, the checkpoint monitor may receive the access code signal, decode it and authenticate user's assignment status as valid assignment by comparing the user ID code component of the access code signal against the user identifications in the assignment data table 135, and register and report it as valid operation.

In operation step 510C, the checkpoint monitor may attempt to authenticate the user activity code component of the access code to determine the activity status of the user. If the determined activity status is the same as the current activity status (unchanged) on the assignment data table or the user activity code command is not recognizable, the user activity status on the assignment data table may not be updated. The checkpoint monitor 102 may register and report the activity status as invalid operation. In operation step 512C, the checkpoint monitor may provide an audiovisual disapproval feedback to the user and prompt to retry. If the user retries to authenticate activity status from operation step 506C and succeeds, the operation sequence continues as in FIG. 11A with a valid operation. If not, in operation step 514C, the user may depart the checkpoint zone in the direction of either into the monitored location or out of the monitored location. In operation step 516C, once the checkpoint monitor 102 senses user's departure, a qualitative score may be calculated based on the invalid operation. In operation step 510C, data obtained from the operations steps 502C through 516C may be transmitted to and received by the system server. As described above, the system server 103 may form and transmit an updated assignment data table to the checkpoint monitor(s).

Figure 11D:
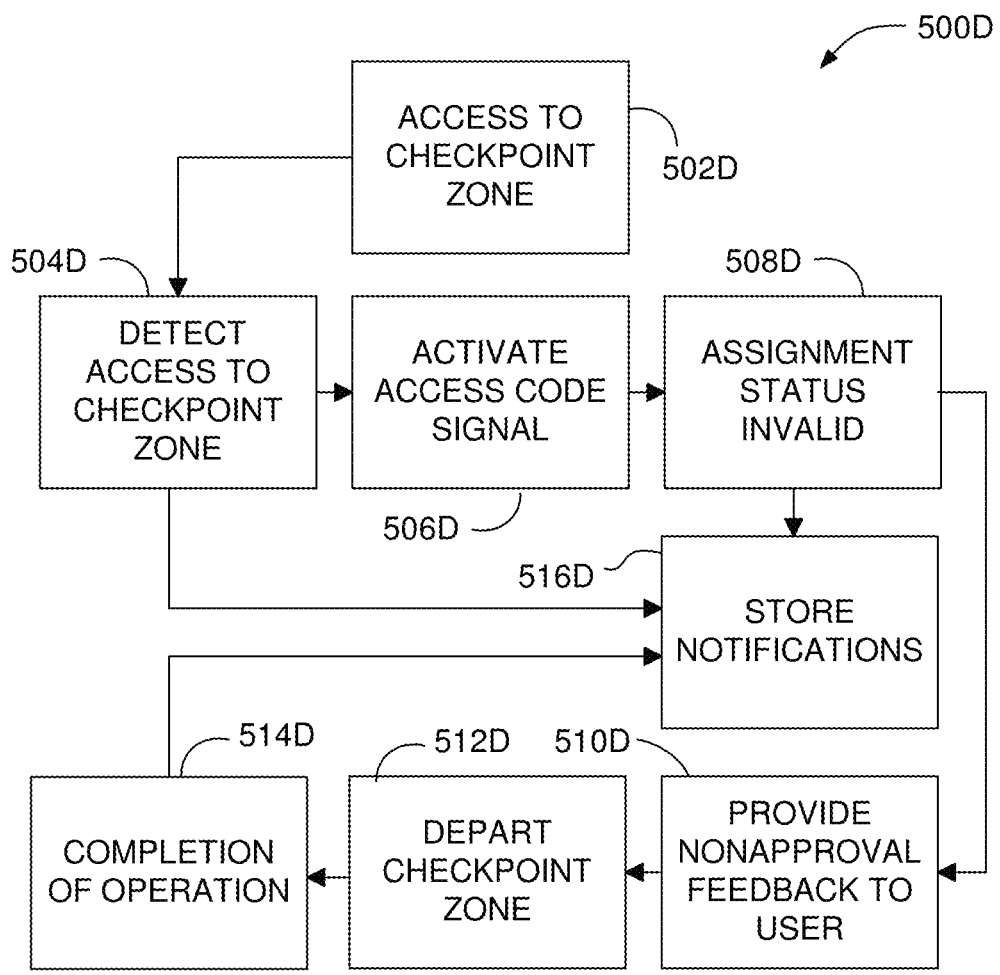

FIG. 11D shows a flowchart 500D exemplifying an embodiment of an invalid operation involving an invalid assignment status of a user. Referring to FIGS. 11D and 1-7B, accordingly, in operation step 502D a user may access the checkpoint zone Z (see FIGS. 1 and 2A) of checkpoint monitor in the location. In operation step 504D, the checkpoint monitor may sense the user accessing the checkpoint zone and provides audiovisual feedback as well as prompts for user access code. The user may provide the access code signal within a predetermined response time, for example, 10-30 seconds. During the response time a video or still image of the user may be recorded by the checkpoint monitor as image data and stored. In operation step 506D, the user may activate the user access code using the access code device assigned to the user. In operation step 508D, the checkpoint monitor may receive the access code signal, decode it and attempts to authenticate user's assignment status by comparing the user ID code component of the access code signal against the user identifications in the assignment data table 135 in the checkpoint monitor 102. If the determined assignment status cannot be determined, i.e., the user is not on the assignment data table or not scheduled for the specific check-in time, the checkpoint monitor may register and report the assignment status as an invalid operation.

In operation step 512D, the checkpoint monitor may provide an audiovisual disapproval feedback to the user and prompt to retry or contact the administration. If the user retries to authenticate assignment status from operation step 506D and succeeds, the operation sequence continues as in FIG. 11A with a valid operation. If not, in operation step 514D, the user may depart the checkpoint zone in the direction of either into the monitored location or out of the monitored location. In operation step 516D, once the checkpoint monitor senses user's departure, a qualitative score may be calculated based on the invalid operation. In operation step 510D, data obtained from the operations steps 502D through 516D may be transmitted to and received by the main server. As described above, the system server may form and transmit an updated assignment data table to the checkpoint monitor(s).

Another embodiment of the compliance monitoring system of the present invention will be described below with FIG. 12A through FIG. 18.

Hydrocarbon wellsites may experience a large volume of vehicles, such as trucks and personnel vehicles, entering and exiting the wellsites on a daily basis in addition to the personnel having work assignments in the wellsites. Owners of the hydrocarbon wellsites may wish to carefully monitor all vehicle entry and exit from the hydrocarbon wellsites to check and collect information related to the vehicles along with the associated personnel in an effective manner.

To address this need, in another embodiment, the system of the present invention may further provide portable access control stations that may be electronically integrated to the networked checkpoint monitors described in the previous embodiment. A portable access control station may automatically grant entry and exit to users, such as vehicle driver and/or at least one of the vehicle occupants, as well as the vehicle associated with such users when a preauthorized access code, which is associated with the user and identifying him/her, is delivered electronically to the portable access control station.

Figure 12A:
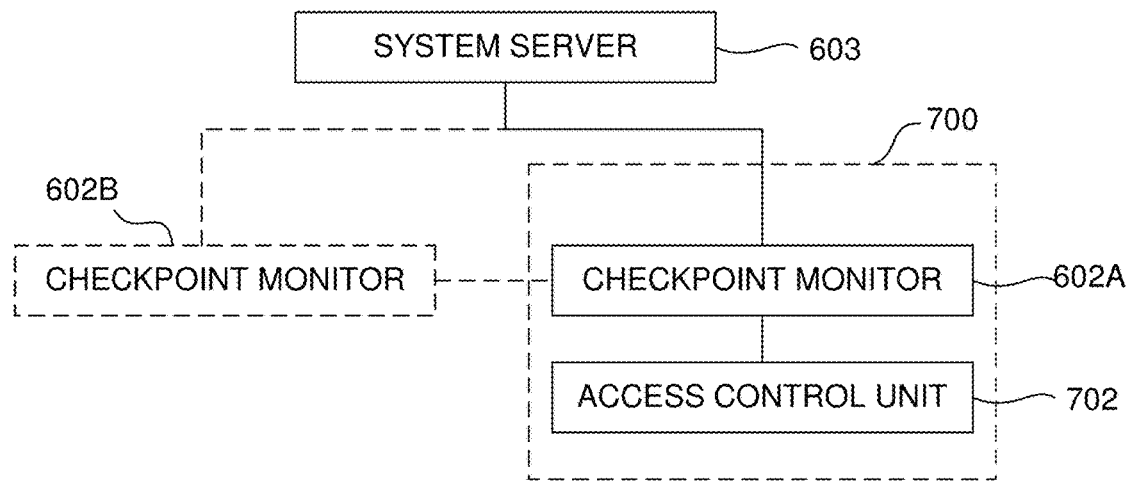
FIG. 12A is a schematic diagram illustrating an embodiment of the compliance monitoring system.
Figure 12B:
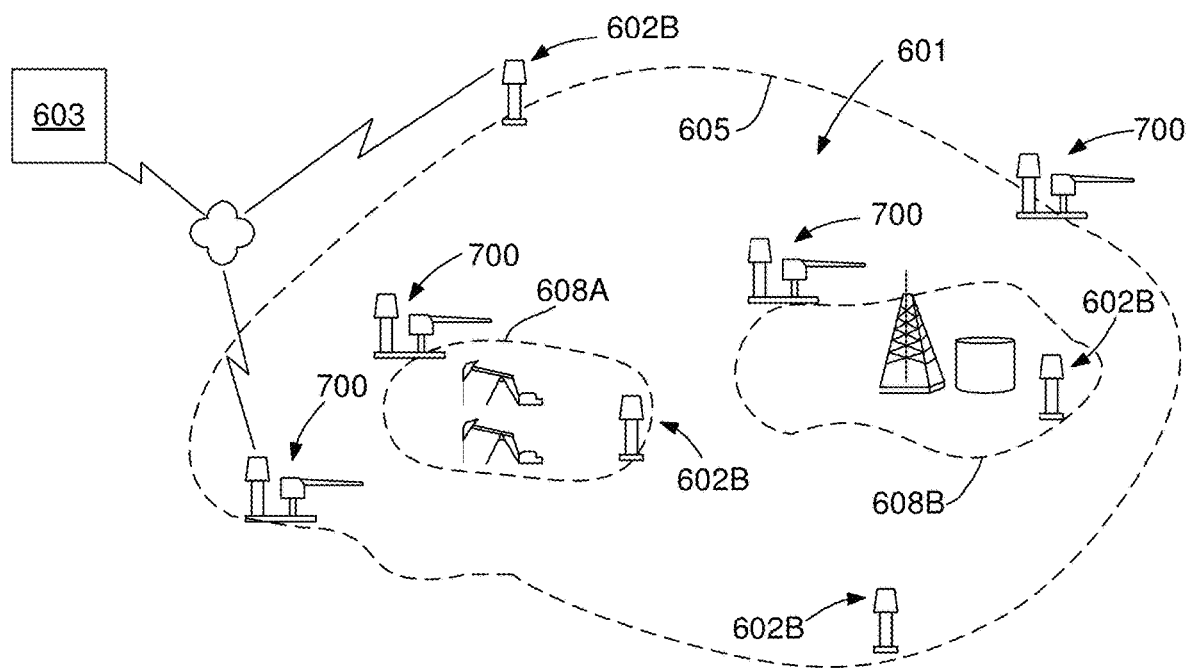
FIG. 12B is a schematic view of an embodiment of an exemplary implementation of the compliance monitoring system of the present invention.

As illustrated in FIGS. 12A-12B, in this embodiment of the present invention, a compliance monitoring system 600 may include a system server 603 at a monitoring center and one or more access control stations 700 or access control assemblies 700, which are remotely located in a monitored location 601 or the monitored location having a perimeter 605. Each access control station 700 may include a check point monitor 602A and an access control unit 702 that is electronically integrated with the checkpoint monitor 602A. The access control unit 702 may be configured to operate an alert member to alert the drivers to the presence of the access control station where the check in or check out processes are performed. Alternatively, the compliance monitoring system 600 may also optionally include one or more individual checkpoint monitors 602B located on the same monitored location. The system server 603 is in wired or wireless connection with the access control stations 700, and the individual checkpoint monitors 602B.

The monitored location 601 may be a wellsite, oilfield, hydrocarbon field, or a hydrocarbon location, for oil or natural gas production or recovery, where the users of it may be compliance monitored by the system 600. The monitored location may be a remote location. As will be described more fully below, the access control stations 700 may be portable stations and, thus easily deployable and installable in selected locations of the monitored location 601. Furthermore, the access control stations 700 and optionally the individual checkpoint monitors 602B may also be located in or adjacent various work locations 608, such as work locations 608A and 608B nested within the monitored location 601. This way, further compliance monitoring of the users of such work locations may be performed. Access control stations 700 are subsystems of the system 600. Built-in instrumentation and enhanced controls of the access control stations 700 may enable a safer and quick operation. The equipment is designed to expedite and facilitate the relocation of the networked compliance monitoring system with the frequency demanded by oilfield operations and with a minimal footprint where location space is highly constrained. The access control unit 702 of the access control station may receive commands from both the checkpoint monitor 602A and the manual controls such as a numeric keypad, wireless remote or an emergency stop.

Figure 13:
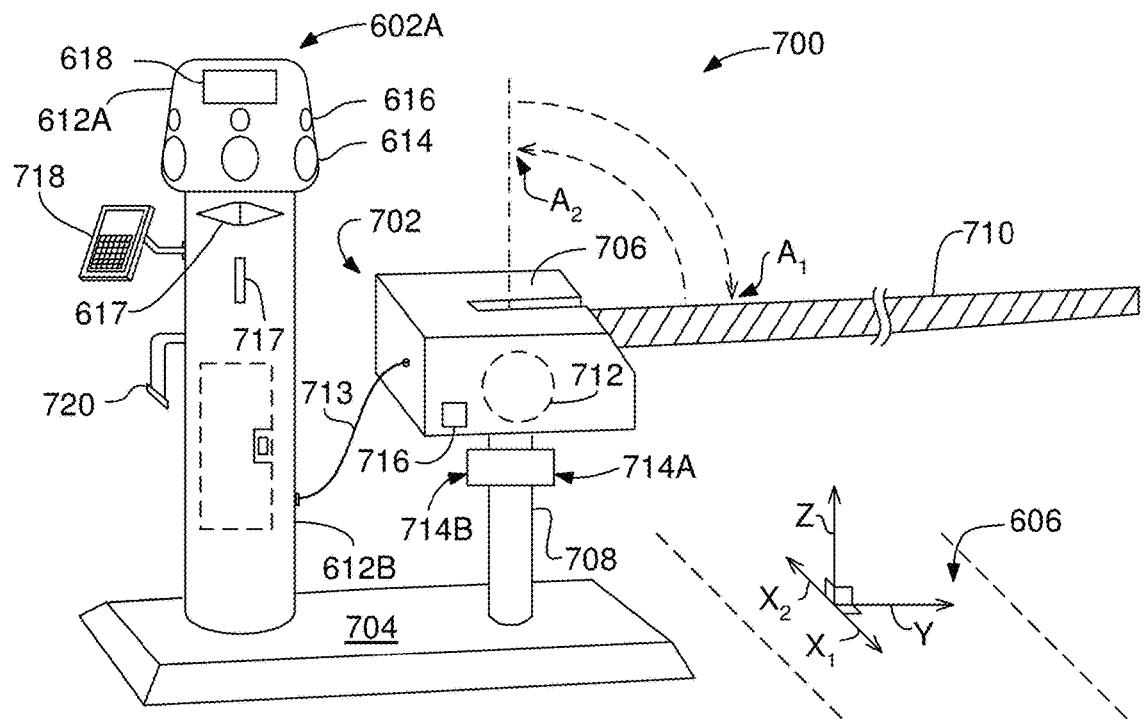
FIG. 13 is a schematic illustration of an embodiment of an access control station of the present invention.

As shown in FIG. 13, the checkpoint monitor 602A and the access control unit 702 of the access control station 700 may be electronically and mechanically integrated and installed adjacent to one another at an access location 606 of the monitored location which may be on an access road, pathway or roadway used by the vehicles. In one embodiment, at the access location 606, the access control station 700 may monitor a vehicle by both monitoring vehicle events and events of the users (user events) associated to the vehicle. Vehicle events may be monitored by the access control unit 702 and the user events may be monitored by the checkpoint monitor 602A of the access control station 700. The users associated to a vehicle may be, for example, vehicle driver and/or an occupant of the vehicle, and their previously registered assignment data in the system server indicates that they will either use or drive the vehicle, i.e., they are associated with the vehicle.

The access control station 700 may collect and store vehicle event data combined with user event data, which is associated to the vehicle event data, and transmit both data to system server to monitor vehicle activity. Vehicle event data may be the vehicle data captured by the access control unit 702, which may be vehicle detection, vehicle arrival at the access location and departure from the access location, for either exiting or entering the monitored location 601, and other event data captured by the access control unit 702. Associated user event data may be user's assignment status identifying the user and his/her assignment in the monitored location 601 and user's activity indicating whether the user is entering the monitored field or exiting. With this combined data, the system may make a determination about the vehicle as to what time it is entered or exited to location and for what work assignment. If the system receives only a user event data without any vehicle event data, the system may make determination only for user's status.

As in the previous embodiment, also in this embodiment, a user's assignment status data about the assigned work and activity status data about user's entry to and exit from the monitored location 601 may be monitored and registered by the checkpoint monitor 602A of the access control station 700. User assignment data and activity data are transmitted from the checkpoint monitor server 634 of the checkpoint monitor 602A to the system server 603 and stored thereon (See FIG. 16). The data collected by monitoring the user and the vehicle at the access control station 700 may be observed and tracked by administrators at the monitoring center in real time as such activity occurred. The access control station's messages may carry distinct IDs and/or distinct descriptions that facilitate filtering and processing when delivered to system administrators and any other personnel who may be in charge of monitoring the particular hydrocarbon field where the access control station 700 is installed.

In one embodiment, data related to user events such as assignment status and activity status of the users may be the only data stored on the server 603. Access control unit 702 related events may also be stored along with the user events at the system server 603. The sequence and time correlation of the user events and the access control unit related events at the server may be interpreted as a vehicle related event altogether. An exemplary access control unit event may be related to detection of the vehicles with the vehicle sensors 714 (FIG. 13). This data must be accurately transferred to the system server 603 along with the user related event data.

As shown in FIG. 13, in one embodiment of the access control station 700, both the checkpoint monitor 602A and the access control unit 702 may be supported by a base 704 so that the access control unit 702 may be made an integral part of the check point monitor 602A to facilitate monitoring of vehicles as well as users of the compliance monitored field. A connection line 713 electronically connects the check point monitor 602A to the access control unit 703. As described in the previous embodiments, the checkpoint monitor may have a head 612A or top section supported by a body section 612B or a bottom section. The body section 612B may include a server and other components of the checkpoint monitor 602A. The access control unit 702 may include a housing 706 supported by a post 708. The housing 706 may include a drive or motor and other inner components to operate the access control unit 702. An alert member 710 may be movably attached to the drive 712, which may be an electric motor. In one embodiment the alert member 710 may be a barrier arm, which will be referred to as barrier 710 hereinafter.

As seen in FIG. 13, the barrier 710 extends generally along the Y direction over the access location 606 that generally extends along $X_1$-$X_2$ direction, when both the checkpoint monitor 602A and the access control unit are maintained in vertical position, along Z direction, on the base 704.

The drive 712 may be configured to pivot the barrier 710 between a blocking position 'A1', or closed position, for example a horizontal position, and an open position 'A2', for example a vertical position. The blocking position 'A1' of the barrier 710 is for alerting vehicles to stop vehicles at the access control station 700 for check in or check out process, for example, at the border of the compliance monitored field. The barrier 710 is moved into the open position 'A2' so that the vehicle may enter or exit the hydrocarbon wellsite and to indicate that at least a user in the vehicle is successfully authenticated by the compliance monitoring system 600.

The barrier 710 of the access control unit 702 may be used as a physical and visible indicator of the access control station 700 to alert vehicle drivers to the presence of the access control station 700 and make them stop. The barrier 710 may not be for restricting vehicles or individuals entering or exiting the monitored location 601. Further the barrier 710 may not be for controlling vehicle traffic in to or out of the monitored location 601.

The access control unit 702 may include vehicle sensors 714, for example, a first sensor 714A and second sensor 714B to detect vehicles approaching the access control station 700. The first sensor 714A may be aligned toward the $X_1$ direction to detect vehicles entering the monitored location 601, and the second sensor 714B may be aligned toward the $X_2$ direction to detect vehicles exiting the monitored location 601. For safety reasons, the access control unit 702 may not open the barrier 710 if a vehicle has not been detected by either vehicle sensors even when a valid user operation is occurred, e.g., a user is authenticated. When a vehicle detection triggers the access control unit 702 to move the barrier in the open position A2 (not emergency or fault state), the sensor input allows access control unit 702 to keep the barrier 710 in the open position A2, or reverse the barrier movement to the open position A2 if the barrier 710 is moving toward the blocking position A1, until no vehicle is detected. When no vehicle is detected, the barrier is moved to the blocking position A1 after a configurable delay. The vehicle sensors 714 may include radar sensors using radar technology that do not require a reflective object for reference and the distance and sensitivity are adjustable. Radar based sensors are ideal in order to simplify deployments and adapt to a variety of locations compared to traditional fixed access control unit systems where several hardwired detection loops are buried underground at the vehicle detection areas. Alternative vehicle sensing and recognition systems may also be included with the access control unit 702. They may include artificial intelligence for vehicle recognition on the captured screenshots of the vehicle, or by adding cameras for License Plate Reading (LPR) capabilities.

During an emergency, a stop switch 716 or an interlock (not shown) may be activated to maintain the barrier in the open position A2 indefinitely, until it is switched off. The stop switch may be used for emergencies or under exceptional operational conditions to allow all vehicle traffic to flow freely. For non-emergencies, a single-time open command may be issued by a manual bypass such as using a keypad 718 which may be only activated by a numeric code by authorized personnel.

Status of the access control unit 702 may be audibly and visually communicated to the drivers by color coded light indicators and buzzers. When the barrier 710 is ready for closing, buzzer may be activated as a warning for users around the access location 606. When the emergency stop switch 716 is activated, there may be a temporary audible notification.

The barrier 710 may be telescopic so that the length of the barrier 710 may be adjustable on location to fit the access road width and to expedite installation. The barrier 710 may be made of a light material, such as aluminum or aluminum alloys, that may be breakable to prevent any vehicle damage if an accidental collision occurs. Furthermore, a mounting component (not shown) coupling the barrier 710 to the access control unit 702 may have break-away capabilities so that the barrier 710 separates from the access control unit 702 during an accidental collision.

The head section 612A of the checkpoint monitor 602A may comprise a plurality of cameras 614 and a plurality of presence sensors 616 for having 360 degrees image capture and sensing capability. A display 618 may display various status related information in use. Warning and guide lights 617 may give users visual warnings for valid and invalid operations in checking in to the monitored location 601 or checking out of it with or without a vehicle. Warning and guide lights 617 may also be used to provide feedback to the users. If a vehicle is detected, the light feedback may be a vehicle sign and when no vehicle is detected the light feedback may be a walking user sign.

The body section 612B may contain critical inner components of the checkpoint monitor 602A, such as a server 630 (FIG. 16) having a processor, a data storage and a control software with various modules, power connections and/or power supply, various communication, data capture and detection hardware and the like devices.

In this embodiment, the checkpoint monitor 602A may include an RF receiver, a keypad 718 or numerical keypad and a barcode reader 720 to receive an access code which is associated with the user's identity, who attempts to enter or exit the monitored location 601.

As previously described, the access code may comprise a user identification (ID) code component and a user activity code component, which may be used to determine user's assignment status and activity status by the checkpoint monitor. The received access code is used to authenticate the user, i.e., the user's assignment status and the user's activity status.

The user ID code may be a unique number or barcode associated with the user who is authorized to use the access code. The user activity code may identify an activity status of the user as to whether the user is checking in or out. The checkpoint monitor 602A may analyze the user ID code and the user activity code of the access code to determine user's assignment status and activity status.

An access code provider device or access code provider may be used to deliver an access code in various forms to the access control station 700. In this embodiment, examples of the access code providers may be an access code device 642, a keypad 718 and a user ID card 721 having a barcode 723, as shown in FIGS. 14A-14C.

Figure 14A:
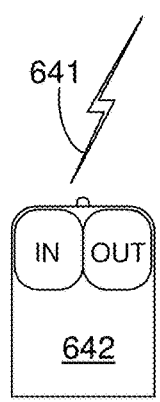
FIGS. 14A-14C are schematic illustrations of exemplary access code providers used with the access control station.

As described above with respect to FIG. 4, and as shown in FIG. 14A, the access code associated with the user's identity may be transmitted as an access code signal 641 using the access code device 642. The access code signal may be an RF signal and the access code device 642 may be an RF signal transmitter. The access code signal 641 may be received by the RF receiver 717 on the checkpoint monitor 602A. The access code signal 641 may include both the user ID code and the user activity code, which are used to determine user's assignment status and activity status. The user activity code may be manually selected on the access code device 642 by the user.

Figure 14B:
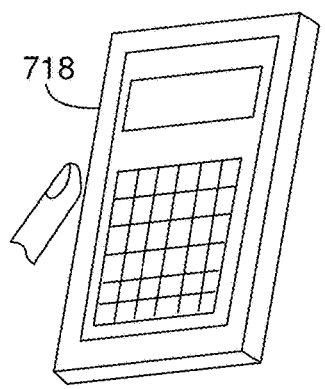

As shown in FIG. 14B, using the keypad 718, however, a user may type in a numerical code, which includes the access code. The typed in numerical access code may include both the user ID code and the user activity code, which are used to determine user's assignment status and activity status.

Figure 14C:
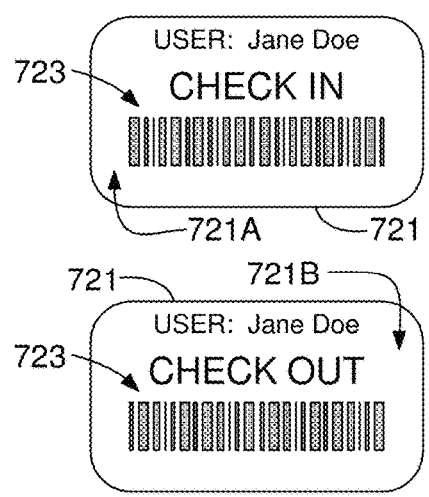

As shown in FIG. 14C, the access code may be the barcode 723 on the user ID card 721 identifying the user. A first side 721A of the user ID card 721 may include the barcode 723A including the user ID code and the user activity code for checking in to the monitored location 601. A second side 721B of the user ID card 721 may include the barcode 723A including the user ID code and the user activity code for checking out of the monitored location 601.

The RF receiver 717, the keypad 718 and the barcode reader 720 may all be integral parts of the checkpoint monitor 602A and may be connected to the access module of the checkpoint monitor (not shown). The access module 140A of the checkpoint monitor 102 is shown in FIG. 4, as an example.

In an alternative embodiment, the keypad 718 may be integrated with the access control unit 702 rather than the checkpoint monitor. Besides using it for access code entry, the keypad 718 may also be used to perform certain bypass functions to independently operate the access control unit 702 without the checkpoint monitor's involvement. This particular feature of the keypad 718 may be desired especially at the installment stage of the access control station 700 before establishing any connection between the checkpoint monitor 602A and the access control unit 702. Once the checkpoint monitor 602A and the access control unit 702 are connected, the keypad 718 may be used for access code entry function as explained above.

Figure 15A:
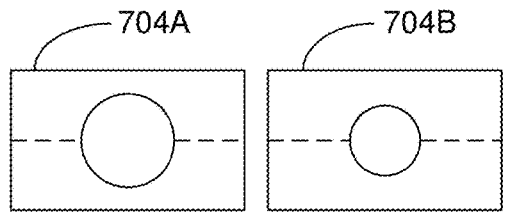
FIGS. 15A-15B are schematic illustrations of base components used with the access control station.
Figure 15B:
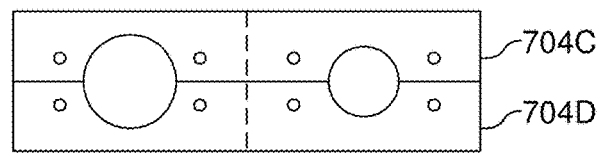

FIGS. 15A and 15B show the base plates 704A-704D of the base 704 of the access control station 700. The checkpoint monitor 602A and the access control unit 702 may be mounted to a first base plate 704A and a second base plate 704B respectively as separate parts of the access control station 700. This may enable easy equipment deployment and removal by a single technician since the weight is manageable across the separate parts. The base 704 may be formed by joining the first and second base plates 704A and 704B together by bolting them to a first linking plate 704C and a second linking plate 704D when installing the access control station 700 at the monitored location 601. The linking plates are fastened on top of the independent plates to mechanically integrate the access control unit 702 and the checkpoint monitor 602A as a single piece while providing increased surface area and weight for stability of the barrier operation. Irregularities of the installation surface can be compensated by adjusting elevation with the same fastening mechanism.

Figure 16:
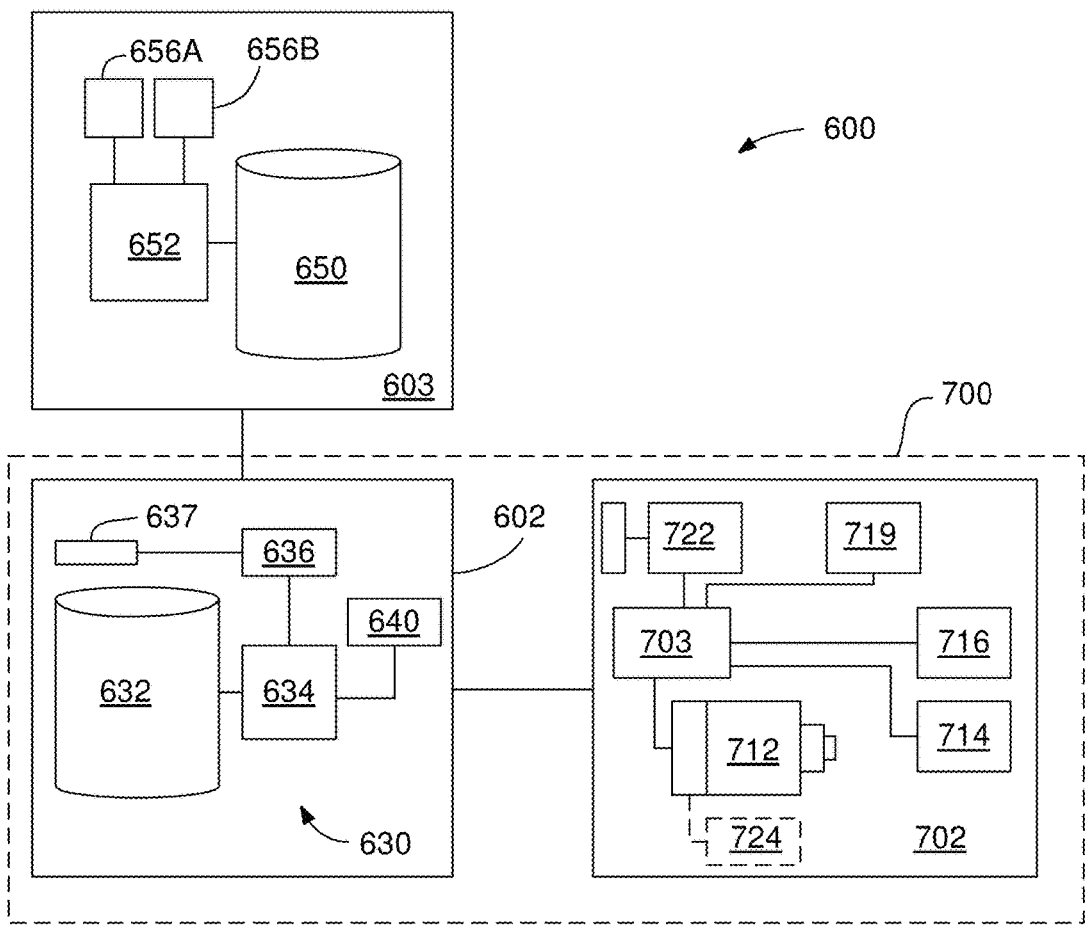
FIG. 16 is a schematic view of an embodiment of a compliance monitoring system including the access control station.

FIG. 16 shows components of the compliance monitoring system 600. In the housing 706, the access control unit 702 may include a control module 703, or a controller, which is in communication with the processor 634 of the checkpoint monitor 602A via an access control unit module 640 or a module 640 which may be a network switch connecting the electronics of the access control unit 702 to the checkpoint monitor 602A. Particularly, when the access control unit 702 is connected to the checkpoint monitor 602A via the module 640, the control module 703 of the access control unit may become part of the internal network of the checkpoint monitor 602A.

The control module 703 may be in connection with the drive 712 (barrier drive), the vehicle sensors 714, the stop switch 716, the warning system 719, and a wireless remote receiver 722 with an antenna 722A. The control module 703 may be configured to operate the drive 712 for pivoting the barrier 710 between the blocking position A1 and the open position A2. The control module 703 may provide real time status data to the checkpoint monitor 602A as the control module 703 receives data from the above identified components of the access control unit 702. The wireless remote receiver 722 may be used to operate the barrier 710 by a user activated wireless remote device (not shown). The control module 703 may receive commands from other devices such as the keypad 718. The access control unit 702 may have an emergency battery backup system 724 to open the barrier upon a power loss event and to reverse automatically if the drive 712 requires power to close the barrier 710.

The access control unit 702 collects and transmits status information and receives commands from the checkpoint monitor via the internal network. The user data provided by the client organizations, individual checkpoint monitors, access control stations and other data sources may be stored in a system data storage 650 by a system processor 652 of the system server 603. The data may be received and sent via a first communication module 656A and a second communication module 656B. Various components of the system server 603 and their operation or functions and its location details are similar to the components included in the system server 103 described above with respect to FIG. 5. For clarity, other components of the system server 103 are not included and new reference numerals are used in the exemplary system server 603 shown FIG. 15. Differing from the checkpoint monitor 102 described, for example, with respect to FIG. 4, the checkpoint monitor 602A may include the module 640 to operate the access control unit 702 via the control module 703. Data related to vehicle events and user events, which are provided by the access control unit 702 and the checkpoint monitor 602A, may be stored in the storage unit 632 and transmitted to the system server 603 via the communication module 636. Similarly, the user data and the related vehicle data may be received from the system server and stored in the data storage 632.

Figure 17A:
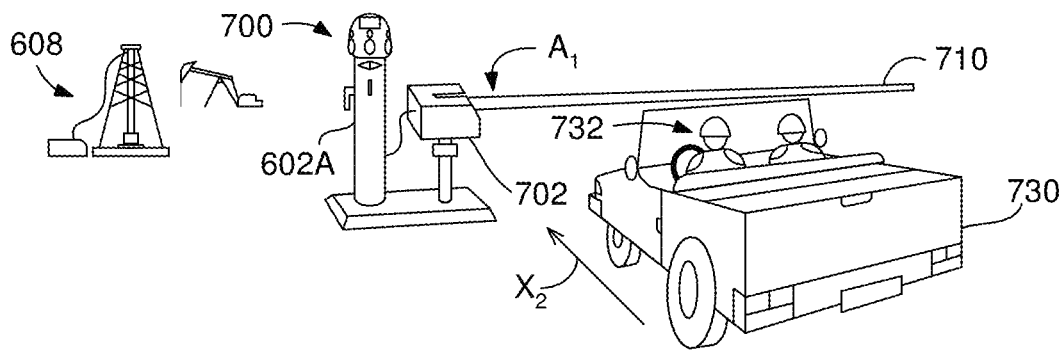
FIGS. 17A-17C illustrate an exemplary embodiment of a method of the present invention.
Figure 17B:
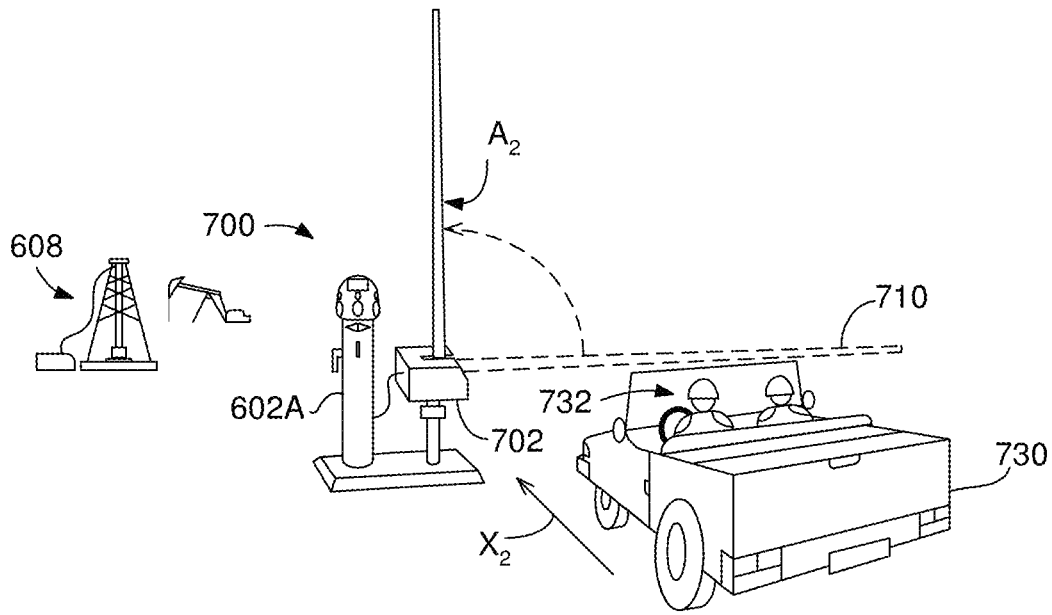
Figure 17C:
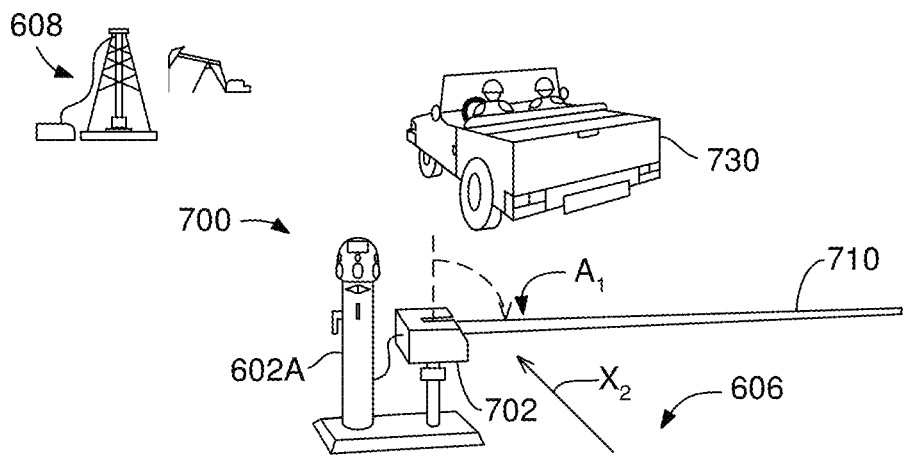

FIGS. 17A-17C exemplifies an embodiment of a method of the present invention. As shown in FIG. 17A, an exemplary operation may begin with the barrier 710 placed in the blocking position A1. As a vehicle 730 approaches to the access control station 700, signs nearby may instruct a user 732 (driver) to move the vehicle closer until the first vehicle sensor 714A detects the vehicle 730. Once the vehicle is detected, a red-light indicator may prompt the user 732 to stop the vehicle 730 before the access control station 700 and to use access code to open the barrier 710. For safety, the barrier 710 may be kept in the blocking position A1 when no vehicle is detected by the vehicle sensors 714, even when the access code is valid. The detection of an access code including access code signal, barcode access code, valid numeric code, wireless remote and emergency stop activations are registered to the system server 603 as events independently of the barrier open/close action.

As shown in FIG. 17B, once access code is processed and the user 732 in the vehicle 730 is authenticated by the system, the barrier 710 is moved into open position A2. The access code details are recorded in the checkpoint monitor 602A. If an access code is not used, any manual method to open the barrier is also recorded as events. When the barrier 710 opens, a green-light indicator may be visible. The barrier 710 may remain in the open position and the green light may stay on as long as the vehicle 730 is detected on the area monitored by the vehicle sensors 714 without any time limit.

As shown in FIG. 17C, once the vehicle 730 moves out of the range of the second sensor 714B, an audible alert may be activated for a few seconds to alert the users that the barrier is about to close. Then, the barrier is moved into the closed position A1 and the access control unit 702 returns to idle state. If no vehicle is detected by the vehicle sensors 714, the users of the monitored location 601 can check in and check out as usual and the user events are registered by the checkpoint monitor 602A. Next, all the events registered for this vehicle entry, i.e., the user related events or data and the vehicle events, may be transmitted to the system server 603 for compliance monitoring of this vehicle entry. Of course, the same steps described in FIG. 17A through 17C may happen at the access control station 700 when the user 732 and the associated vehicle 730 exit the monitored location, and this data is also reported to the system server 603 for compliance monitoring. When no vehicle is detected, to avoid any accidents, the barrier is not opened or closed during the check in or check out of the users.

Figure 18:
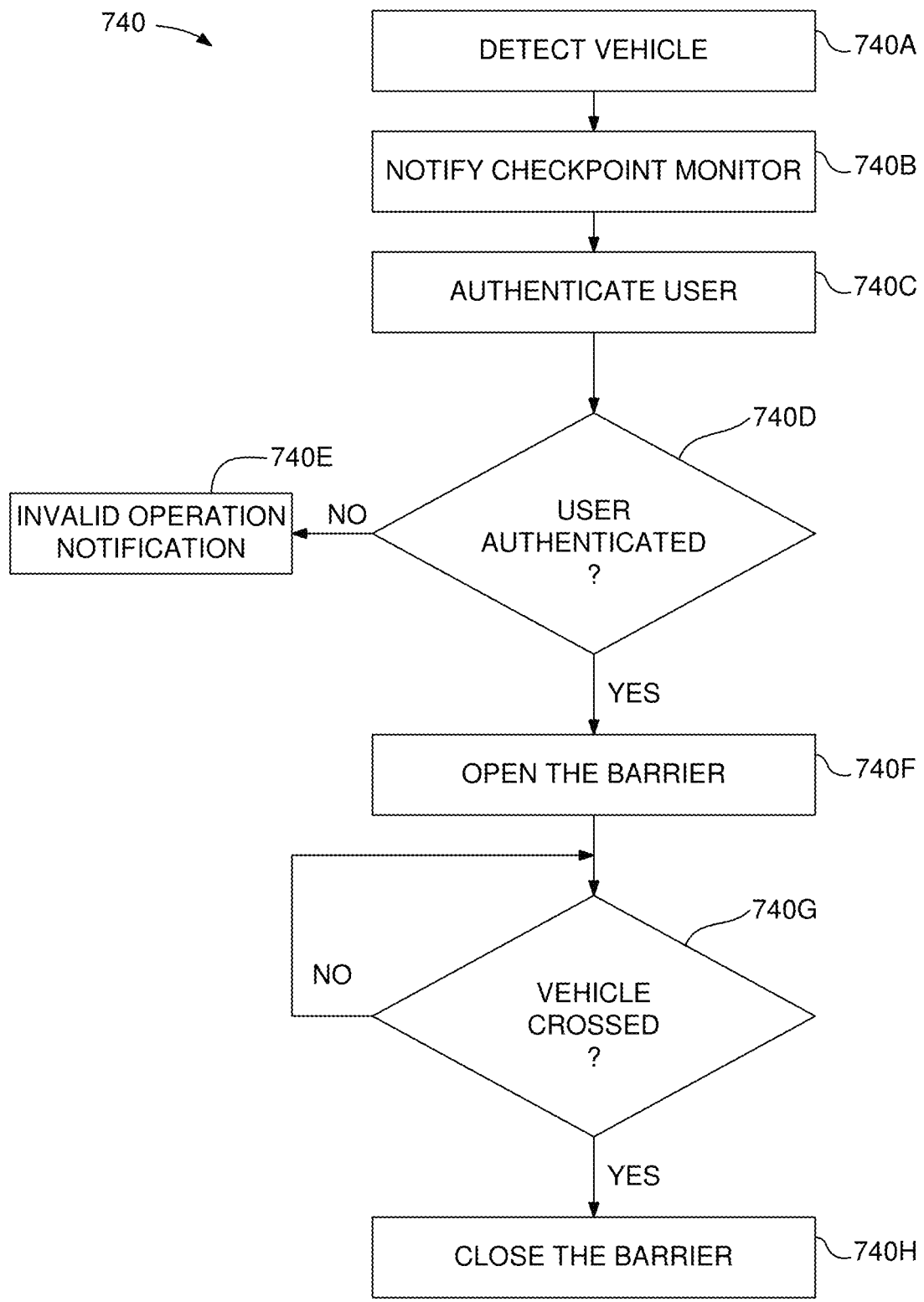
FIG. 18 is a flow chart of an embodiment of an exemplary operation sequence implemented in the compliance monitoring system of the present invention.

FIG. 18 is a flowchart 740 illustrating, in one embodiment of the system 600, an exemplary compliance monitoring algorithm that monitors access to the monitored location 601 using the access control station 700, installed at the access location 606, in connection with the system server 603.

Referring to FIGS. 12A-12B, 13, 14A-14C, 16, 17 and 18, in step 740A, the vehicle 730 may be detected by the vehicle sensors 714 on the access control unit 702 and, via the control module 703 of the access control unit 702. Next, a vehicle detection signal including vehicle detection data may be transmitted to the checkpoint monitor 602A from the access control unit 702, in step 740B, which places the checkpoint monitor 602A in a standby mode to receive an access code from the user 732 (driver or an occupant) of the vehicle 730.

In step 740C, the processor 634 may authenticate the user, i.e., the user's ID and/or the status, by analyzing the access code that is received by the checkpoint monitor 602A depending on the selected method of access code delivery. As described above with respect to FIG. 13 and FIGS. 14A-14C, the user 732 may deliver a user access code assigned to him/her using several ways, for example: by transmitting it from a user access code device, introducing as barcode or typing it in as a numeric code.

In step 740D, if the user cannot be authenticated, the checkpoint monitor 602A of the access control station 700 may report the event as an invalid operation in step 740E to the system server 603 of the monitoring center. Authentication of a user's assignment status and activity status was explained in detail with respect to FIG. 9 above. If the user is authenticated in step 740D, the processor 634 of the checkpoint monitor 602A approves/updates the assignment status of the user and updates the activity status of the user as described above. Next, in step 740F, the processor 634 commands the control module 703 of the access control unit 702 to move the barrier 710 from the blocking position A1 to the open position A2. In response, the control module 703 operates the drive 712 to pivot the barrier 710 to the open position A2 to allow the vehicle 730 to enter the monitored location 601. In step 740G, if the vehicle sensors 714 continue to detect the vehicle 730, the barrier 710 is maintained in the open position A2. If the vehicle sensors 714 no longer detect the vehicle 730, the barrier 710 may be pivoted to the blocking position A1 in step 740H. Next, prior to step 740H or after step 740H, the checkpoint monitor 602A may transmit the vehicle status data, including the vehicle detection data and other data received from the access control unit, and the associated user's assignment status and activity status to the system server 603 for compliance monitoring.

The following embodiments of the present invention will describe alternative systems and methods for compliance-monitoring work locations, e.g., hydrocarbon fields or hydrocarbon wellsites, to check and collect information related to the entering or exiting vehicles and the personnel. As will be described below, as in the previous embodiments, these compliance monitoring systems may include main system components such as systems servers, checkpoint monitors and access control stations that may be connected over a network, such as the Internet. These and other features and advantages will be apparent from the following description and the associated FIGS. 19-25B.

Figure 19:
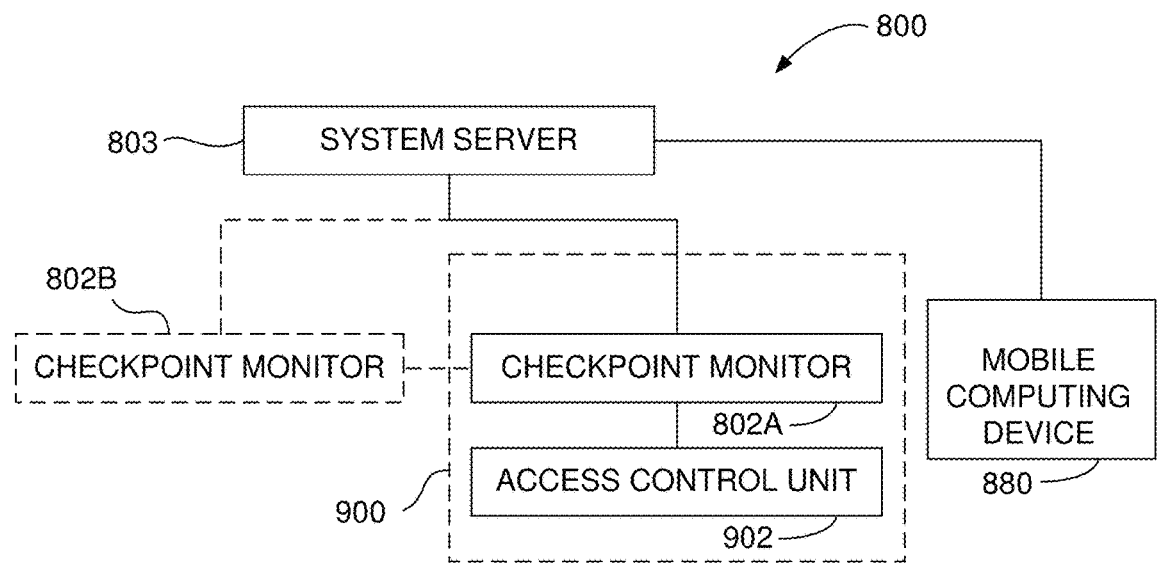
FIG. 19 is a schematic diagram illustrating an embodiment of a compliance monitoring system including a system server in communication with access control stations, having checkpoint monitors, in a monitored location and one or more mobile or portable computing devices used by a user.

As exemplified generally in FIG. 19, compliance monitoring systems 800 of the following embodiments may include system components including one or more system servers 803 in communication with check point monitors 802A of access control stations 900 for the compliance monitoring of a location, and one or more mobile or portable computing devices 880, such as smart phones, used by the users for providing user entry and exit information or other data needed for the compliance monitoring. Differing from the previous embodiments, in the following embodiments, mobile computing devices 880 may be used to send user related data to the system servers 803 in an effective manner, during vehicle entry and exit from the monitored location. The compliance monitoring systems 800 may also optionally include other system components such as one or more individual checkpoint monitors 802B in the same monitored location and one or more additional system servers.

As will be described more fully below, in the embodiments described below, user assignment status data about the assigned work and activity status data about user entry to and exit from the monitored location may be monitored and registered by the system servers described below and stored thereon. User assignment data and activity data may be transmitted from the system servers to the checkpoint monitors.

In the below embodiments, the system servers 803 may be physical servers (local server) privately owned by the compliance monitoring company (the monitoring company hereinafter), or servers of a web hosting environment provider company providing virtual web hosting, i.e., providing storage space on a physical server (virtual server), or providing a dedicated web hosting, i.e., providing one or more physical servers (dedicated servers) entirely dedicated to the monitoring company. The system servers 803 may be one or more cloud servers which may be networked servers of a cloud hosting environment of a cloud hosting provider company providing cloud computing environment, which will be referred to as the cloud server in this application. The cloud hosting environment may be a network of connected physical servers hosting virtual servers that provide storage for the resources of the monitoring company.

If the system server 803 is a physical server (local server) of the monitoring company, it may communicate with the checkpoint monitors of the access control stations, the individual checkpoint monitors and the mobile computing devices over a network, which may be a wireless network such as cellular networks or a wired network such as optical fiber lines, and/or alternatively over the Internet. If the system server 803 is a server of a web hosting environment, it may communicate with the checkpoint monitors of the access control stations 900, the individual checkpoint monitors and the mobile computing devices over the Internet.

If the system server is a cloud server in a cloud hosting environment, in one embodiment, it may communicate with the check point monitors of the access control stations, the individual check point monitors, the mobile computing devices and other cloud servers and/or local servers over the Internet. In another embodiment, the cloud server in the cloud hosting environment may communicate with the access controls stations, the individual check point monitors and other cloud servers and/or local servers, directly over the internet, and/or indirectly using intermediate cloud servers, for example IoT (Internet of Things) servers, over the Internet as well.

In one embodiment, the system 800 may perform a smart-entry (SmartEntry™) feature, or a smart-entry compliance monitoring process, in which the user related data and/or user credentials are directly and swiftly sent to the system server 803 from the mobile computing device 880 of the user when entering or exiting a monitored field. The user related data may include, in one embodiment, user's access code and user's location information (geolocation).

In one embodiment, upon receiving user related from the mobile computing device 880, the system server 803 using a compliance monitoring software stored in the system server, analyze or process the user related data to authenticate the user and to determine the user's GPS location from the nearest checkpoint monitor to the user. The location of the user may be determined by comparing the user GPS location information sent by the mobile computing device against the location data of the checkpoint monitors stored in the server 803. The checkpoint monitor near to the user with the computing device sending the user related data to the system server may then receive the user related data from the system server 803 to further authenticate the user locally to allow or decline his/her entry or exit. Alternatively, the user may use the mobile computing device 880 to directly interact with the checkpoint monitors in the monitored field via a local network to perform simple access transactions.

The compliance monitoring software stored in the data storage of the system server 803 may be a web application of the compliance monitoring company, which may also be called a system software, a compliance monitoring application, or a compliance monitoring control program, which will be referred to as the system software hereinbelow. A current example may be https://gateway.wellfence.com, system software stored on and operated or deployed by the system server 803. The smart-entry process may be one of the features of the system software operated by the system server 803.

Figures 20A, 20B, 20C:
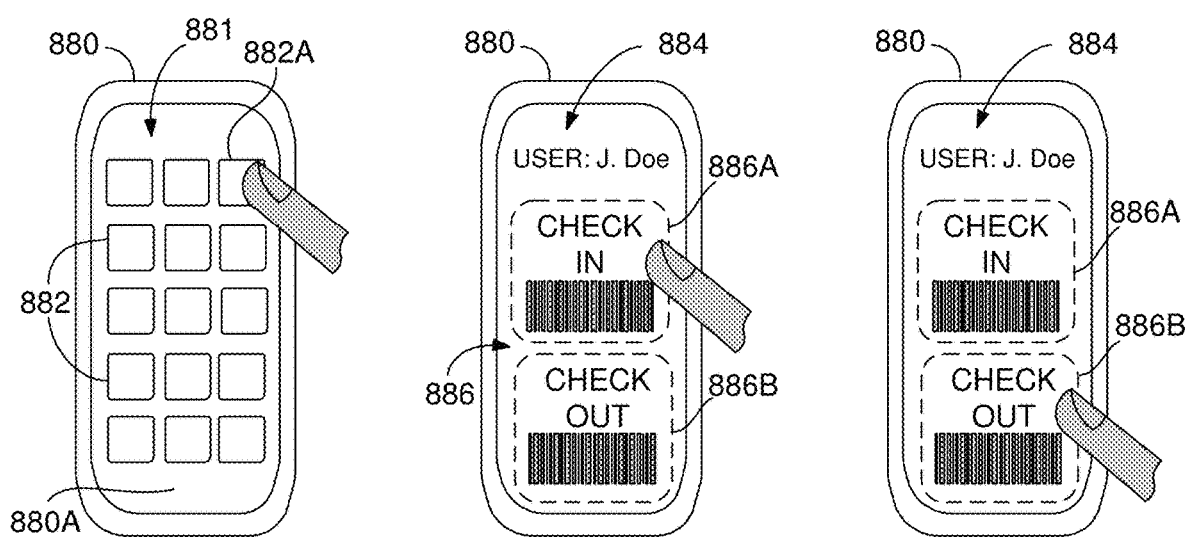
FIG. 20A is a schematic illustration of an exemplary mobile computing device which is a smart phone displaying a home page on its touchscreen display.
FIGS. 20B-20C are schematic illustrations of the smart phone displaying a user interface including an access menu with access code options for the user.

FIGS. 20A-20C illustrate the mobile computing device 880, or a portable computing device 880, including a display device 880A with a screen 891 such as a touchscreen. FIG. 20A shows a home page 881 displayed on the screen 891, showing a field access icon 882A among other icons 882. The field access icon 882A may be utilized by the user to navigate to a user interface 884 and display it on the screen 891 of the display device 880. FIGS. 20B and 20C show the user interface 884 displayed on the screen 891. The user interface 884 may be a graphical user interface (GUI). The user interface 884 may be generated by a software application program 898A (FIG. 22C) that may be loaded on and running on the mobile computing device 880 or a web application (system software) running on the system server 803. The mobile computing device 880 may be an internet and GPS capable device having web viewing and user input functionalities capable of interacting with software applications.

In one embodiment, the software application program 898A of the mobile computing device, which will be referred to as the access application 898A, may allow a user, to add or provide data to the system software, e.g., https://gateway.wellfence.com, (a web application of the compliance monitoring company) stored in the system servers 803 of the compliance monitoring systems 800.

An exemplary mobile computing device 880 may be a mobile phone, for example, a smart phone such as the iPhone, Android, or the like. Other examples of the mobile computing devices may include any portable computing device or computer such as a tablet computer, a laptop computer, a tablet such as the iPad, or the like. In this embodiment, the mobile computing device 880 may be a mobile phone or a smart phone.

Referring to FIGS. 20B-20C, the user interface 884 displayed on the mobile computing device 880 may have an access menu 886 displaying access code options for the user. The access code options in the access menu 886 may include a first button 886A, or a first tab, for the user's check in access code and a second button 886B, or a second tab, for the user's check out access code. Selections may be made at the monitored location by a touch input made by the user's fingertip (or tapping or other means) on the touch screen 880A.

Selection of the buttons 886A and 886B may also result in activating other features of the mobile computing device 880. One of these features may be the mobile computing device's built-in GPS module shown in FIG. 22C such as a GPS receiver 888B. The access application 898A may obtain the geolocation of the mobile computing device 880 of the user from the GPS receiver 888B.

Figure 21:
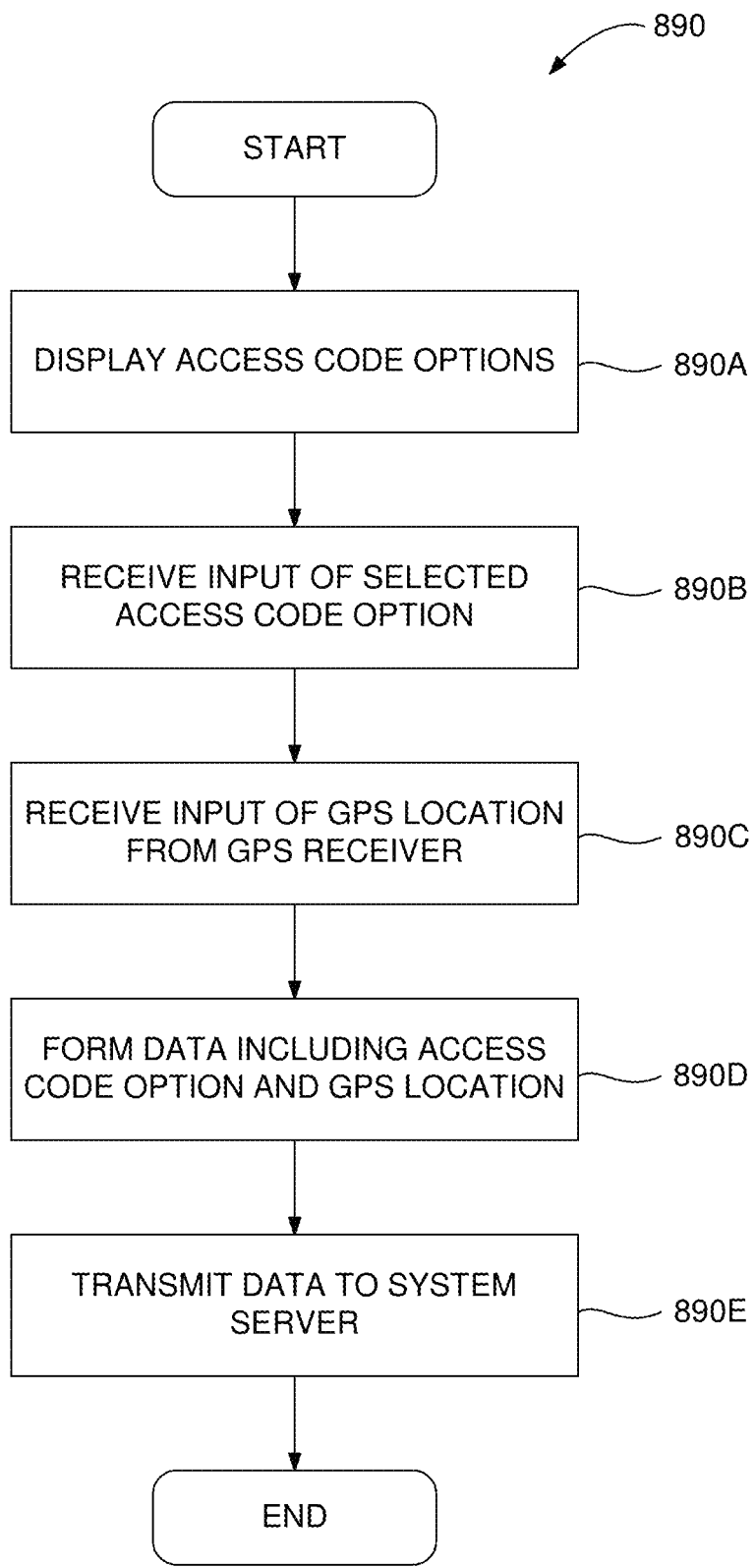
FIG. 21 is a flowchart illustrating an embodiment of an exemplary process performed on the mobile computing device at the monitored location as the user is either checking in or checking out.

FIG. 21 is a flowchart illustrating an embodiment of an exemplary operation 890 or process performed on the mobile computing device 880 at an access location of the monitored location as the user is either checking in or checking out. Operation steps 890A-890E of the operation 890 may be performed by the access application 898A executing on the mobile computing device 880.

Accordingly, the operation 890 may begin at step 890A. The access application executing on the mobile computing device 880 may display user's ID and both access code options at the user interface, i.e., the first tab 886A for the user's check in access code and a second tab 886B for user's check out access code.

At operation step 890B, the desired access code may be selected by touching or tapping on the desired tabs 886A, 886B by the user.

At operation step 890C, the location information data (geolocation data) of the mobile computing device 880 is obtained from the GPS receiver 888B. In one embodiment, the operation step 890C may be performed before the operation step 890B.

At operation step 890D, the access application executing on the mobile computing device 880 may form a computerized data including the selected access code which includes user's ID and access information, including whether the user checks in or checks out, and GPS geolocation data.

At operation step 890E, the access application executing on the mobile computing device 880 may transmit the computerized data including the selected access code and the geolocation information to the system server 803 via, for example, internet access via cellphone network or WiFi at the location.

In one embodiment, the access code option selected by the user may be analyzed by the system server 803, and/or if used, the checkpoint monitor server, upon receiving the selected options to determine user ID and user activity status, i.e., check in or check out status, as a dataset. Access code options may be displayed as tabs having in and out signs, barcodes or RFIDs, or the like on the mobile computing devices. The tabs may be displayed as QRcodes which are barcodes having button functionality on the user interface of the mobile computing device. Pressing or touching these tabs cause the touched selection to be processed by the system server. After receiving the selected access code option and the GPS information, the system server may validate user ID and assignment status, activity status and GPS coordinates of the location, and form datasets which may be transmitted to the checkpoint monitor.

Alternatively, the QRcodes displayed as a barcode may be scanned by a barcode scanner (FIG. 13) of the checkpoint monitor and transmitted to the system server to be analyzed or validated as described above. In this embodiment, the location information of the checkpoint monitor is known to the system server.

Figure 22A:
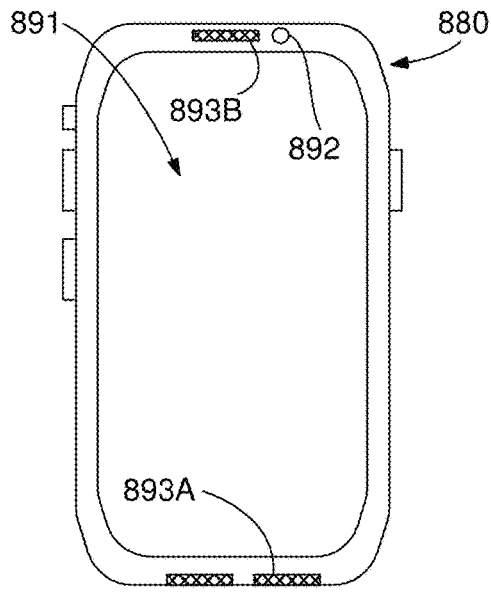
FIGS. 22A-22B are schematic front and back views of an exemplary smart phone or the mobile computing device.
Figure 22B:
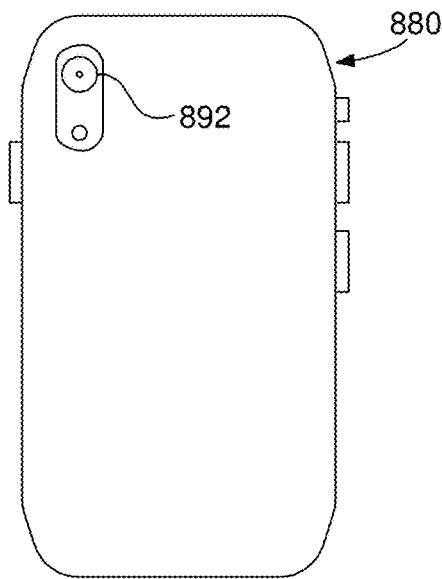

FIGS. 22A and 22B show the exemplary mobile computing device 880, in front view and back view, respectively. The mobile computing device 880 may include all known input features and output features. In this embodiment, typically, the input features may include the touch screen 891 of the display device 880A (FIG. 20A), a camera 892 and a microphone 893A. The touch screen 891 allows the user to select displayed icons or tabs and enter information into the mobile computing device 880. A typical output feature may be a speaker 893B. The touch screen 891 may also include an output feature which may display a graphical user interface (GUI).

Figure 22C:
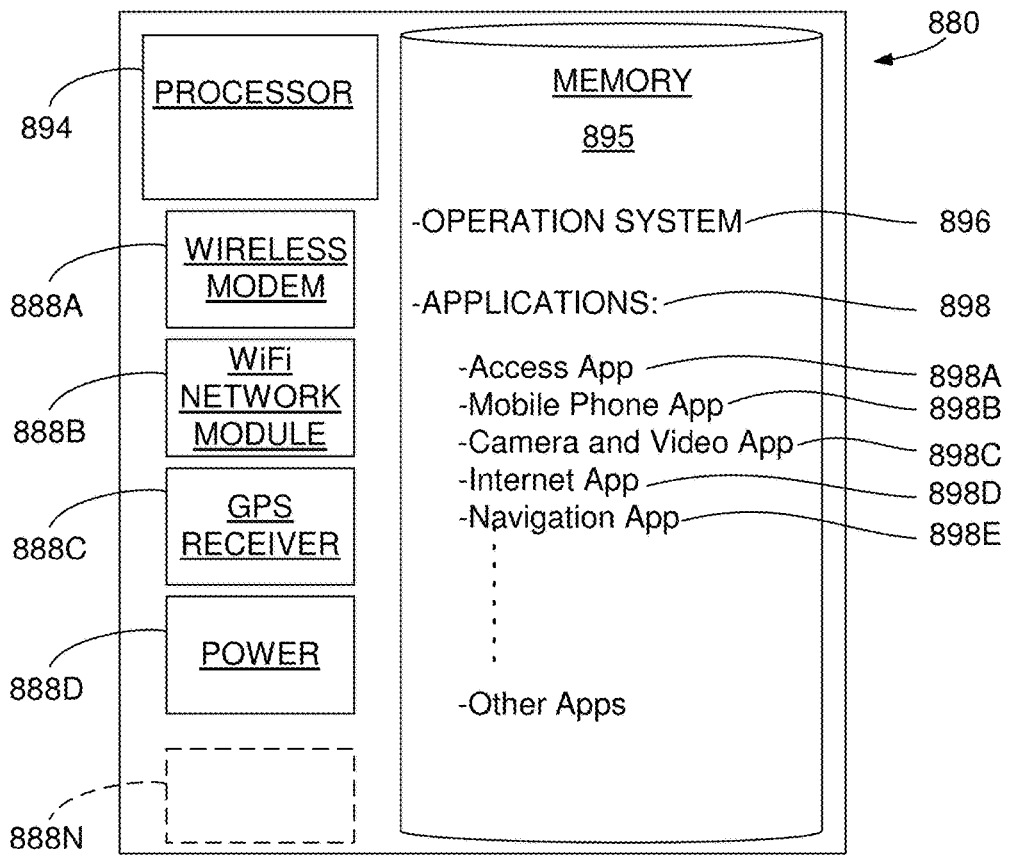
FIG. 22C is a schematic block diagram showing components of the smart phone or the mobile computing device.

FIG. 22C illustrates a simplified block diagram showing components, or features, of the mobile computing device 880. The components of the mobile computing device 880 may include a processor 894, a memory 895 or data storage and modules 888 including a cellular communications module 888A, WiFi network module 888B, a GPS receiver module 888C, a power supply module 888D, and others. The cellular communications module 888A may support wireless network communication technologies. The cellular communications module 888A may also be used to connect to the Internet.

The mobile computing device 880 may access the Internet via a cellular network or a WiFi network. Various softwares for operating the mobile computing device 880 may be stored in the memory 895, such as, an operating system 896 and a plurality of applications 898 including, for example, the access application 898A, a mobile phone application 898B, a camera/video application 898C, an internet browser application 989D, a navigation application 898E and the like. The memory 895 may be a computer storage media readable by a computer system and encoding a computer program of instructions for executing a computer process. The cellular communication module 888A may be connected to a cellular data service provided by a cellular carrier such as Verizon, AT&T, T-Mobile, Sprint, and others. Another access point may be a WiFi connection where the internet provider is transparent to the users and variable, and may support wireless communication technologies including but not limited to the WiFi module 888B on the mobile computing device 880 adhering to the IEEE 802.11 standard. Common specifications used may be IEEE802.11N and IEEE802.11AC.

The cellular communications module 888A may also be used to connect to the Internet, and WiFi. The mobile computing device 880, i.e., the smartphone, may communicate with the system server 803 over the Internet, and may make requests to the system server to display, change, or interpret information stored on the system server database. In addition, the mobile computing devices may use, for example, cellular networks (direct of hotspot), ethernet, WiFi, or the satellite or any communication type that may provide access to the Internet for sending and receiving information over the Internet. If a user's smartphone is not able to communicate over the Internet, then all server functionalities may be suspended for that user. The system server may continue to handle requests made by the smartphones of the users which may access to the Internet.

Figure 23A:
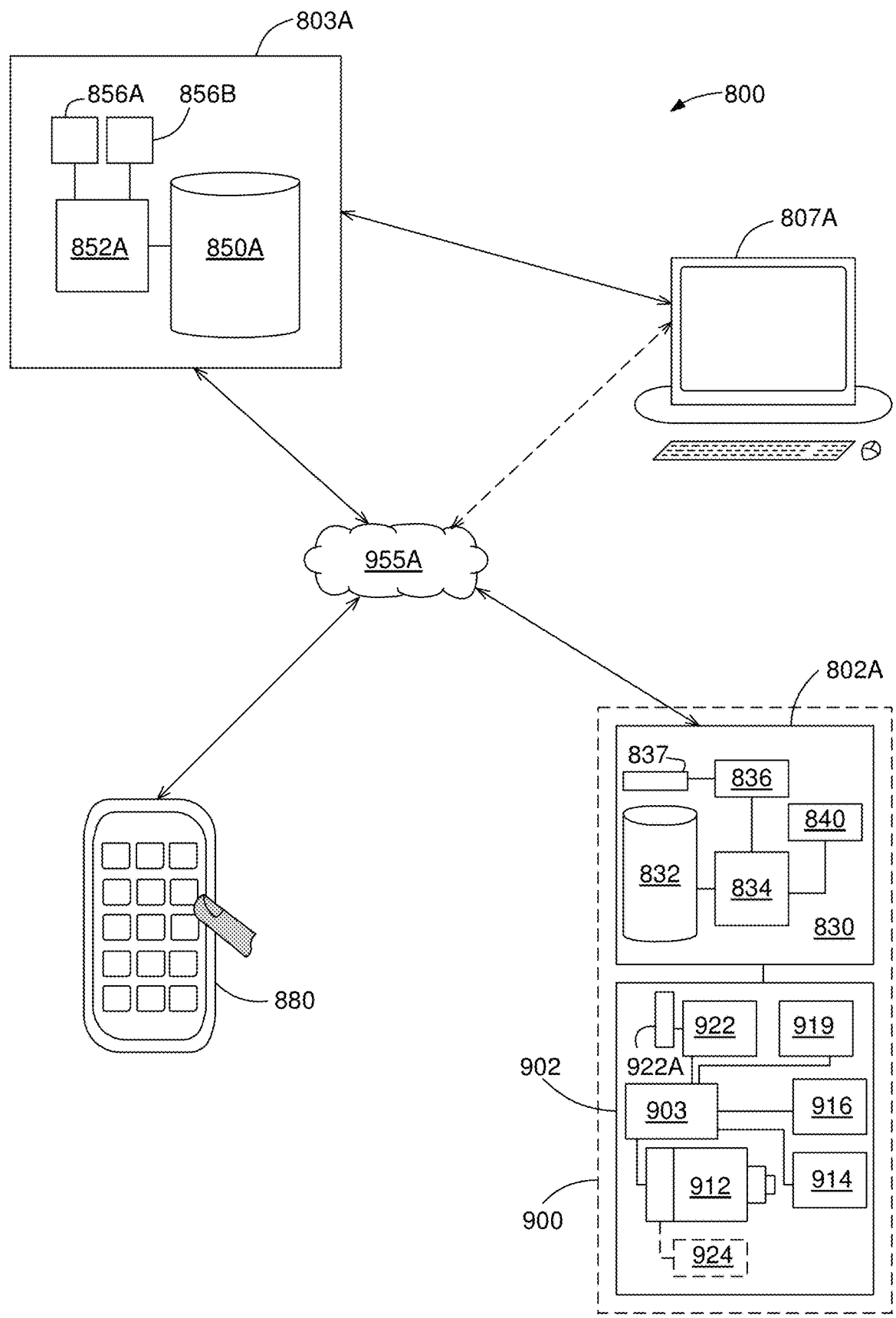
FIG. 23A is a schematic illustration of an embodiment of a compliance monitoring system of the present invention.
Figure 23B:
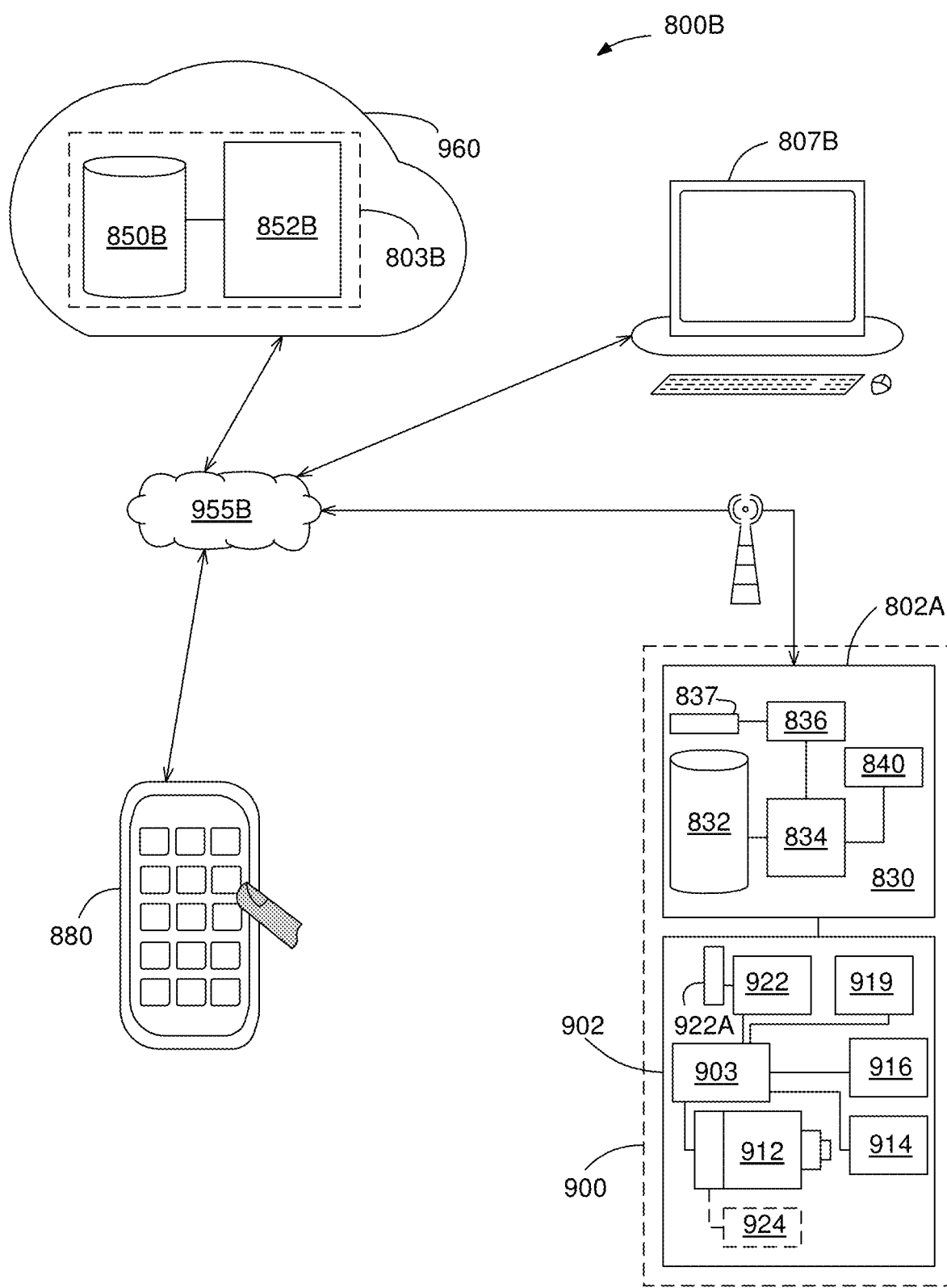
FIG. 23B is a schematic illustration of an embodiment of a compliance monitoring system of the present invention.
Figure 23C:
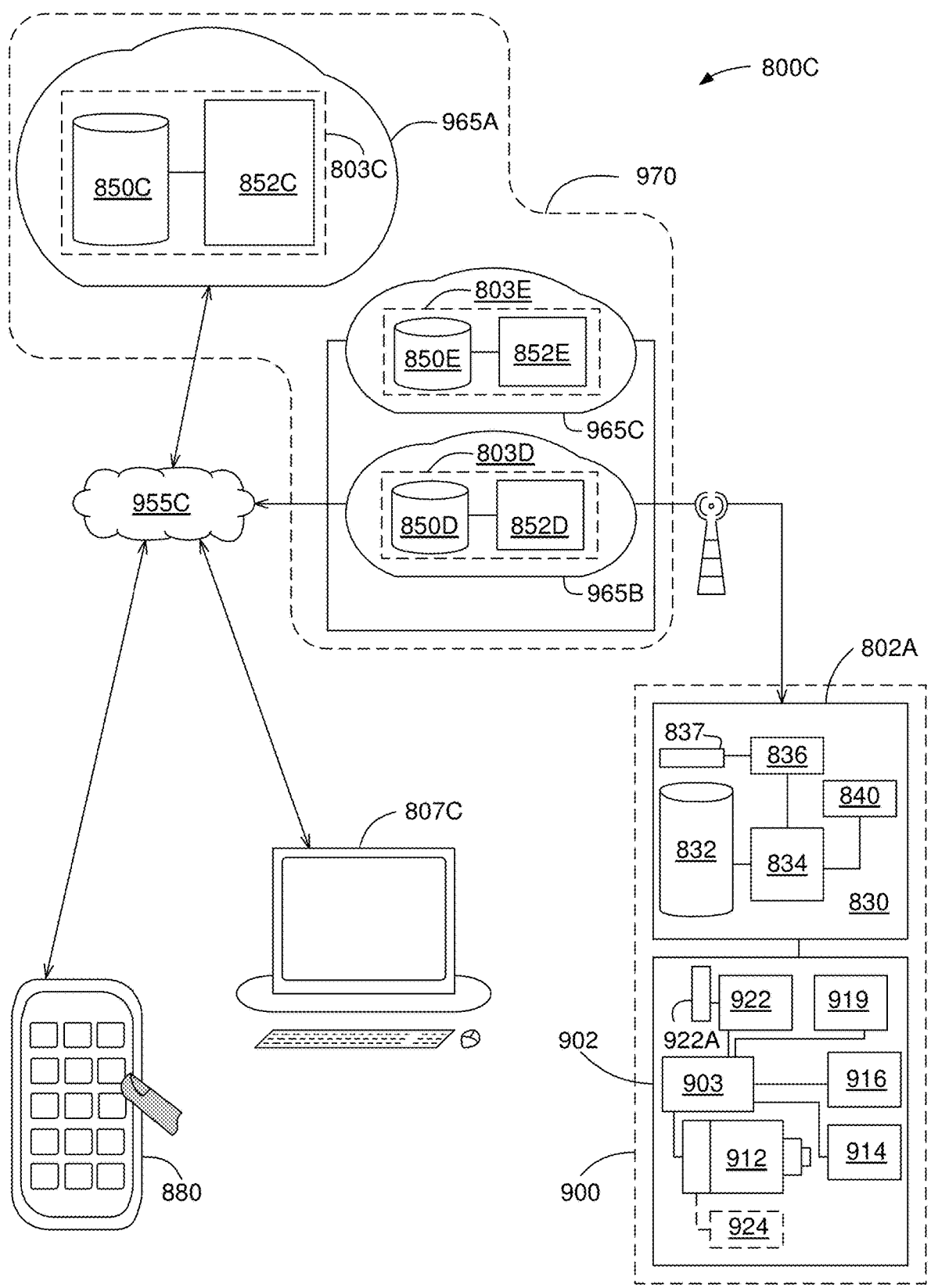
FIG. 23C is a schematic illustration of an embodiment of a compliance monitoring system of the present invention.

FIGS. 23A-23C illustrates exemplary embodiments of the system 800, namely systems 800A, 800B and 800C, which may be used for the compliance monitoring process of the present invention.

FIG. 23A shows, in an embodiment, a system 800A including a server 803A or a local server 803A which is a physical server configured to connect to both the mobile computing devices 880 and the field devices such as checkpoint monitors 802A of the access control stations 900 over a network 955A, which may be a wireless network, wired network, or the Internet. In the following embodiments, operation of the compliance monitoring system 800A will be exemplified using generally an access control station 900 with its checkpoint monitor but the same can be done using an individual checkpoint monitor 802B without an access control station. An administrative portal 807A may be used to access to the system server 803A by the system administrators.

The access control station 900 shown in FIG. 23A as well as in FIGS. 23B-23C includes essentially the same components or features shown in FIGS. 13 and 16 of the previous embodiment. However, it will be briefly described below for the following embodiments using different reference numbers to avoid confusion.

Accordingly, referring to FIG. 23A, an access control unit 902 of the station 900 may include a control module 903, in communication with the processor 834 of the checkpoint server 830 via an access control unit module 840 which may be a network switch connecting the electronics of the access control unit 902 to the checkpoint monitor 802A. The access control unit 902 may collect and transmit user vehicle status information and receives commands from the checkpoint monitor server 830 of the checkpoint monitor 803A. When the access control unit 902 is connected to the checkpoint monitor server 830 via the module 840, the control module 903 may become part of the internal network of the checkpoint monitor 802A.

Figure 24A:
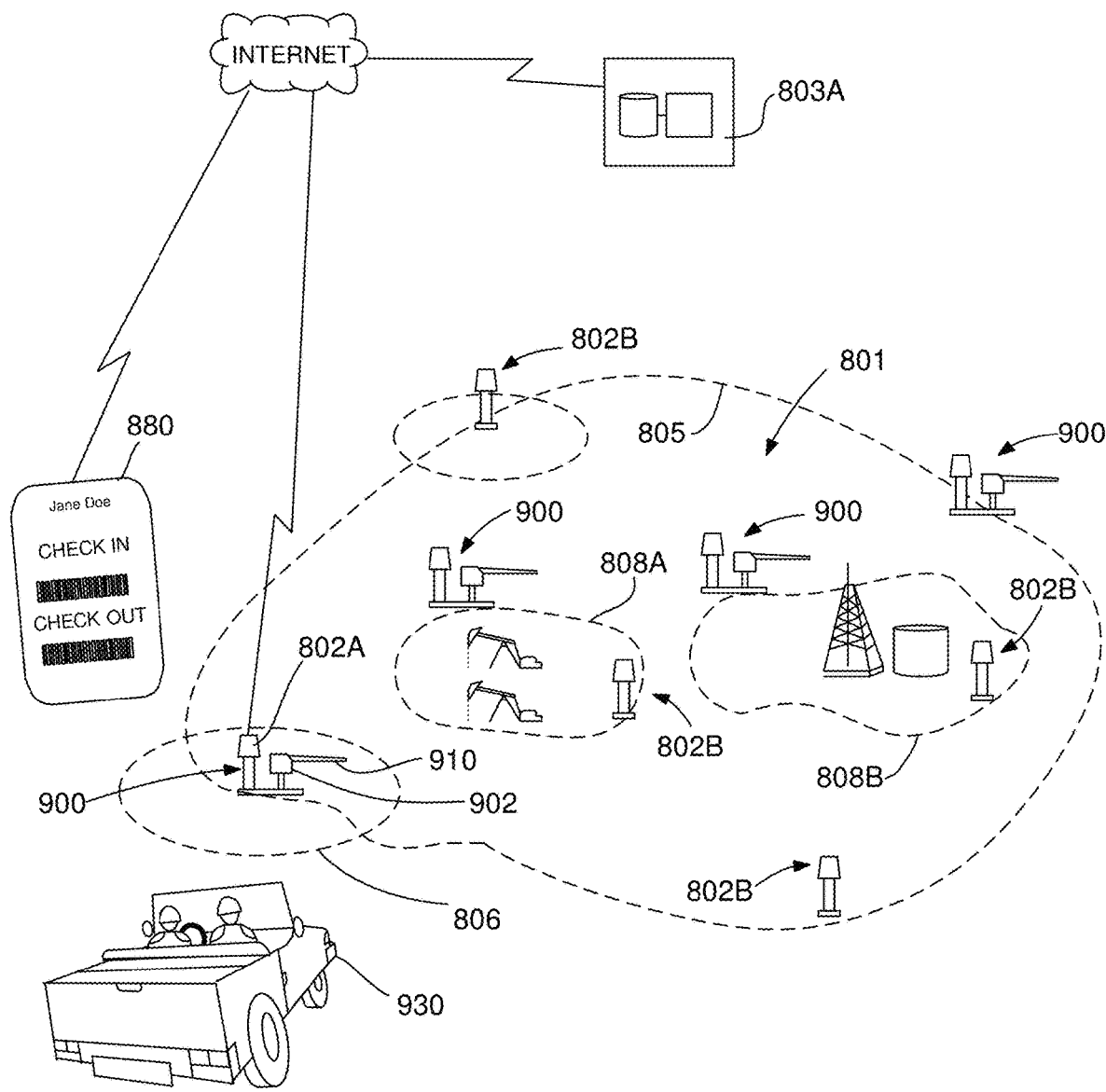
FIG. 24A is a schematic illustration of an embodiment of an exemplary implementation of the compliance monitoring system shown in FIG. 23A at a compliance monitored hydrocarbon location.
Figure 24B:
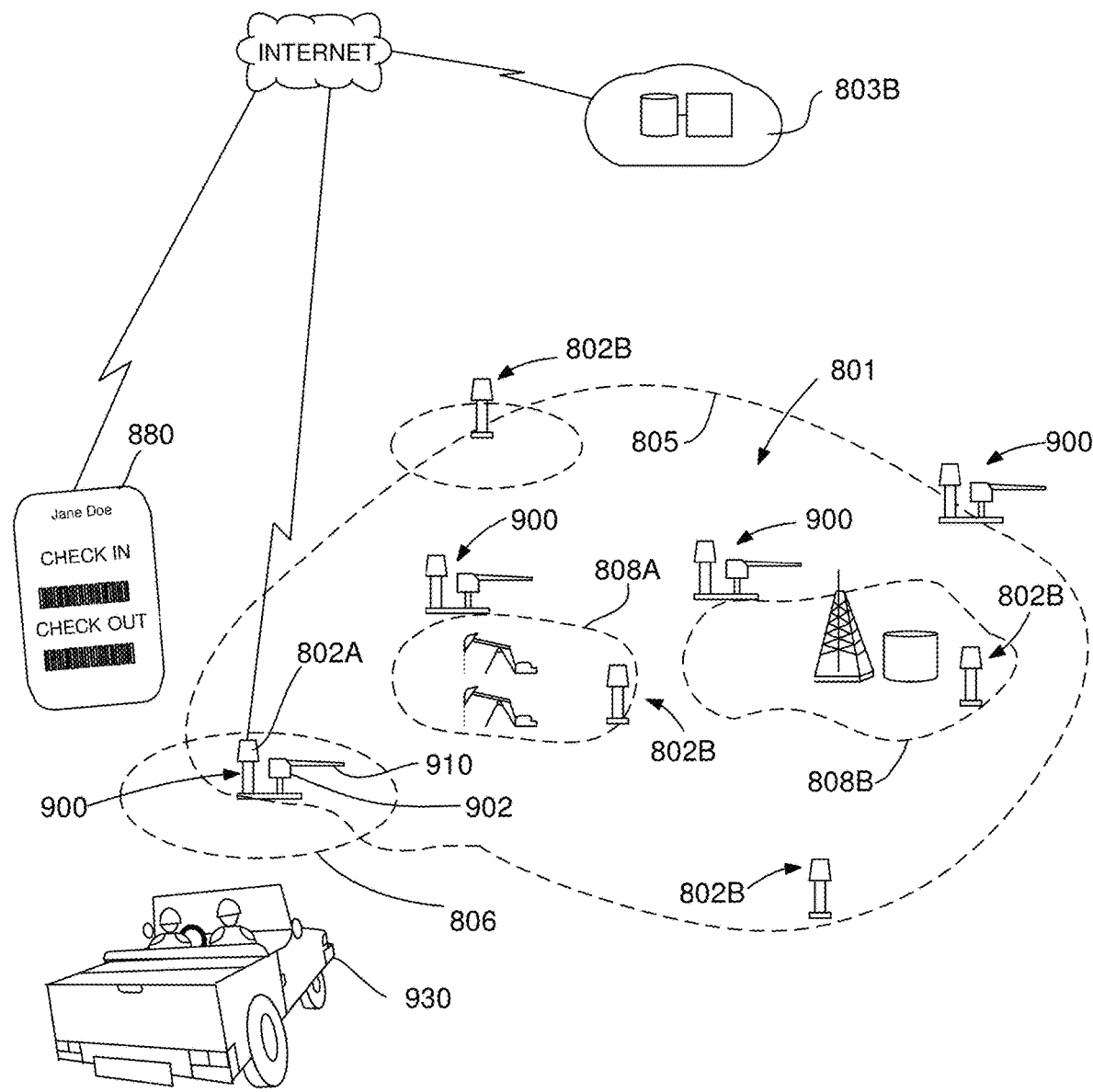
FIG. 24B is a schematic illustration of an embodiment of an exemplary implementation of the compliance monitoring system shown in FIG. 23B.
Figure 24C:
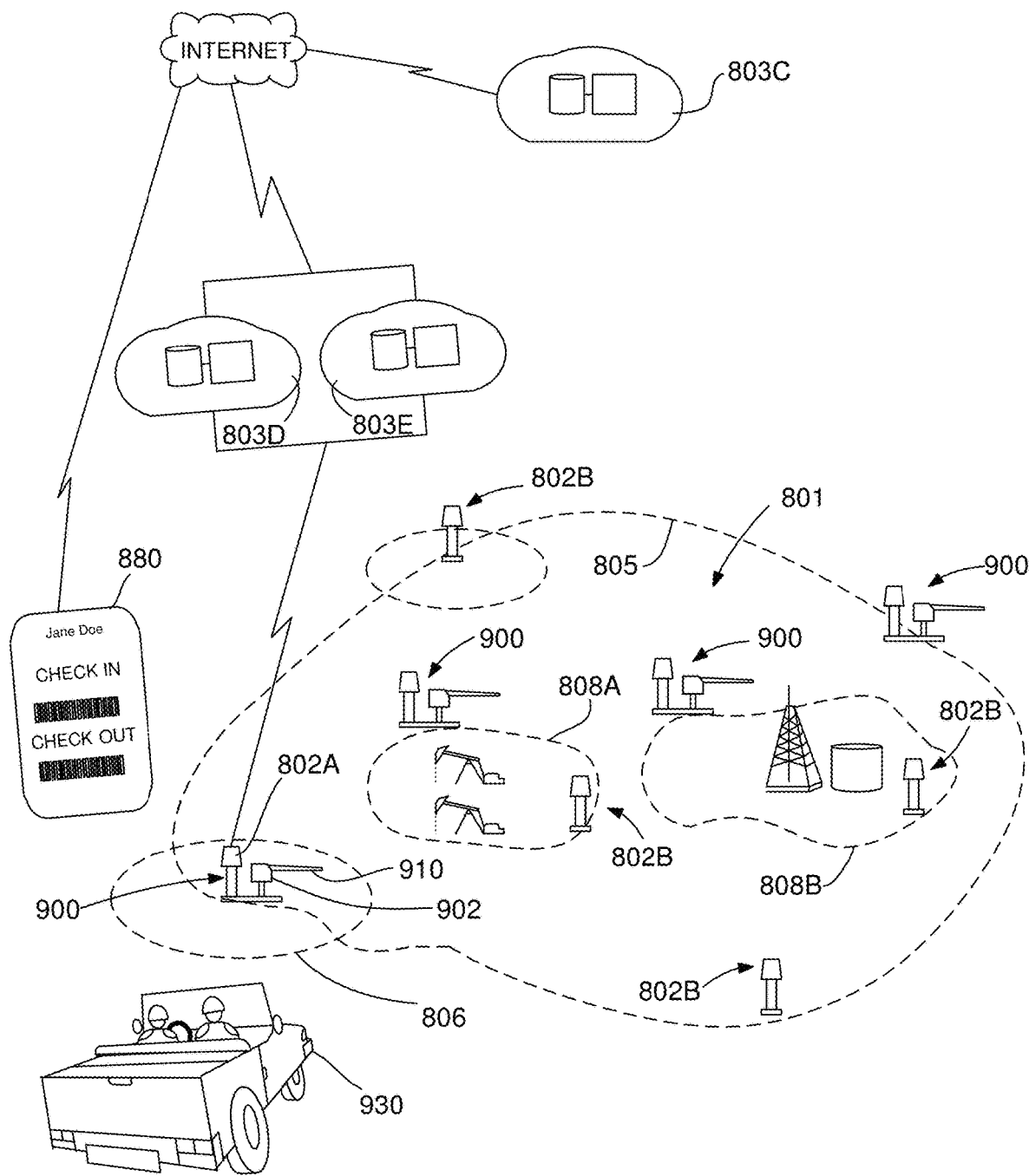
FIG. 24C is a schematic illustration of an embodiment of an exemplary implementation of the compliance monitoring system shown in FIG. 23C.

The control module 903 may be in connection with a barrier drive 912, vehicle sensors 914, a stop switch 916, a warning system 919, a wireless remote receiver 922 with an antenna 922A and an emergency battery backup system 924. The control module 903 may be configured to operate the barrier drive 912 for pivoting a barrier 910 between the blocking position A1 and the open position A2 (FIGS. 24A-24C). The control module 903 may provide real time vehicle status data and other data to the checkpoint monitor 802A as the control module 903 receives data from the above identified components of the access control unit 902.

The system server 803A may be privately owned by the compliance monitoring company. Alternatively, the system server 803A may be owned by a web hosting environment provider company providing virtual web hosting, i.e., providing storage space on a physical server (virtual server), for the monitoring company. The system server 803A may also be a dedicated server provided by a web hosting environment provider company providing a dedicated web hosting, i.e., providing one or more physical servers entirely dedicated to the monitoring company.

The system server 803A may include a processor (CPU) 852A, a system data storage 850A, motherboard, GPU, network devices, memory, an operation software and the others to run, and used by, the system. As previously mentioned, the system software of the compliance monitoring system, or the control program, that operates or runs the compliance monitoring system 800A may be stored in the system data storage 850A. The user data received from the client organizations, computing devices 880 of the users, the individual checkpoint monitors 802B, the access control stations 900 and other data sources may be stored in the system data storage 850A by the system processor 852A of the system server 803A. As described above in the previous embodiments, assignment data files including assignment data tables may be stored in the system data storage as well as in the checkpoint monitor storage. The assignment data tables include user assignment status data and user activity status data. Geolocation and ID data of each monitored location, each individual checkpoint monitor 802B and each access control station 900 may be also be stored in the system data storage 850A.

It will be appreciated that, in the systems described in this application, there may be multiple data files including multiple data tables along with the assignment data tables in the data storages. In one embodiment, the data stored in the system data storage, or system data base, may be in structured tables that may include raw structured data, i.e. dynamically updated with freshly arriving data. The datasets that may be presented to the users via the system website controlled by the system software or sent to the checkpoint monitors as messages may be constructed on demand making queries based on the filters and parameters defined depending on the data requested at a certain operation point. The specific data tables for each checkpoint monitor may be constructed on demand based on filters and parameters specified at the system server. Such data tables may be then constructed and transmitted to each checkpoint monitor. The data tables are very frequently updated to reflect changes at the system server as accurately as possible and to advantageously enhance the service. Extremely frequent changes may be taken in consideration on the compliance monitoring system design of the described embodiments.

Some details or features of the system server 803A of this embodiment and the following cloud embodiments may be similar to the features in the system server 103 described above with respect to FIG. 5. For clarity, other features shown in FIG. 5 are not included in the below examples and new reference numerals are used in the exemplary system servers shown in FIGS. 23A-23C.

The checkpoint software, or the checkpoint monitor control program, that operates the checkpoint monitor may be stored in a checkpoint monitor data storage 832. Data related to vehicle events and user events (provided by the access control unit 902) and data related to the checkpoint monitor 802A and the system server 803A may be stored in the checkpoint monitor storage 832 and transmitted to the system server 803A. Similarly, the user data and the related vehicle data may be received from the system server 803A and stored in the data storage 832. As described above, in the previous embodiments, assignment data files including assignment data tables may be stored in the storage unit 832 of the check point monitors 802A. The assignment data tables may include user assignment status data and user activity status data, which updated by the system server 803A and transmitted to checkpoint monitors 802A to update the stored assignment data file after each user entry or exit.

FIG. 23B shows, in an embodiment, a compliance monitoring system 800B including a cloud computing environment provided by one or more host servers 803B (physical servers of the cloud computing environment). The host servers 803B, or cloud servers 803B, of a cloud host 960, or cloud provider 960, which may be provided for the compliance monitoring service of the monitoring company. The cloud servers 803B are the physical servers of the cloud computing environment at a data center of the cloud provider. In general, the term cloud server may refer to multiple physical servers in cloud hosting set up and accessed over the internet. The cloud computing service may be leased from the cloud provider as part of a software or application service by the compliance monitoring company.

The cloud servers 803B, which run in the cloud computing environment, will be referred to as the cloud server 803B hereinafter. In the system 800B, the cloud server 803B may be in connection with the computing devices 880 and the field devices such as check point monitors 802A of the access control stations 900 (described above with respect to FIG. 23A) over the Internet 955B. An operation of the system 800B will also be exemplified using generally an access control station 900 but the same can be done using an individual checkpoint monitor 802B.

The cloud server 803B may include a processor (CPU) 852B, a system data storage 850B, motherboard, GPU, network devices, memory, an operation software and the others to run, and used by, the cloud services. The system software, or the control program, that operates the compliance monitoring system 800B may be stored in the system data storage 850B. The user data received from the client organizations, computing devices 880 of the users, the individual checkpoint monitors 802B, the access control stations 900 and other data sources may be stored in the system data storage 850B by the system processor 852B of the cloud server 803B. As described above in the previous embodiments, assignment data files including assignment data tables may be stored in the system data storage 850B as well as in the checkpoint monitor data storage 832. The assignment data tables include user assignment status data and user activity status data. Geolocation and ID data of each monitored location, each individual checkpoint monitor 802B and each access control station 900 may be also be stored in the system data storage 850B. The checkpoint monitor control program, or checkpoint monitor software is stored in the data storage 832 of the checkpoint monitor 802A. Further features and components of the checkpoint monitor 802A and the access control station shown in FIG. 23B are described within the above description of the system 800A and the previous embodiments.

The cloud server 803B may be hosted in the cloud computing platform via the Internet. Service models of cloud computing may include the following: Software-as-a-service (SaaS) providing application hosting; Platform-as-a-Service (PaaS) where companies can built their own applications; and Infrastructure-as-a-Service (IaaS) where the companies rent storage and servers to build their own applications.

In this embodiment, the system 800B may include a public cloud computing environment which may be run by a cloud provider organization (vendor company); however, the system 800B may include private cloud computing environment run by the compliance monitoring company or a hybrid cloud computing environment which may be a mixture of public and private cloud computing environments.

An administrative portal 807B may provide access to the cloud computing environment and the cloud server 803B for system administrators, which may provide cloud computing resource allocation and management to meet required service levels, using such as a desktop, a laptop computer, and a smartphone.

An exemplary cloud service may be Heroku Cloud Service or Heroku cloud computing environment, where the data processing occurs in the cloud server(s) 803B and the storage 850B (database), and where the cloud server 803B (web server) may be hosted in communication with the mobile computing devices 880, access control devices 900 and checkpoint monitors and administrative portals. Other alternative cloud service providers to host the cloud server 803B may be Amazon Web Services, Microsoft Azure or other cloud service providers like IBM and Google.

FIG. 23C shows, in an embodiment, a system 800C, which is a multicloud computing environment 970 which may include multiple public or private cloud servers. The system 800C may comprise field devices, such as checkpoint monitors, access stations and mobile computing devices, interacting with an infrastructure of multiple servers which are interconnected over the internet.

In one embodiment, the multicloud computing environment 970 may be formed by grouping, over the Internet 955C, a first cloud server 803C hosted by a first cloud host 965A or a first cloud provider, a second cloud server 803D hosted by a second cloud host 965B or a second cloud provider and a third cloud server 803E hosted by a third cloud host 965C or a third cloud provider. As in the previous embodiment, the term "cloud server" may refer to multiple physical servers in each cloud network, working in cloud computing platform.

In one embodiment, the first cloud server 803C may be the primary cloud server and the second and the third cloud servers 803D and 803E may be the subordinate cloud servers, or intermediate cloud servers, to the primary cloud server 803C. The first cloud server 803C may be identical to the cloud server 803B of the previous embodiment shown in FIG. 23B. The cloud servers 803C, 803D and 803E may form the infrastructure of the cloud architecture of the multicloud computing environment 970. As shown in FIG. 23C, each of the cloud servers 803C, 803D and 803E of the system 800C may include a processor (CPU) 852C, 852D and 852E respectively, data storage 850C, 850D and 850E respectively, motherboard, GPU, network devices, memory, operation software and the other devices to run, and used by, all the cloud services of the multicloud system 800C.

In this embodiment, the communication between the computing device 880 and the first cloud server 803C may be established over the Internet 955C. The communication between the first cloud server 803C and the checkpoint monitors 802A and/or 802B may be established via each of the cloud servers 803D and 803E or directly, over the Internet 955C. Communication between the first cloud server 803C and the cloud servers 803D and 803E may be established over the Internet 955C, and the communication between the checkpoint monitors and the cloud server 803D and 803E may be also be established over the Internet 955C. An administrative portal 807C, such as a desktop, a laptop computer, and a smartphone may provide access to the cloud computing environment and the cloud servers 803C, 803D and 803E for system administrators, which may provide cloud computing resource allocation and management to meet required service levels.

The second and third cloud servers 803D and 803E may interact with the checkpoint monitors continuously or intermittently to receive or send data. In one embodiment, the second cloud server 803D may be a cloud IoT (Internet of Things) hub or server that may relay instant commands from the first cloud server 803C to the checkpoint monitors 802A and/or 802B so as to enable the smart-entry feature and other operational commands. The second cloud server 803D may also receive periodical telemetry from the checkpoint monitors 802A, 802B for status monitoring. The telemetry data may include any measurement or recording taken by the checkpoint monitors. The third cloud server 803D may be a storage cloud server service for screenshots and video recordings taken at the checkpoint monitors 802A, 802B. RFID reading done at the checkpoint monitor may also be sent to the first cloud server 803C via the internet 955C.

The first cloud server 803C, the mobile computing devices 880, the administrative portal devices 807C, and the checkpoint monitors 802A, 802B may rely on internet connection points to communicate with each other. The internet connection points of the first cloud server 803C, the second cloud server 803D and the third cloud server 803E may be a part of their infrastructure, and the internet connection points may be transparent to the users and variable.

For this and the previous embodiments, the mobile computing device 880 may have dual internet access points. The first access point may be a cellular data service provided by a cellular carrier such as Verizon, AT&T, T-Mobile, Sprint, or the like. The second access point may be a WiFi connection where the internet provider is transparent to users and variable. The WiFi module on the mobile device adheres to the IEEE 802.11 standard. Currently used common specifications are IEEE802.11N and IEEE802.11AC.

The checkpoint monitors may rely on a cellular data service provided by a cellular carrier such as Verizon, AT&T, T-Mobile, and Sprint, and the like. Alternatively, a satellite internet service may be used if no cellular service is available on the monitored location, such as Dish, Viasat and HughesNet. The cellular carrier selection is based on the service quality and reliability on the areas of operation.

The mobile computing device 880, which may be used to access the Internet, either by cellular communications or by WiFi, may use its own available built-in input functionality to visit a website that runs a web application on the first cloud server 803C. Based on user inputs on the mobile computing device 880, commands may be sent from the first cloud server 803C to the second cloud server 803D (IoT server), which may then send the commands to the checkpoint monitors via cellular communications. The checkpoint monitors of the system may access the internet service branching out from the monitored location. Monitored locations may use a variety of similar technologies like cellular or satellite communications to get internet access.

The check point monitors may receive and processes the commands, and may or may not execute the commands. In response to the processing and execution of the command received, the checkpoint monitor 802A may send feedback over the Internet to the second cloud server 803D (IoT server), which may then relay that feedback to the first cloud server 803C. The first cloud server 803C may then processes the feedback and decide on the response that will be sent the mobile computing device 880.

The system software, or the control program, that operates the compliance monitoring system 800C may be stored in the system data storage 850C of the first cloud server 803C. The second cloud server software (the IoT software), or the control program, and the third cloud server software, or the control program, may be stored in the data storage 850D of the second cloud server 803D and the data storage 850E of the third cloud server 803E, respectively. The IoT software of the IoT server 803D provides speed and security in delivering access code data received from the system software of the first cloud server 803C to the checkpoint monitors and in delivering other operation data (sensor data, machinery data, etc.) to and from the checkpoint monitors. The IoT server software and the storage server software are subordinate softwares of the system software of the first cloud server software and may be controlled by the system software to run the compliance monitoring system 800C.

The user data received from the client organizations, computing devices 880 of the users, the individual checkpoint monitors 802B, the access control stations 900 and other data sources may be stored in the system data storage 850C by the system processor 852C of the first cloud server 803C. As described above in the previous embodiments, assignment data files including assignment data tables may be stored in the system data storage 850C as well as in the checkpoint monitor data storage 832. The assignment data tables may include user assignment status data and user activity status data. Geolocation and ID data of each monitored location, each individual checkpoint monitor 802B and each access control station 900 may be also be stored in the system data storage 850C. The checkpoint monitor control program, or checkpoint monitor software is stored in the data storage 832 of the checkpoint monitor 802A. Further features and components of the checkpoint monitor 802A and the access control station shown in FIG. 23B are described within the above description of the system 800A (FIG. 23A) and the previous embodiments.

An exemplary cloud service, or cloud provider, for the first cloud server 803C (web server) may be Heroku Cloud Service or Heroku cloud computing environment, where the data processing occurs in the cloud server 803C which is in communication with the mobile computing devices 880, access control devices 900 and checkpoint monitors 802A, 802B and administrative portals 807. Other alternative cloud service providers to host the cloud service may be Amazon Web Services, Microsoft Azure or other cloud service providers like IBM and Google. Exemplary cloud services for the second and third cloud servers 803D and 803E may be Heroku Cloud Service, Amazon Web Services, Microsoft Azure.

The data storages included in the system servers and the checkpoint monitor servers of the systems 800A, 800B and 800C may be in the form of non-transitory computer readable medium configured to store files, programs, applications, tables and executable computer instructions. Computer program products stored on a non-transitory computer readable mediums may include instructions executable by the processors of the servers to operate the systems including checkpoint monitors.

FIGS. 24A, 24B and 24C show illustrations of exemplary implementation of the above described three different systems 800A, 800B and 800C, respectively, which are used to compliance monitor the location 801, or the monitored location 801. In the following descriptions, in order to show their differences and similarities, the systems 800A, 800B and 800C are described together. It should be understood that systems 800A, 800B and 800C are independent embodiments and they are not used together on the same monitored location in the following examples.

Accordingly, FIG. 24A, in connection with FIG. 23A, shows an implementation of the system 800A for compliance monitoring the location 801; FIG. 24B, in connection with FIG. 23B, shows an implementation of the cloud system 800B for compliance monitoring the location 801; and FIG. 24C, in connection with FIG. 23C, shows an implementation of the multicloud system 800C to compliance monitor the location 801.

The location 801 may be a wellsite, oilfield, hydrocarbon field, or a hydrocarbon location, for oil or natural gas production or recovery may be compliance monitored by the system 800A, the system 800B or the system 800C as exemplified in FIGS. 23A, 23B and 23C, respectively.

The monitored location 801 may be a remote location. The monitored location 801 may include, but not limited to, a plurality of the access control stations 900 and the individual check point monitors 802B, which may be located in or adjacent various work locations 808, such as work locations 808A and 808B nested within the monitored location 801, to perform compliance monitoring of the users of the monitored location 801 and the work locations 808A, 808B. Each access control station 900 and each individual check point monitor 802B may be identified by a unique ID which is associated with geolocation (GPS) data of each access control station 900 and each individual check point monitor 802B in the monitored location 801. This data may be stored in the system data storages of the systems that are used. The access control stations 900 may be installed at an access location 806 of the monitored location 801 which may be on an access road, pathway or roadway used by the vehicles to enter or exit the monitored location 801. The access location 806 may have a predetermined radius or a geofence about the access control station 900, which radius is stored in the system and checkpoint monitor servers. During check in or check out, the user must be within the access location 806. The radius of the access location may vary depending on the locations.

At the access location 806, the access control station 900 may monitor a vehicle by both monitoring vehicle events and events of the users (user events) associated to the vehicle. The access control station 900 may collect and store vehicle event data combined with user event data, i.e., user ID data, user activity status data and the user assignment status data, which is associated to the vehicle event data, and which may be received from the system server to monitor user and vehicle activity. Vehicle event data may be the vehicle data captured by the access control unit 902, which data may be vehicle detection data from the presence sensors, data related to vehicle arrival at the access location and departure from the access location, for either exiting or entering the monitored location 801.

Accordingly, upon receiving a user geolocation data and user access code, which includes user's ID code portion and the user's activity code portion, from the user's mobile computing device 880, which may be a smart phone, referring to FIG. 24A and FIG. 23A, the user event data may be initially determined in the system server 803A of the system 800A, referring to FIG. 24B and FIG. 23B, the user event data may be initially determined in the cloud server 803B of the system 800B, and referring to FIG. 24C and FIG. 23C, the user event data may be initially determined in the first cloud server 803C of the system 800C.

Referring to FIGS. 24A and 23A, the system server 803A of the system 800A, referring to FIGS. 24B and 23B, the cloud server 803B of the system 800B, and referring to FIGS. 24C and 23C the first cloud server 803C of the system 800C, may initially identify the access control station 900 (including the checkpoint monitor 802A) or the individual check point monitor 802B that the user is using to enter or exit the monitored location 801. By comparing the received geolocation of the mobile computing device 880 (user's location) against the stored geolocation data of a plurality of monitored locations and a plurality of access control stations or individual check point monitors, the system server 803A of the system 800A, the cloud server 803B of the system 800B and the first cloud server 803C of the system 800C may determine the nearest access control station 900 or individual check point monitor 802B to the user's location and identifies it.

Next, after decoding the user access code in the system server 803A, in the cloud server 803B and the first cloud server 803C, the user ID and the user access status, i.e., the indicator of whether the user wishes to leave or enter the monitored location 801 may be determined, and this information is used to authenticate the user and his/her assignment status by analyzing the assignment status data stored in the system server showing the identified user's assignment in the monitored location 801. Based on this authentication, the servers 803A, 803B and 803C of the systems 800A, 800B and 800C may either approve user event data or invalidate it.

If the user event is authenticated in the servers 803A, 803B and 803C, the user access code received from the computing device 880 is transmitted by the servers 803A, 803B and 803C to the identified access control station 900 in the monitored location 801. In the systems 800A and 800B, any data from the servers 803A and 803B may be sent directly to the access control station's check point monitor 802A over the Internet. In this respect, once authenticated, the user access code may be directly sent to the identified access control station. In the system 800C, however, any data from the first cloud server 803C may be sent directly, or relayed by other cloud servers in the multicloud computing environment 970 for example the second cloud server 803D (IoT server), to the access control station's check point monitor 802A over the Internet. Once authenticated, the first cloud server 803C may send the user access code to the second cloud server 803D (IoT server) and, in turn, the second cloud server 965B may send this data to the identified access control station's checkpoint monitor or an individual checkpoint monitor. In this embodiment, in the system 800C, the use of the IoT server 803D may advantageously provide speed and security in access code data and other operation data (sensor data, machinery data, etc.) to and from the checkpoint monitors. Especially, if the access control system 800C controls multiple fields in multiple locations, the use of IoT servers quickly and securely distributes large amount of data to the multiplicity of checkpoint monitors in different geographic locations.

In the systems 800A, 800B and 800C, upon receiving the user access code from the servers 803A, 803B and 803C respectively, the access control station 900 initially confirms the vehicle detection data and stores it. After decoding the user access code in the checkpoint monitor server 830, the user ID and the user access status may be obtained and used to reauthenticate the user and his/her assignment status by analyzing the assignment status data stored in the access control unit 900 showing the identified user's assignment in the monitored location 801. Based on this authentication, the access control unit 900 may either approves user event data or invalidates it. If the user event data is authenticated in the access control unit 900, the assignment data table of the assignment data file may be updated with the user access status indicating, whether the user checking in or checking out and it is stored in the access control unit 900, and the barrier 910 of the access control station is moved to the open position to allow entrance or exit of the user vehicle.

The updated assignment data table along with the vehicle detection data may be transmitted to the servers 803A, 803B and 803C to replace the previous assignment data table stored therein. However, it will be appreciated that there may not be a full data table transmission to the servers given a user authorization. The checkpoint monitor may constantly generate and transmit a variety fresh event messages or fresh data to the servers. In addition to the data for the user activity events that relate to the authorizations, some other data, including for example heartbeat events, equipment operation events, power status events, motion detection events, may be simultaneously or intermittently transmitted along with the data of user activity events. In response to each user interaction received by the checkpoint monitors 802A or the servers 803A, 803B and 803C, user events may be created and such events may trigger a change on the relevant data tables on the data storages.

Figure 25A:
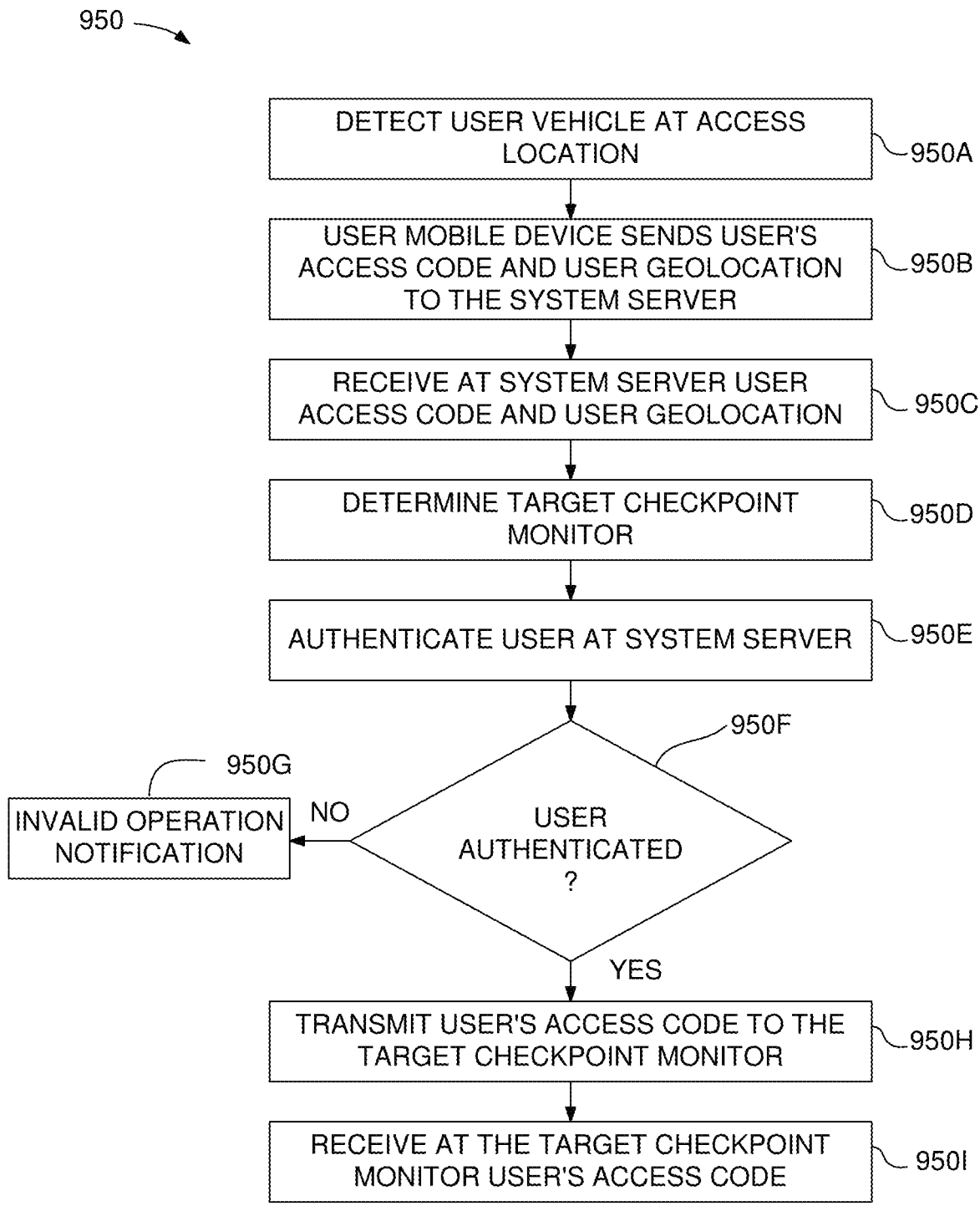
FIGS. 25A-25B illustrate a flow chart of exemplary operation sequences implemented in the compliance monitoring systems of the present invention.
Figure 25B:
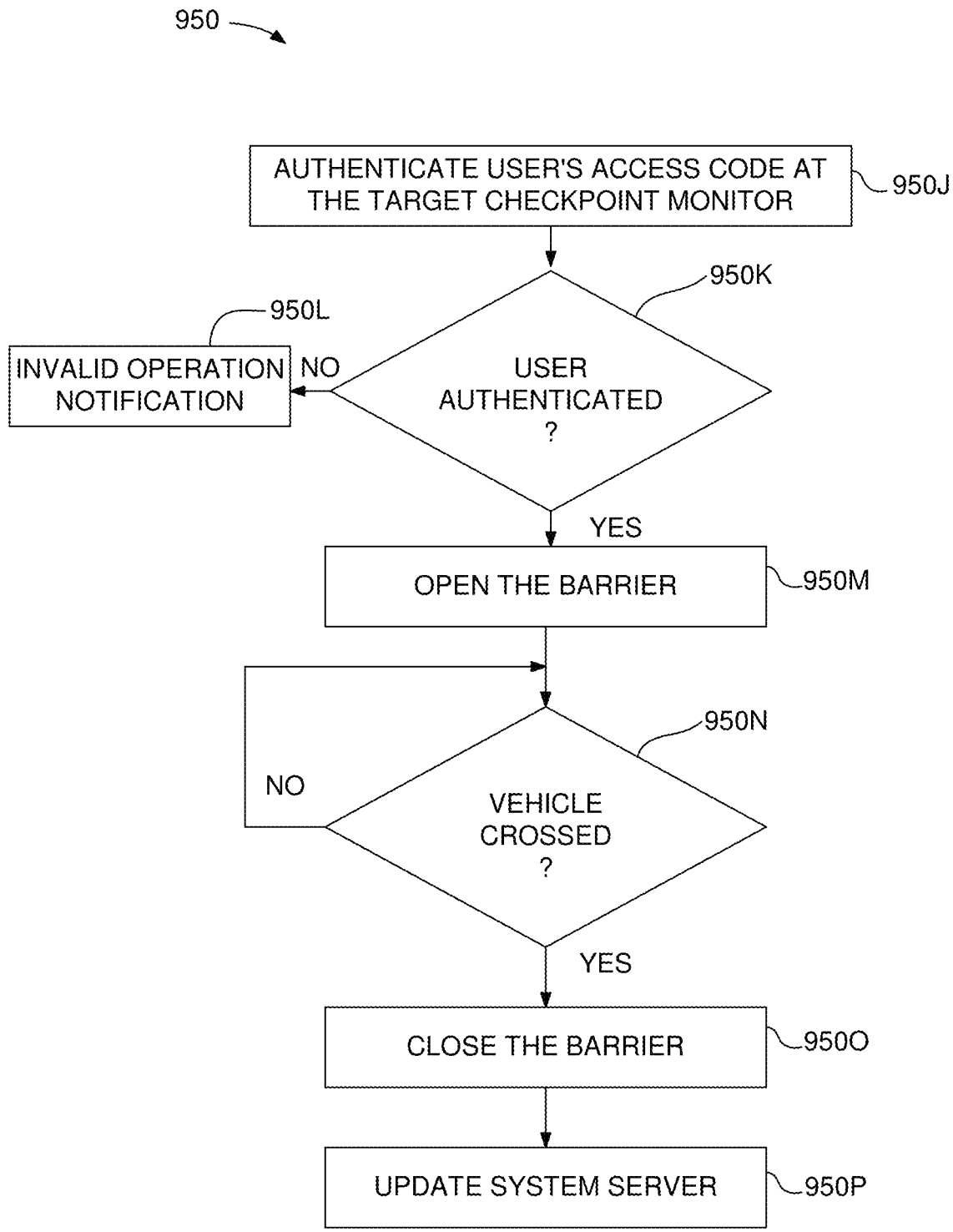

FIGS. 25A and 25B show a flowchart 950 illustrating an exemplary compliance monitoring algorithm that may monitor access to the monitored location 801 using: the system 800A (FIG. 23A and FIG. 24A), the system 800B (FIG. 23B and FIG. 24B) and the system 800C (FIG. 23C and FIG. 23C). In the flow chart 950, through the steps 950A to 950P, each step is described below for all three systems 800A, 800B and 800C separately for comparison purposes.

Referring to FIG. 25A, in step 950A, the user vehicle 930 may be detected by the vehicle sensors 914 on the access control unit 902. A vehicle detection signal including vehicle detection data may be transmitted to the checkpoint monitor 802A from the access control unit 902, which places the checkpoint monitor 802A in a standby mode to receive a command.

In step 950B, the user selects desired access code, i.e., either check in or check out, using the access application interface on the mobile computing device 880.

Next, in steps 950B-950C, in the system 800A, via the access application on the computing device 880, the access code with the user ID along with geolocation of the computing device 880 (user's geolocation) may be received in the system server 803A as an access data in the system 800A.

In the system 800B, using the access application on the computing device 880, the user may access the cloud server 803B to input the user access code with the user ID along with geolocation of the computing device 880 (user's geolocation) to the cloud server 803B as an access data.

In the system 800C, using the access application on the computing device 880, the user may access the first cloud server 803C to input the user access code with the user ID along with geolocation of the computing device 880 (user's geolocation) to the first cloud server 803C as an access data.

In steps 950D-950E, in the system 800A, (a) comparing the received geolocation data against the stored geolocation data of the access control stations, the system server 803A identifies the monitored location and the associated access control station (the target access control station), that is closest to the user's received geolocation. Next, (b) by comparing the user ID included in the access code against the stored user assignment data in the stored assignment data file, the system server 803A attempts to authenticate the user.

In the system 800B, (a) comparing the received geolocation data against the stored geolocation data of the access control stations, the cloud server 803B identifies the monitored location and the associated access control station (the target access control station), that is closest to the user's received geolocation. Next, (b) comparing the user ID included in the access code against the stored user assignment data in the stored assignment data file, the cloud server attempts to authenticate the user.

In the system 800C, comparing the received geolocation data against the stored geolocation data of the access control stations, the first cloud server 803C identifies the monitored location and the associated access control station (the target access control station), that is closest to the user's received geolocation. Next, (b) comparing the user ID included in the access code against the stored user assignment data in the stored assignment data file, the first cloud server 803C attempts to authenticate the user.

In steps 950F-950G, if the user cannot be authenticated, the server of the used system may mark the event as an invalid operation.

In steps 950F-950H, if the user is authenticated in step 950F, in the system 800A, in the system server 803A, the assignment status and the activity status of the user may temporarily be approved/updated and the user access code is transferred to the target access control station for verification of the current user event.

In the system 800B, if the user is authenticated in step 950F, in the cloud server 803B, the assignment status and the activity status of the user may temporarily be approved/updated and the user access code is transferred to the target access control station for verification of the current user event.

In the system 800C, if the user is authenticated in step 950F, in the first cloud server 803C, the assignment status and the activity status of the user may temporarily be approved/updated and the user access code is sent to the second cloud server 803D (IoT server) to relay it to the target access control station for verification of the current user event.

Referring to FIGS. 25A-25B, in step 950I, in the system 800A, after receiving the user access code from the system server 803A, the server 830 of the checkpoint monitor 802A may authenticate the user, in step 950J, by analyzing the access code.

In the system 800B, after receiving the user access code from the cloud server 803B, the server 830 of the checkpoint monitor 802A may authenticate the user, in step 950J, by analyzing the access code.

In the system 800C, after receiving the user access code from the second cloud server 803D (IoT server), the server 830 of the checkpoint monitor 802A may authenticate the user, in step 950J, by analyzing the access code.

Referring to FIG. 25B, in steps 950K-950L, if the user cannot be authenticated, the checkpoint monitor 802A of the access control station 900 may report the event as an invalid operation to the server 803A in the system 800A, to the cloud server 803B in the system 800B and the first cloud server 803C in the system 800C. Authentication of a user's assignment status and activity status was explained in detail with respect to FIG. 9.

If the user is authenticated in step 950K, the server 830 of the checkpoint monitor 802A approves/updates the assignment status of the user and updates the activity status of the user as described above.

Next, in step 950M, the server 830 of the checkpoint monitor 802A may command the control module 903 of the access control unit 902 to move the barrier 910 from the blocking position A1 to the open position A2. In response, the control module 903 operates the drive 912 to pivot the barrier 910 to the open position A2 to allow the vehicle 930 to either enter or exit the monitored location 801.

In step 950N, if the vehicle sensors 914 continue to detect the vehicle 930, the barrier 910 is maintained in the open position A2. If the vehicle sensors 914 no longer detect the vehicle 930, the barrier 910 may be pivoted to the blocking position A1 in step 950O.

Next, in step 950P, in the system 800A, the checkpoint monitor server 830 may transmit the vehicle status data, including the vehicle detection data and other data received from the access control unit, along with the associated user's assignment status and activity status to the system server 803A to permanently update the assignment data file in the system server 803A for compliance monitoring. Step 950P may occur in parallel with step 950M as far as updating the user status. The vehicle handling on step 950N through step 950O may be an independent process that may be triggered by the user action.

In the system 800B, the checkpoint monitor server 830 may transmit the vehicle status data, including the vehicle detection data and other data received from the access control unit, along with the associated user's assignment status and activity status to the cloud server 803B to permanently update the assignment data file in the cloud server 803B for compliance monitoring.

In the system 800C, the checkpoint monitor server 830 may transmit the vehicle status data, including the vehicle detection data and other data received from the access control unit, along with the associated user's assignment status and activity status to the first cloud server 803C to permanently update the assignment data file in the first cloud server 803C for compliance monitoring.

Referring to FIGS. 25A and 25B, in the systems 800A and 800B, the process steps 950A through 950I may be performed by the system software of the server 803A and the system software of the cloud server 803B, respectively. The rest of the process steps may be performed by the checkpoint monitor software of the checkpoint monitor servers 802A of the access control stations 900. However, in the system 800C, the process steps 950A through 950F may be performed by the system software of the first cloud server 803C, and the process steps 950H through 950I may be performed by the IoT software of the second cloud server 803D (IoT server). The rest of the process steps may be performed by the checkpoint monitor software of the checkpoint monitor servers 802A of the access control stations 900.

Example

Exemplary Dataflow for a SmartEntry Operation:

A. User initiates operation by accessing https://gateway-.wellfence.com on mobile device. Navigate to mobile phone Web Browser; Web Request; Internet; Heroku Web server; Page Request Contents; Internet; mobile phone Web Browser display; user enters credentials on web page displayed; mobile phone Web Browser; user credentials; Internet; Heroku Web server; Access Granted and Page Request Contents; Internet; mobile phone Web Browser display;

B. User selects Check-In/Out operation on mobile device; mobile phone Web Browser; Mobile Phone GPS coordinates capture; User Operation Selection; Internet; Heroku Web server; User and Operation validation (Inside Geolocation range) and Page Request Contents; Internet; Mobile phone Web Browser display; with operation confirmation to user. There may be additional criteria set at the server in order to complete an authorization in addition to GPS location before sending to a checkpoint monitor. Examples may be a temporary ban or user type restrictions, documentation needs to be filled in, body temperature scan validity, etc.

C. Checkpoint Monitor Interaction:

Heroku Server Validates User and Operation; Heroku Server Identifies nearest Checkpoint Monitor based on User GPS coordinates; Heroku Server issues an Access Granted Command with user and operation details to identified Checkpoint Monitor; Internet; Azure IoT Hub receives command and routes command message to the Checkpoint Monitor based on the unique identifier provided by Heroku Server; Internet; Cellular Data Service; Checkpoint Monitor Receives Command; Checkpoint Monitor Validates User (against Local) Users List, operation and vehicle presence (No access if vehicle not present); Checkpoint Monitor issues command to Gate Controller to Open. The exemplary implementations of the present invention may require a vehicle present in order to approve user operations when entering or exiting the wellsite but there may be cases where the vehicles may not be required to enter or exit for example when the individual checkpoint monitors 802B, without an access control station are used to enter or exit the wellsite.

D. Checkpoint Monitor Event Creation:

The flow described below is the same for any event created but making mention of SmartEntry specifics.

E. Event Message Creation:

Valid User and Operation; Create Event Message with user and operation details; Take Screenshot of User Interface of Application; Queue Event Message and Screenshot for Upload; Select Event Message to Upload; Cellular Data Service; Internet; Send event to Heroku server (transaction or any other compatible method); Heroku Validates Event Message and sends to Storage; Generate Confirmation receipt; Internet; Cellular Data Service; Checkpoint Monitor receives Confirmation and eliminates message from queue and moves on to next message.

F. Screenshot Creation:

Valid User and Operation; Create Event Message with user and operation details; Take Screenshot of User Interface of Application; Queue Event Message and Screenshot for Upload; Select Screenshot to Upload; Cellular Data Service; Internet; Send Screenshot to Cloud Storage Server like Azure Blob or AWS S3 (Method determined by API provided by cloud service); Cloud Service Stores Screenshot; Generate Confirmation receipt; Internet; Cellular Data Service; Checkpoint Monitor receives Confirmation and eliminates Screenshot from queue and moves on to next screenshot. Screenshots are displayed on demand on any page defined at the Heroku Server but first have to be retrieved from Cloud Storage server.

G. Exemplary Web Page Displaying Events:

Determine Event to Display; Determine Screenshot File Name from Event; Internet; Cloud Storage Server (Azure Blob or AWS S3) receives request to retrieve specific screenshot file; Cloud Storage Service Validates request and File availability; File retrieved; Internet; Heroku Server receives Screenshot File; and displays content on Web Page for the event requested.

It is understood that in the above described embodiments, the computing devices, e.g., smartphones, may initially send the activity requests to the system servers via an internet connection and the servers may process and send the final operation requests to the associated checkpoint monitors in the field. However, the same may be done by directly sending the activity requests from the smartphones of the users to a web server in the field or in the checkpoint monitors to interact with the checkpoint monitors directly using a local WiFi.

Although aspects and advantages of the present invention are described herein with respect to certain preferred embodiments, modifications of the preferred embodiments will be apparent to those skilled in the art. Thus, the scope of the present invention should not be limited to the foregoing discussion, but should be defined by the appended claims.

We claim:

1. A compliance monitoring system for hydrocarbon wellsites, the system comprising:
a cloud system server including a system processor and a system data storage, wherein the cloud system server is configured to manage a compliance monitoring service of a hydrocarbon wellsite;
an access control station identifiable by the cloud system server with its geolocation located in the hydrocarbon wellsite which is compliance monitored, the access control station including a vehicle sensor to detect vehicles and a checkpoint monitor having a server in communication with the cloud system server;
a mobile computing device of a user configured to transmit a user access code, including a user identification code and a user activity code including a user activity status, and a user geolocation information of the mobile device to the cloud system server, wherein the user access code is analyzed by the cloud system server to authenticate the user by comparing the user identification code received from the mobile computing device with the user identification code stored in the cloud system server and to determine the user activity status indicating whether the user is in check in activity to enter or check out activity to exit the hydrocarbon wellsite;
wherein upon receiving the user geolocation information of the mobile computing device, the cloud system server identifies the access control station that is closest to the mobile computing device of the user and transmits the user access code to the server of the check point monitor at the access control station; and
wherein upon receiving vehicle sensor data from the vehicle sensor indicating presence of a vehicle and the user access code received from the cloud system server, the server of the checkpoint monitor analyzes the user access code to authenticate the user by comparing the user identification code received from the cloud system server with the user identification code stored in the server of the check point monitor and to determine the user activity status.

2. The system of claim 1, wherein the cloud system server, the checkpoint monitor of the access control station and the mobile computing device are connected over the Internet.

3. The system of claim 2 further including at least one first intermediate cloud server connected with both the cloud system server and the server of the checkpoint monitor over the Internet.

4. The system of claim 3, wherein the at least one first intermediate cloud server relays the user access code from the cloud system server to the server of the checkpoint monitor.

5. The system of claim 3, wherein the at least one first intermediate cloud server relays telemetry data received from the server of the checkpoint monitor to the cloud system server, the telemetry data is gathered at the access control station.

6. The system of claim 3, wherein the at least one first intermediate cloud server includes at least one Internet of Things (IoT) cloud server.

7. The system of claim 6 further including at least one second intermediate cloud server connected with both the cloud system server and the server of the checkpoint monitor over the Internet.

8. The system of claim 7, wherein the at least one second intermediate cloud server includes at least one storage cloud server to store screenshots taken by cameras of the checkpoint monitor of the access control station.

9. The system of claim 8, wherein the at least one Internet of Things (IoT) cloud server and the at least one storage cloud server are subordinate servers to the cloud system server within the compliance monitoring system.

10. The system of claim 2, wherein the mobile computing device is an internet and Global Positioning System (GPS) capable device with web viewing and user input functionality interacting with software applications.

11. The system of claim 10, wherein the mobile computing device includes an access application and a touchscreen display.

12. The system of claim 11, wherein the user access code is sent from the mobile computing device by selecting a check in tab or a check out tab displayed at a menu interface of the access application.

13. The system of claim 12, wherein the check in tab or the check out tab is selected by a user input applied through hardware components of the mobile computing device.

14. The system of claim 12, wherein the check in tab or the check out tab is selected by a touch input through the touchscreen display.

15. The system of claim 1, wherein at least one assignment data table is stored in the system data storage, the at least one assignment data table including user assignment status data and user activity status data.

16. The system of claim 15, wherein the cloud system server is configured to analyze the user access code received from the mobile computing device to authenticate a user assignment status using the user identification code and to determine the user activity status using the user activity code.

17. The system of claim 16, wherein the authentication of the user assignment status identifies the user on the at least one assignment data table.

18. The system of claim 17, wherein the determination of the user activity status updates the user activity status data on the at least one assignment data table as to whether the user is in the check in activity to enter or in the check out activity to exit the hydrocarbon wellsite.

19. The system of claim 1, wherein the mobile computing device is at least one of a smart phone and a tablet.

20. The system of claim 1, wherein the server of the checkpoint monitor includes a processor and a data storage.

21. A method for compliance monitoring of hydrocarbon wellsites, comprising:
providing a cloud system server including a system processor and a system data storage, wherein the cloud system server is configured to manage the compliance monitoring of a hydrocarbon wellsite;
providing an access control station identifiable by the cloud system server with its geolocation located in the hydrocarbon wellsite that is compliance monitored, the access control station including a vehicle sensor to detect vehicles and a checkpoint monitor having a server in communication with the cloud system server;
transmitting from a mobile computing device a user access code and a geolocation information of the mobile computing device to the cloud system server, the user access code including a user identification code and a user activity code including a user activity status;
receiving and analyzing the user access code at the cloud system server to authenticate a user by comparing the user identification code received from the mobile computing device with the user identification code stored in the cloud system server and to determine the user activity status indicating whether the user is in check in activity to enter or check out activity to exit the hydrocarbon wellsite;
identifying, at the cloud system server, the access control station that is closest to the mobile computing device using the geolocation information;
transmitting the user access code from the cloud system server to the server of the checkpoint monitor of the access control station that is closest to the mobile computing device; and
receiving, at the server of the checkpoint monitor, vehicle sensor data sent from the vehicle sensor, indicating presence of a vehicle, and the user access code sent from the cloud system server, wherein the server of the checkpoint monitor reanalyzes the user access code to authenticate the user at the access control station by comparing the user identification code received from the cloud system server with the user identification code stored in the server of the check point monitor and to determine the user activity status.

22. The method of claim 21, wherein the cloud system server, the checkpoint monitor of the access control station and the mobile computing device are connected over the Internet.

23. The method of claim 22, wherein transmitting the user access code from the cloud system server to the server of the checkpoint monitor of the access control station includes:
transmitting the user access code to at least one Internet of Things (IoT) cloud server from the cloud system server, and
transmitting the user access code to the server of the checkpoint monitor from the at least one Internet of Things (IoT) cloud server after receiving the user access code from the cloud system server.

24. The method of claim 23, transmitting the user access code received from the cloud system server is carried out by a system software of the at least one Internet of Things (IoT) cloud server.

25. The method of claim 22, further including storing screenshots taken by a camera of the checkpoint monitor in at least one storage cloud server.

26. The method of claim 22, wherein the mobile computing device is an internet and Global Positioning System (GPS) capable device with web viewing and user input functionality interacting with software applications.

27. The method of claim 26, wherein the mobile computing device includes an access application and a touchscreen display.

28. The method of claim 27, wherein the user access code is sent by selecting a check in tab or a check out tab displayed at a menu interface of the access application.

29. The method of claim 28, wherein the check in tab or the check out tab is selected by a touch input through the touchscreen display.

30. The method of claim 21, wherein at least one assignment data table is stored in the system data storage, the at least one assignment data table including user assignment status data and user activity status data.

31. The method of claim 30, wherein the cloud system server analyzes the user access code to authenticate a user assignment status using the user identification code and to determine the user activity status using the user activity code.

32. The method of claim 31, wherein the authentication of the user assignment status identifies the user on the at least one assignment data table.

33. The method of claim 31, wherein the determination of the user activity status updates the user activity status data on the at least one assignment data table as to whether the user is in the check in activity to enter the hydrocarbon wellsite or in the check out activity to exit the hydrocarbon wellsite.

34. The method of claim 21, wherein the mobile computing device is at least one of a smart phone and a tablet.

35. The method of claim 21, wherein analyzing the user access code and identifying the access control station at the cloud system server are carried out by a system software of the cloud system server.

* * * * *